(12) United States Patent
Tsuji

(10) Patent No.: US 7,595,919 B2
(45) Date of Patent: Sep. 29, 2009

(54) COLOR CONVERSION DEFINITION CREATING METHOD, PROFILE CREATING METHOD, COLOR CONVERSION DEFINITION CREATING APPARATUS, PROFILE CREATING APPARATUS, COLOR CONVERSION DEFINITION CREATING PROGRAM STORAGE MEDIUM, AND PROFILE CREATING PROGRAM STORAGE MEDIUM

(75) Inventor: Tetsuya Tsuji, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 624 days.

(21) Appl. No.: 11/080,780

(22) Filed: Mar. 16, 2005

(65) Prior Publication Data

US 2005/0206929 A1  Sep. 22, 2005

(30) Foreign Application Priority Data

Mar. 17, 2004  (JP)  ............................. 2004-075544

(51) Int. Cl.
*G06F 15/00* (2006.01)
*G06K 1/00* (2006.01)
*G03F 3/08* (2006.01)
*G06K 9/00* (2006.01)

(52) U.S. Cl. .................. 358/518; 358/1.9; 382/167
(58) Field of Classification Search .................. 358/1.1, 358/1.9, 500, 518; 382/162, 167
See application file for complete search history.

(56) References Cited

U.S. PATENT DOCUMENTS 5,553,199 A * 9/1996 Spaulding et al. ............ 358/1.9
5,699,491 A * 12/1997 Barzel ......................... 358/1.9
6,637,849 B2 * 10/2003 Maltz .......................... 347/15
2003/0189716 A1 * 10/2003 Tsuji et al. ................... 358/1.9

FOREIGN PATENT DOCUMENTS

| JP | 9-83824 A | 3/1997 |
|---|---|---|
| JP | 2001-103329 A | 4/2001 |
| JP | 2004-7373 A | 1/2004 |
| JP | 2004-102489 A | 4/2004 |
| JP | 2005-268980 A | 9/2005 |

* cited by examiner

*Primary Examiner*—Mark K Zimmerman
*Assistant Examiner*—Ming Hon
(74) *Attorney, Agent, or Firm*—Sughrue Mion, PLLC

(57) ABSTRACT

There is disclosed a color conversion definition creating method of creating a color conversion definition for converting coordinate points in a color reproduction area of a printer into coordinate points in a color reproduction area of a print. A profile of a virtual device, which has a color reproduction area tracing the color reproduction area for printing, is created. Created is a first color conversion definition for converting coordinate points in the color reproduction area of the printer in the first RGB color space into coordinate points in the color reproduction area of the virtual device in a second RGB color space depending on the virtual device. Created is a second color conversion definition for converting coordinate points in the color reproduction area of the virtual device in the second RGB color space into coordinate points in the color reproduction area for printing in the CMYK color space.

9 Claims, 39 Drawing Sheets

| | $R_2$ | $G_2$ | $B_2$ | C | M | Y | K | $L^*$ | $a^*$ | $b^*$ |
|---|---|---|---|---|---|---|---|---|---|---|
| W | 255 | 255 | 255 | 0 | 0 | 0 | 0 | $L^*_W$ | $a^*_W$ | $b^*_W$ |
| | $255 \times \frac{9}{10}$ | 255 | 255 | 10 | 0 | 0 | 0 | $L^*_{11}$ | $a^*_{11}$ | $b^*_{11}$ |
| | $255 \times \frac{8}{10}$ | 255 | 255 | 20 | 0 | 0 | 0 | $L^*_{12}$ | $a^*_{12}$ | $b^*_{12}$ |
| | $255 \times \frac{7}{10}$ | 255 | 255 | 30 | 0 | 0 | 0 | $L^*_{13}$ | $a^*_{13}$ | $b^*_{13}$ |
| | ⋮ | ⋮ | ⋮ | ⋮ | ⋮ | ⋮ | ⋮ | ⋮ | ⋮ | ⋮ |
| C | 0 | 255 | 255 | 100 | 0 | 0 | 0 | $L^*_C$ | $a^*_C$ | $b^*_C$ |

Fig. 20

| | $R_2$ | $G_2$ | $B_2$ | C | M | Y | K | $L^*$ | $a^*$ | $b^*$ |
|---|---|---|---|---|---|---|---|---|---|---|
| C | 0 | 255 | 255 | 100 | 0 | 0 | 0 | $L^*_C$ | $a^*_C$ | $b^*_C$ |
| | 0 | 255 | $255 \times \frac{9}{10}$ | 100 | 0 | 10 | 0 | $L^*_{21}$ | $a^*_{21}$ | $b^*_{21}$ |
| | 0 | 255 | $255 \times \frac{8}{10}$ | 100 | 0 | 20 | 0 | $L^*_{22}$ | $a^*_{22}$ | $b^*_{22}$ |
| | 0 | 255 | $255 \times \frac{7}{10}$ | 100 | 0 | 30 | 0 | $L^*_{23}$ | $a^*_{23}$ | $b^*_{23}$ |
| | ⋮ | ⋮ | ⋮ | ⋮ | ⋮ | ⋮ | ⋮ | ⋮ | ⋮ | ⋮ |
| G | 0 | 255 | 0 | 100 | 0 | 100 | 0 | $L^*_G$ | $a^*_G$ | $b^*_G$ |

Fig. 21

| R₂ G₂ B₂ | C M Y K | L* a* b* |
|---|---|---|
| 255  0  0 | 0  100  100  0 | L*$_R$  a*$_R$  b*$_R$ |
| 255×$\frac{9}{10}$  0  0 | 0  100  100  10 | L*$_{31}$  a*$_{31}$  b*$_{31}$ |
| 255×$\frac{8}{10}$  0  0 | 0  100  100  20 | L*$_{32}$  a*$_{32}$  b*$_{32}$ |
| ⋮  ⋮  ⋮ | ⋮  ⋮  ⋮  ⋮ | ⋮  ⋮  ⋮ |
| R$_P$  0  0 | 0  100  100  Kparam | L*$_{3P}$  a*$_{3P}$  b*$_{3P}$ |
| ⋮  ⋮  ⋮ | { BLANK } | ⋮  ⋮  ⋮ |
| 255×$\frac{2}{10}$  0  0 | | L*$_{3m}$  a*$_{3m}$  b*$_{3m}$ |
| 255×$\frac{1}{10}$  0  0 | | L*$_{3n}$  a*$_{3n}$  b*$_{3n}$ |
| 0  0  0 | 100  100  100  Kmax | L*$_k$  a*$_k$  b*$_k$ |

(R ↓ K)

| $R_2$ | $G_2$ | $B_2$ | C | M | Y | K | $L^*$ | $a^*$ | $b^*$ |
|---|---|---|---|---|---|---|---|---|---|
| 255 | 255 | 255 | | | | | $L^*_W$ | $a^*_W$ | $b^*_W$ |
| $255 \times \frac{9}{10}$ | 255 | 255 | | | | | $L^*_{111}$ | $a^*_{111}$ | $b^*_{111}$ |
| $255 \times \frac{8}{10}$ | 255 | 255 | | BLANK | | | $L^*_{112}$ | $a^*_{112}$ | $b^*_{112}$ |
| $255 \times \frac{7}{10}$ | 255 | 255 | | | | | $L^*_{113}$ | $a^*_{113}$ | $b^*_{113}$ |
| ⋮ | ⋮ | ⋮ | | | | | ⋮ | ⋮ | ⋮ |
| 0 | 255 | 255 | | | | | $L^*_C$ | $a^*_C$ | $b^*_C$ |

Fig. 29

| $R_2$ | $G_2$ | $B_2$ | C | M | Y | K | $L^*$ | $a^*$ | $b^*$ |
|---|---|---|---|---|---|---|---|---|---|
| 255 | 255 | 255 | 0 | 0 | 0 | 0 | $L^*_W$ | $a^*_W$ | $b^*_W$ |
| $255 \times \frac{9}{10}$ | $255 \times \frac{9}{10}$ | $255 \times \frac{9}{10}$ | | | | | $L^*_W \times \frac{9}{10} + L^*_K \times \frac{1}{10}$ | | |
| | | | | | | | $a^*_W \times \frac{9}{10} + a^*_K \times \frac{1}{10}$ | | |
| | | | | BLANK | | | $b^*_W \times \frac{9}{10} + b^*_K \times \frac{1}{10}$ | | |
| 0 | 0 | 0 | 100 | 100 | 100 | Kmax | $L^*_k$ | $a^*_k$ | $b^*_k$ |

Fig. 30

COLOR CONVERSION DEFINITION CREATING METHOD, PROFILE CREATING METHOD, COLOR CONVERSION DEFINITION CREATING APPARATUS, PROFILE CREATING APPARATUS, COLOR CONVERSION DEFINITION CREATING PROGRAM STORAGE MEDIUM, AND PROFILE CREATING PROGRAM STORAGE MEDIUM

BACKGROUND OF THE INVENTION

1. Field of the Invention

The present invention relates to a color conversion definition creating method of creating a color conversion definition for converting coordinate points in a color reproduction area of a device (for example, a printer) that mediates between an image and image data, in a three-dimensional color space (a RGB color space) wherein R (red), G (green), and B (blue) are established as axes, which depends on the device, into coordinate points in a color reproduction area of a print in a four-dimensional color space (a CMYK color space) wherein C (cyan), M (magenta), Y (yellow), and K (black) for printing are established as axes, a color conversion definition creating apparatus, a color conversion definition creating program storage medium storing a color conversion definition creating program which causes an information processing apparatus such as a computer to operate as the color conversion definition creating apparatus as mentioned above, a profile creating method of creating a profile for coupling mutually different color spaces with one another, a profile creating apparatus, and a profile creating program storage medium storing a profile creating program which causes an information processing apparatus such as a computer to operate as the profile creating apparatus as mentioned above.

2. Description of the Related Art

Hitherto, as an apparatus for applying a good quality of color processing for printing to image data representative of an image, there is known an apparatus that receives CMY data representative of a combination (coordinate points in a CMY color space) of density values of C, M, and Y, and outputs CMY data representative of a combination (coordinate points in a CMYK color space) of dot % of C, M, Y and K (for example, Japanese Patent Reference TokuKai Hei. 9-83824).

This apparatus relates an apparatus for performing processing input CMY data. With respect to such an apparatus, a technology is basically established, while there are proposed various improvements. And there exist many skilled persons who can operate such an apparatus to perform a good quality of color processing (this color processing is referred to as a "setup").

Recently, as technology of a color management has come into wide use, there is mounting necessity that CMYK data for a good quality of printing is obtained in accordance with color data other than CMY data. By way of an example, it happens that there is a need that upon receipt of RGB data representative of a combination (coordinate points in an RGB color space) of values of R, G, and B, there is printed an image that reproduces colors of a printed image obtained through printing by some printer based on the received RGB data.

When the RGB data is converted into the CMYK data, there is a need not only that the RGB data is converted into the CMYK data capable of obtaining the same calorimetric colors, but also that the RGB data is converted into the CMYK data excellent in printability. As a parameter of the printability, there is raised a K-value. When the RGB data is converted into the CMYK data capable of obtaining the same colorimetric colors, it is necessary to determine the K-value in accordance with a printing company and a printing machine (K-plate restraint conditions).

Even if various technologies are used so as to convert the RGB data into CMYK data that is excellent in printability and is the same colors as colorimetric values, a color matching between a color of an image outputted from a specific printer in accordance with the RGB data and a color of an image reproduced in printing is implemented only on an area in which a color reproduction area of the printer is overlapped with a color reproduction area of the printing. And thus, when the color reproduction area of the printer, that is, the outline of the printer profile, is greatly different from the color reproduction area of the printing, that is, the outline of the printing profile, while the outline of the printing profile is usually narrower, it is a problem as to how the color of the color reproduction area of the printer is converted into the color reproduction area of the printing so that an image, which is concerned with a color that is extremely close to the color of the image outputted from the printer in accordance with the RGB data and does not bring about a feeling of wrongness in color tone, is reproduced in printing (this is referred to as a gamut mapping).

With respect to a technology of the gamut mapping, there is proposed an excellent technology (cf. Japanese Patent Reference TokuKai 2001-103329). Japanese Patent Reference TokuKai 2001-103329 discloses a technology in which a direction of the mapping is determined on the device color space (for example, a device-dependence RGB color space) and an actual mapping is performed on the common color space such as an $L^*a^*b^*$ color space. The adoption of this technology makes it possible to cope with both fidelity in colorimetry in vicinity of a gray axis and expression of high coloring in vicinity of a surface of the gamut (a color reproduction area).

However, according to the technology proposed in Japanese Patent Reference TokuKai 2001-103329, the direct use of the technology makes it difficult to perform mapping of the RGB data into CMYK data including a K-value. And thus as disclosed in Japanese Patent Application serial No. 2002-331112 for instance, it is considered that an additional device for dealing with RGB data, which has a color reproduction area that is sufficiently coincident with a color reproduction area of printing, is interposed between input RGB data and CMYK data for printing, so that the gamut mapping according to the technology disclosed in Japanese Patent Reference TokuKai 2001-103329 is carried out between the input RGB data and RGB data of the additional device, and thereafter a color matching taking into consideration K-plate restraint conditions is carried out between the RGB data of the interposed device and the CMYK data for printing. Further, according to the technology of Japanese Patent Application serial No. 2002-331112, there is a need to actually prepare a device having a color reproduction area that is sufficiently coincident with a color reproduction area of printing. And thus according to a technology of Japanese Patent Application serial No. 2002-261174, it is considered that there is performed an operation virtually preparing a device having a color reproduction area that is sufficiently coincident with a color reproduction area of printing, without actually preparing an additional device, so that the gamut mapping is carried out from the input RGB data to RGB data of the virtual device and a color matching is carried out between the RGB data of the virtual device and CMYK data of printing taking into consideration K-plate restraint conditions.

However, according to the technology of Japanese Patent Application serial No. 2002-261174, there is simply prepared for the device having a color reproduction area that is sufficiently coincident with a color reproduction area of printing. But, in the examination of the technology more in detail, the color reproduction area of RGB data, that is, (R,G,B)=(0,0,0)-(255,255,255), is concerned with a regular hexahedron, where the value 255 is the maximum. And when the RGB data is mapped to, for example, the L*a*b* color space, vertexes are eight. To the contrary, in case of CMYK data, there exist black represented by (C,M,Y,K)=(100,100,100,100) where C,M,Y,K represent dot % and the value 100 represents 100% in dot %, that is, the maximum, and in addition, around the black, black of redness, black of greenness, and black of blueness, such as (C,M,Y,K)=(0,100,100,100), (100,0,100,100), (100,100,0,100), respectively. Thus, CMYK data is concerned with many vertexes (generally 11 pieces of vertexes) more than RGB data. Accordingly, in case of a printer that deals with RGB data, it is strictly impossible to implement the same color reproduction area as the color reproduction area of printing. Thus, it is a problem how the difference is harmonized. Further, according to the technology of Japanese Patent Application serial No. 2002-261174, there is simply conceptually prepared a virtual device having a color reproduction area that is sufficiently coincident with a color reproduction area of printing, and there is prepared no specific profile of the virtual device. The profile of the virtual device may cause the adaptation to technology of the gamut mapping proposed in the above-mentioned Japanese Patent Reference TokuKai 2001-103329 to greatly vary. Accordingly, it is also an important problem as to how the profile of the virtual device is specifically defined.

Furthermore, with respect to the K-plate restraint conditions, according to the technology of Japanese Patent Application serial No. 2002-261174, the K-value is determined from the minimum value of C, M, Y, and thus it is possible to obtain a result somewhat satisfied on the gray axis or the vicinity of the gray axis. However, there is such a problem that it is impossible to represent particularly dark color of chroma saturation. It is not sufficient that the K-plate restraint conditions are simply satisfactorily kept. There is such a problem that even if a grey of color tone, in which four plates of CMYK are overlapped with one another, keeps monotone, it is difficult for an operator to accept that when there occurs the inversion of the tone on any of the plates. For this reason, there are needs to well keep the K-plate restraint conditions on the gray axis and in addition to prevent the four plates of CMYK from bringing about the inversion on the gray axis.

SUMMARY OF THE INVENTION

In view of the foregoing, it is an object of the present invention to provide a color conversion definition creating method of creating a color conversion definition for converting coordinate points (RGB data) in a color reproduction area of a device (for example, a printer) that mediates between an image and image data, in an RGB color space, which depends on the device, into coordinate points (CMYK data) in a color reproduction area of a print in a CMYK color space, the CMYK data being capable of obtaining a printed image reproducing a color closely similar to a color of an image in the device dealing with the RGB data, even if the color reproduction area of the device is different from the color reproduction area of printing, a color conversion definition creating apparatus, and a color conversion definition creating program storage medium storing a color conversion definition creating program which causes an information processing apparatus such as a computer to operate as the color conversion definition creating apparatus as mentioned above.

In view of the foregoing, it is another object of the present invention to provide a profile creating method of creating a profile approximating the color reproduction area of printing with great accuracy and free from a tone fault in the gamut mapping, a profile creating apparatus, and a profile creating program storage medium storing a profile creating program which causes an information processing apparatus such as a computer to operate as the profile creating apparatus as mentioned above.

In view of the foregoing, it is still another object of the present invention to provide a profile creating method of creating a link profile for coupling between the RGB data and the CMYK data, which faithfully reflects the K-plate restraint conditions on the gray axis and in vicinity of the gray axis and adapts for expression of colors of high chroma saturation, a profile creating apparatus, and a profile creating program storage medium storing a profile creating program which causes an information processing apparatus such as a computer to operate as the profile creating apparatus as mentioned above.

To achieve the above-mentioned objects, the present invention provides a color conversion definition creating method of creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating method comprising:

a profile creating process of creating a virtual device profile between a predetermined common color space and a second RGB color space depending on a virtual second device that mediates an image and image data, the virtual device profile having a color reproduction area tracing the color reproduction area for printing;

a first color conversion definition creating process of creating a first color conversion definition for converting coordinate points in the color reproduction area of the first device in the first RGB color space into coordinate points in the color reproduction area of the second device in the second RGB color space, using the device profile of the first device and the virtual device profile created in the profile creating process; and a second color conversion definition creating process of creating a second color conversion definition for converting coordinate points in the color reproduction area of the second device in the second RGB color space into coordinate points in the color reproduction area for printing in the CMYK color space.

In the event that a color reproduction area of a device dealing with a RGB color space is greatly different from a color reproduction area of a printing dealing with a CMYK color space, there is proposed hitherto no technology of converting with greater accuracy data (RGB data) representative of coordinate points in the RGB color space to be dealt with by the device into data (CMYK data) representative of coordinate points in the CMYK color space for printing.

According to the color conversion definition creating method of the present invention, the profile creating process creates the virtual device profile having a color reproduction area tracing the color reproduction area for printing. The first color conversion definition creating process creates the first color conversion definition for converting coordinate points in the color reproduction area of the first device in the first RGB color space into coordinate points in the color reproduction area of the second device in the second RGB color space, using the device profile of the first device and the virtual device profile created in the profile creating process. This feature makes it possible to create the first color conversion definition with greater accuracy. The second color conversion definition creating process creates a second color conversion definition for converting coordinate points in the color reproduction area of the second device in the second RGB color space into coordinate points in the color reproduction area for printing in the CMYK color space. A two-step of the first color conversion definition and the second color conversion definition makes it possible to convert coordinate points of the first RGB color space depending on the first device into coordinate points (CMYK data) in the CMYK color space, which is capable of obtaining a printed image that is extremely close to the color of the image to be dealt with by the first device. It is noted that the two-step of color conversion definition (the first color conversion definition and the second color conversion definition) is concerned with the processes of creating the color conversion definition, and thus it is acceptable that two the first color conversion definition and the second color conversion definition are combined into one color conversion definition.

In the color conversion definition creating method of the present invention as mentioned above, the profile creating process comprises a color reproduction area definition process in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param} < K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

When the color reproduction area of the second device is defined, with respect to edge lines other than edge lines from R, G and B to K, the color reproduction area for printing is faithfully traced, and with respect to the edge lines from R, G and B to K, an inconsistency as to the difference of the number of vertexes is "well" absorbed in the manner as mentioned above. This feature makes it possible to solve the inconsistency and also define the color reproduction area that is substantially coincident with the color reproduction area for printing.

An establishment of $K_{param} < K_{max}$ makes it possible to prevent the tone of the K-plate from being reverted in the vicinity of the gray axis, and thereby suppressing the reversion of the tones of the plates of C, M and Y in the vicinity of the gray axis.

In the color conversion definition creating method according to the present invention as mentioned above, it is preferable that the profile creating process further comprises:

an edge line profile creating process in which there is created an edge line profile that associates coordinate points in the second RGB color space with coordinate points in the common color space, with respect to the edge lines of the color reproduction area of the second device, in such a manner that when pluralities of dots are determined at even intervals on an arbitrary one side that defines the color reproduction area of the second device in the second RGB color space to map the pluralities of dots onto the common color space, the pluralities of dots mapped on the common color space are disposed on the edge line associated with the arbitrary one side, of the edge lines defining the color reproduction area of the second device defined in the color reproduction area definition process, and are also disposed at even intervals;

a gray axis profile creating process in which there is created a gray axis profile that associates coordinate points in the second RGB color space with coordinate points in the common color space, with respect to the gray axis of the color reproduction area of the second device, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process in which there are computed a profile of a surface other than the edge lines of the color reproduction area of the second device and a profile of the interior other than the gray axis, through an interpolation operation taking as boundary conditions both the edge line profile created in the edge line profile creating process and the gray axis profile created in the gray axis profile creating process.

As mentioned above, according to the present invention, in the edge line profile creating process and the gray axis profile creating process, there are re-arranged coordinate points on the edge lines of the common color space to the coordinate points on the edge lines of the second RGB space so that a plurality of points on the edge lines and a plurality of points on the gray axis are disposed at even intervals (here, the even intervals property is referred to as "RGB value linear"), and coordinate points on the gray axis are determined. And then in the profile computing process, there are computed a profile of a surface other than the edge lines of the color reproduction area of the second device and a profile of the interior other than the gray axis, through an interpolation operation taking as boundary conditions both the edge line profile created in the edge line profile creating process and the gray axis profile created in the gray axis profile creating process. This feature makes it possible to enhance an adaptation to the gamut mapping technology disclosed in Japanese Patent Reference TokuKai 2001-103329, and thereby performing gamut mapping with greater accuracy.

In the color conversion definition creating method according to the present invention as mentioned above, it is preferable that the second color conversion definition creating process comprises:

a K-value definition process in which there are determined K-values on points on the gray axis of the color reproduction area of the second device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space;

a K-value computing process in which there are computed K-values of the points of a surface other than the edge lines of the color reproduction area of the second device and the points of the interior other than the gray axis, through an interpolation operation taking as boundary conditions the K-values on the points on the gray axis and the points on the edge lines wherein stronger weight is applied to the points on the gray axis as compared with the points on the edge lines; and a K-value restraint conditions utilization process in which there is created a link profile throughout the color reproduction area of the second device by referring to the printing profile taking as restraint conditions K-values throughout the color reproduction area of the second device, the K-values comprising the K-values defined in the K-value definition process and the K-values computed in the K-value computing process.

In the K-value definition process, there are determined K-values on points on the gray axis of the color reproduction area of the second device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space. This feature makes it possible to faithfully keep the K-plate restraint conditions on the gray axis and suppress the value of K in the vicinity of a surface of the color reproduction area, and thereby representing a high chroma saturation of color.

Further, in the K-value computing process, there are computed K-values of the points of a surface other than the edge lines of the color reproduction area of the second device and the points of the interior other than the gray axis, through an interpolation operation taking as boundary conditions the K-values on the points on the gray axis and the points on the edge lines wherein stronger weight is applied to the points on the gray axis as compared with the points on the edge lines. This feature makes it possible to keep the K-plate restraint conditions in the vicinity of gray axis as well as on the gray axis, and also possible to maintain the K-plate restraint conditions on the gray axis of the first printer too, even if there is a discrepancy in gray axis between the real first printer and the virtual second printer.

To achieve the above-mentioned objects, the present invention provides a first profile creating method of creating a virtual device profile between a predetermined common color space and a RGB color space depending on a virtual device that mediates an image and image data, the virtual device profile having a color reproduction area tracing the color reproduction area for printing, the profile creating method comprising:

a color reproduction area definition process in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value. $K_{param}$, they swerve away from the respective edge lines to construct edge lines up to (C, M, Y, K)=(100, 100, 100, $K_{max}$), which is the vertex of K.

According to the first profile creating method, when the color reproduction area of the device is defined, with respect to edge lines other than edge lines from R, G and B to K, the color reproduction area for printing is faithfully traced, and with respect to the edge lines from R, G and B to K, an inconsistency as to the difference of the number of vertexes is "well" absorbed in the manner as mentioned above. This feature makes it possible to solve the inconsistency and also create a profile having the color reproduction area that is substantially coincident with the color reproduction area for printing.

In the first profile creating method according to the present invention as mentioned above, it is preferable that the profile creating method further comprises:

an edge line profile creating process in which there is created an edge line profile that associates coordinate points in the RGB color space with coordinate points in the common color space, with respect to the edge lines of the color reproduction area of the device, in such a manner that when pluralities of dots are determined at even intervals on an arbitrary one side that defines the color reproduction area of the device in the RGB color space to map the pluralities of dots onto the common color space, the pluralities of dots mapped on the common color space are disposed on the edge line associated with the arbitrary one side, of the edge lines defining the color reproduction area of the device defined in the color reproduction area definition process, and are also disposed at even intervals;

a gray axis profile creating process in which there is created a gray axis profile that associates coordinate points in the RGB color space with coordinate points in the common color space, with respect to the gray axis of the color reproduction area of the device, in such a manner that when pluralities of dots are determined at even intervals on a gray axis connecting two vertexes of W and K with one another in the color reproduction area of the device in the RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process in which there are computed a profile of a surface other than the edge lines of the color reproduction area of the device and a profile of the interior other than the gray axis, through an interpolation operation taking as boundary conditions both the edge line profile created in the edge line profile creating process and the gray axis profile created in the gray axis profile creating process.

As mentioned above, according to the present invention, in the edge line profile creating process and the gray axis profile creating process, coordinate points on the edge lines of the common color space to the coordinate points on the edge lines of the RGB space are re-arranged so that "RGB value linear" is provided, and coordinate points on the gray axis are determined. And then in the profile computing process, there are computed a profile of a surface other than the edge lines of the color reproduction area of the device and a profile of the interior other than the gray axis, through an interpolation operation taking as boundary conditions both the edge line profile created in the edge line profile creating process and the gray axis profile created in the gray axis profile creating process. This feature makes it possible to create a profile that is high in an adaptation to the gamut mapping technology disclosed in Japanese Patent Reference TokuKai 2001-103329.

To achieve the above-mentioned objects, the present invention provides a second profile creating method of creating a link profile for converting coordinate points in a color reproduction area of a device that mediates between an image and image data, in a RGB color space, which depends on the device, into coordinate points in a color reproduction area of a print in a CMYK color space for printing, the profile creating method comprising:

a K-value definition process in which there are determined K-values on points on the gray axis of the color reproduction area of the device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space;

a K-value computing process in which there are computed K-values of the points of a surface other than the edge lines of the color reproduction area of the device and the points of the interior other than the gray axis, through an interpolation operation taking as boundary conditions the K-values on the points on the gray axis and the points on the edge lines wherein stronger weight is applied to the points on the gray axis as compared with the points on the edge lines; and a K-value restraint conditions utilization process in which there is created a link profile throughout the color reproduction area of the device by referring to the printing profile taking as restraint conditions K-values throughout the color reproduction area of the device, the K-values comprising the K-values defined in the K-value definition process and the K-values computed in the K-value computing process.

According to the second profile creating method, with respect to the gray axis there is adopted a K-value that is determined by K-plate restraint conditions for printing. This feature makes it possible to faithfully keep the K-plate restraint conditions.

According to the second profile creating method, with respect to the edge lines there is adopted the minimum K-value within the available range in definition of the coordinate points on the CMYK color space. This feature makes it possible to express a fine color.

Further, in the K-value computing process, there are computed K-values of the points of a surface other than the edge lines of the color reproduction area of the second device and the points of the interior other than the gray axis, through an interpolation operation taking as boundary conditions the K-values on the points on the gray axis and the points on the edge lines wherein stronger weight is applied to the points on the gray axis as compared with the points on the edge lines. This feature makes it possible to keep the K-plate restraint conditions in the vicinity of gray axis as well as on the gray axis, and also possible to maintain the K-plate restraint conditions on the gray axis of the first printer too, even if there is a discrepancy in gray axis between the real first printer and the virtual second printer.

To achieve the above-mentioned objects, the present invention provides a color conversion definition creating apparatus that creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a profile creating section for creating a virtual device profile between a predetermined common color space and a second RGB color space depending on a virtual second device that mediates an image and image data, the virtual device profile having a color reproduction area tracing the color reproduction area for printing;

a first color conversion definition creating section for creating a first color conversion definition for converting coordinate points in the color reproduction area of the first device in the first RGB color space into coordinate points in the color reproduction area of the second device in the second RGB color space, using the device profile of the first device and the virtual device profile created in the profile creating section; and a second color conversion definition creating section for creating a second color conversion definition for converting coordinate points in the color reproduction area of the second device in the second RGB color space into coordinate points in the color reproduction area for printing in the CMYK color space, wherein the profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the second device, when they start from the respective vertexes of R, G and B, up to Kparam (Kparam<Kmax) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value Kparam, they swerve away from the respective edge lines to construct edge lines up to (C, M, Y, K)=(100, 100, 100, Kmax), which is the vertex of K.

It is noted that the color conversion definition creating apparatus of the present invention includes all aspects of implementing the above-mentioned various aspects of the color conversion definition creating method of the present invention.

To achieve the above-mentioned objects, the present invention provides a first profile creating apparatus that creates a virtual device profile between a predetermined common color space and a RGB color space depending on a virtual device that mediates an image and image data, the virtual device profile having a color reproduction area tracing the color reproduction area for printing, the profile creating apparatus comprising:

a color reproduction area definition section in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the second device, when they start from the respective vertexes of R, G and B, up to Kparam (Kparam<Kmax) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value Kparam, they swerve away from the respective edge lines to construct edge lines up to (C, M, Y, K)=(100, 100, 100, Kmax), which is the vertex of K.

It is noted that the first profile creating apparatus of the present invention includes all aspects of implementing the above-mentioned various aspects of the first profile creating method of the present invention.

To achieve the above-mentioned objects, the present invention provides a second profile creating apparatus that creates a link profile for converting coordinate points in a color reproduction area of a device that mediates between an image and image data, in a RGB color space, which depends on the device, into coordinate points in a color reproduction area of a print in a CMYK color space for printing, the profile creating method comprising:

a K-value definition process in which there are determined K-values on points on the gray axis of the color reproduction area of the device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space;

a K-value computing process in which there are computed K-values of the points of a surface other than the edge lines of the color reproduction area of the device and the points of the interior other than the gray axis, through an interpolation operation taking as boundary conditions the K-values on the points on the gray axis and the points on the edge lines wherein stronger weight is applied to the points on the gray axis as compared with the points on the edge lines; and a K-value restraint conditions utilization process in which there is created a link profile throughout the color reproduction area of the device by referring to the printing profile taking as restraint conditions K-values throughout the color reproduction area of the device, the K-values comprising the K-values defined in the K-value definition process and the K-values computed in the K-value computing process.

To achieve the above-mentioned objects, the present invention provides a color conversion definition creating program storage medium storing a color conversion definition creating program which causes an information processing apparatus to operate as a color conversion definition creating apparatus, when the color conversion definition creating program is executed in the information processing apparatus, wherein the color conversion definition creating apparatus creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a profile creating section for creating a virtual device profile between a predetermined common color space and a second RGB color space depending on a virtual second device that mediates an image and image data, the virtual device profile having a color reproduction area tracing the color reproduction area for printing;

a first color conversion definition creating section for creating a first color conversion definition for converting coordinate points in the color reproduction area of the first device in the first RGB color space into coordinate points in the color reproduction area of the second device in the second RGB color space, using the device profile of the first device and the virtual device profile created in the profile creating section; and a second color conversion definition creating section for creating a second color conversion definition for converting coordinate points in the color reproduction area of the second device in the second RGB color space into coordinate points in the color reproduction area for printing in the CMYK color space, wherein the profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the second device, when they start from the respective vertexes of R, G and B, up to Kparam (Kparam<Kmax) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value Kparam , they swerve away from the respective edge lines to construct edge lines up to (C, M, Y, K)=(100, 100, 100, Kmax), which is the vertex of K.

It is noted that the color conversion definition creating program stored in the color conversion definition creating program storage medium of the present invention includes all aspects of implementing the above-mentioned various aspects of the color conversion definition creating method of the present invention and the color conversion definition creating apparatus of the present invention.

To achieve the above-mentioned objects, the present invention provides a first profile creating program storage medium storing a first profile creating program which causes an information processing apparatus to operate as a profile creating apparatus, when the profile creating program is executed in the information processing apparatus, wherein the profile creating apparatus creates a virtual device profile between a predetermined common color space and a RGB color space depending on a virtual device that mediates an image and image data, the virtual device profile having a color reproduction area tracing the color reproduction area for printing, the profile creating apparatus comprising:

a color reproduction area definition section in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the second device, when they start from the respective vertexes of R, G and B, up to Kparam (Kparam<Kmax) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value Kparam, they swerve away from the respective edge lines to construct edge lines up to (C, M, Y, K)=(100, 100, 100, Kmax), which is the vertex of K.

It is noted that the first profile creating program stored in the first profile creating program storage medium of the present invention includes all aspects of implementing the above-mentioned various aspects of the first profile creating method of the present invention and the first profile creating apparatus of the present invention.

Further, to achieve the above-mentioned objects, the present invention provides a second profile creating program storage medium storing a second profile creating program which causes an information processing apparatus to operate as a profile creating apparatus, when the profile creating program is executed in the information processing apparatus, wherein the profile creating apparatus creates a link profile for converting coordinate points in a color reproduction area of a device that mediates between an image and image data, in a RGB color space, which depends on the device, into coordinate points in a color reproduction area of a print in a CMYK color space for printing, the profile creating method comprising:

a K-value definition process in which there are determined K-values on points on the gray axis of the color reproduction area of the device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space;

a K-value computing process in which there are computed K-values of the points of a surface other than the edge lines of the color reproduction area of the device and the points of the interior other than the gray axis, through an interpolation operation taking as boundary conditions the K-values on the points on the gray axis and the points on the edge lines wherein stronger weight is applied to the points on the gray axis as compared with the points on the edge lines; and a K-value restraint conditions utilization process in which there is created a link profile throughout the color reproduction area of the device by referring to the printing profile taking as restraint conditions K-values throughout the color reproduction area of the device, the K-values comprising the K-values defined in the K-value definition process and the K-values computed in the K-value computing process.

BRIEF DESCRIPTION OF THE DRAWINGS

FIG. 20 is a view showing tables defining edge lines connecting W and C, and edge lines connecting C and G.

FIG. 21 is a view showing tables defining edge lines connecting W and C, and edge lines connecting C and G.

FIG. 29 is a view showing a table defining edge lines connecting W and C after re-association.

FIG. 30 is a view showing a table representative of a gray-axis profile.

DETAILED DESCRIPTION OF PREFERRED EMBODIMENTS

Embodiments of the present invention will be described with reference to the accompanying drawings.

Figure 1:
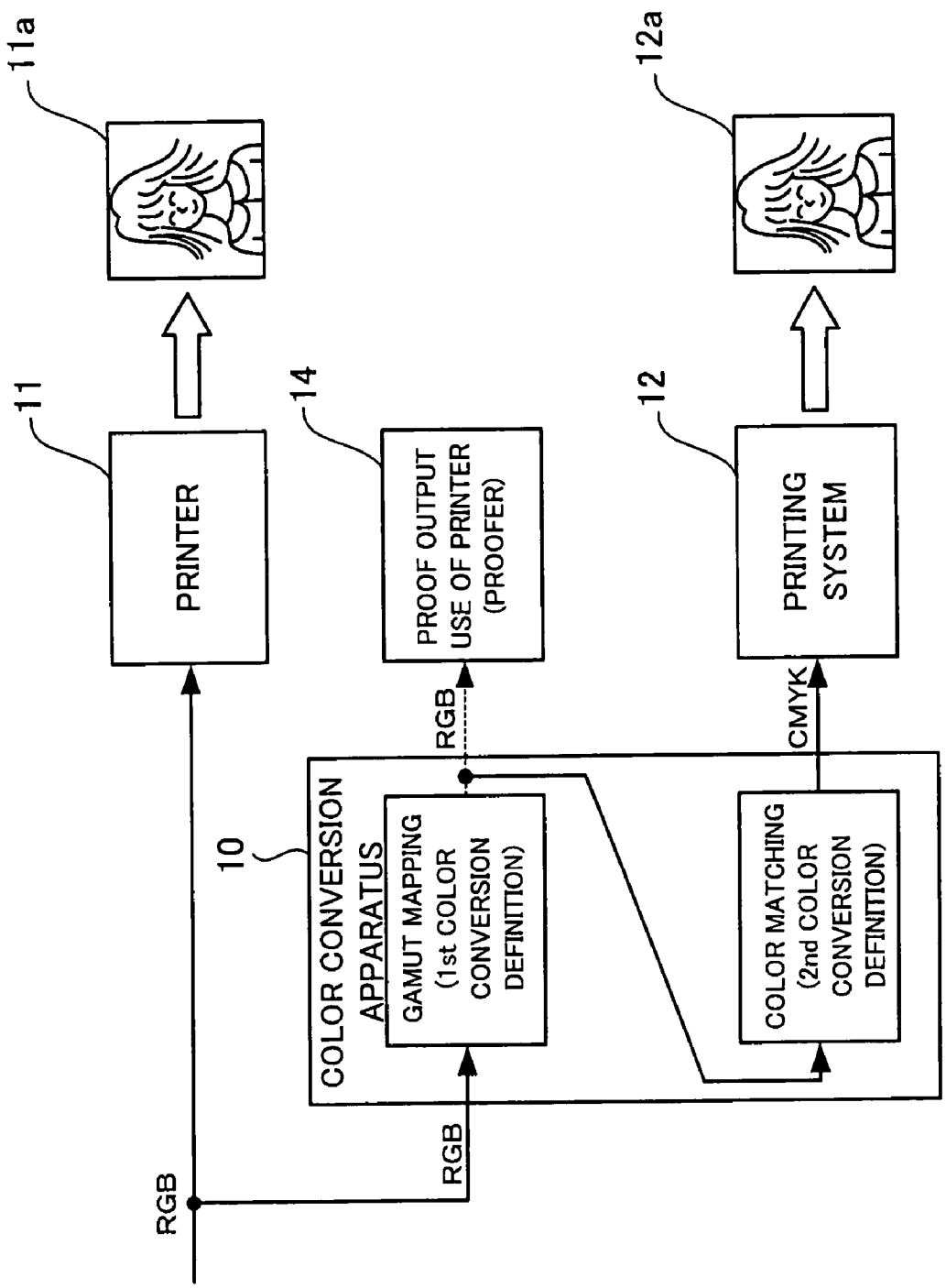
FIG. 1 is a view of a system wherein a color conversion definition, which is created in accordance with the present invention, is adopted.

FIG. 1 is a view of a system wherein a color conversion definition, which is created in accordance with the present invention, is adopted. First, there will be explained the background of the present invention.

A printer 11 receives RGB data representative of an image and outputs a printed image 11a based on the entered RGB data. Here, it is intended that a printed image 12a, in which the same color as the printed image 11a is reproduced, is created. In this case, the RGB data is fed to a color conversion apparatus 10. While details of the color conversion apparatus 10 will be described later, the color conversion apparatus 10 stores a first color conversion definition for converting RGB data of input side (RGB data suitable for the printer 11) into RGB data suitable for a virtual proof-output use of printer (a proofer) 14, and a second color conversion definition for converting RGB data after conversion using the first color conversion definition into CMYK for printing, the first color conversion definition and the second color conversion definition being created beforehand in accordance with an embodiment of the present invention, which will be described later. The color conversion apparatus 10 performs a color conversion in accordance with the first color conversion definition (this is referred as the gamut mapping) and also performs a color conversion in accordance with the second color conversion definition (this is referred as the color matching), so that the RGB data of input side is converted into the CMYK data for printing. Incidentally, here, for the sake of convenience, the color conversion according to the first color conversion definition (that is, the gamut mapping) and the color conversion according to the second color conversion definition (that is the color matching) are separately performed. However, actually, when the RGB data of input side is converted into the CMYK data for printing, in order to perform the color conversion at high speed, the first color conversion definition is combined with the second color conversion definition to create a single color conversion, so that the RGB data of input side is converted into the CMYK data for printing in accordance with the combined single color conversion.

The thus created CMYK data is fed to a printing system 12. The printing system 12 creates a film original plate in accordance with the CMYK data for instance, and creates a machine plate in accordance with the film original plate to perform a printing, so that the printed image 12a is created.

When the printing system 12 is used to create the printed image 12a, it happens that a previous confirmation is carried out, for the purpose of a prediction of the finish of the printed image 12a, prior to obtaining the printed image 12a through printing by the printing system 12, since the printing system 12 is a large scale system. In this case, it is general that a proofer, which is capable of printing out a proof image that is closely similar to the printed image 12a in color, is used to perform the previous confirmation, and thus the printed image 12a is created upon previous confirmation of the finish of the printed image 12a through the proof image.

To the contrary, according to the embodiments of the present invention, which will be described later, instead of the actual proofer to be used for the previous confirmation of the printed image 12a, there is imagined the virtual proofer 14 of which the color reproduction area is sufficiently coincident with the color reproduction area of the printing system 12, and the above-mentioned first color conversion definition is for converting the RGB data of input side into RGB data suitable for the virtual proofer 14. The virtual proofer 14 is defined by a color reproduction property (a proofer profile) that is created so that the color reproduction area is sufficiently coincident with the color reproduction area of the printing system 12. The method of creating the proofer profile will be described later.

It is noted that the "proper" conversion of the RGB data of input side into the CMYK data by the color conversion apparatus 10 makes it possible that the printed image 12a has the same color as the printed image 11a in impression.

In order that the color conversion apparatus 10 "properly" converts the RGB data of input side into the CMYK data, in view of the difference between the color reproduction property (a printer profile) of the printer 11 and the color reproduction property (a printing profile) of the printing system 12, it is necessary not only to implement a "well" color conversion, but also that the CMYK data obtained through the color conversion is data that is suitable for the printing system 12, that is, data that has an aptitude for printing.

When it is intended to create a color conversion definition for converting RGB data into CMYK data representative of the same color as the RGB data on a colorimetric basis in accordance with the color reproduction property (a printer profile) of the printer 11 and the color reproduction property (a printing profile) of the printing system 12, there is raised such a problem that it is unequivocally impossible to convert the RGB data into the CMYK data, by a reason that while the RGB data is concerned with three variables of R, G and B, the CMYK data is concerned with four variables of C, M, Y and K, and thus many CMYK data representative of the same color as the RGB data on a colorimetric basis exist to one RGB data. Further, there is raised such a problem that simply selecting an arbitrary one from among many CMYK data which are the same on a colorimetric basis does not secure that the CMYK data, which has an aptitude for printing, is selected.

On the other hand, in the event that RGB data is converted into data (CMY data) representative of CMY, such as block CMY and the like, and the CMY data is converted into CMYK data through inputting the CMY data to a color conversion apparatus adjusted by a person skilled in the art so as to adapt to the printing system 12, it is possible to obtain CMYK data having an aptitude for printing for the printing system 12. In this case, however, it is not ensured that the RGB data is converted into CMYK data representative of the same color as the original RGB data. Thus, there is raised such a problem that the RGB data is inadvertently converted into CMYK data representative of colors involved in "taste" of the person who perform the color adjustment and the printing company.

Further, as mentioned above, there is the difference between the color reproduction property (a printer profile) of the printer 11 and the color reproduction property (a printing profile) of the printing system 12, and there is a need to "well" absorb the difference.

Hereinafter, there will be described a technology of creating color conversion definitions (first color conversion definition and second color conversion definition) capable of converting RGB data (coordinate points in an RGB color space) for a printer, which is suitable for the printer 11, into CMYK data (coordinate points in a CMYK color space) having an aptitude for printing for the printing system 12 and being capable of creating a printed image, which is closely in color in impression coincident with the printed image 11a that is obtained through printing output by the printer 11 according to the RGB data even if the color reproduction property (a printer profile) of the printer 11 is different from the color reproduction property (a printing profile) of the printing system 12, wherein the color conversion definitions are set up in the color conversion apparatus 10 shown in FIG. 1.

Figure 2:
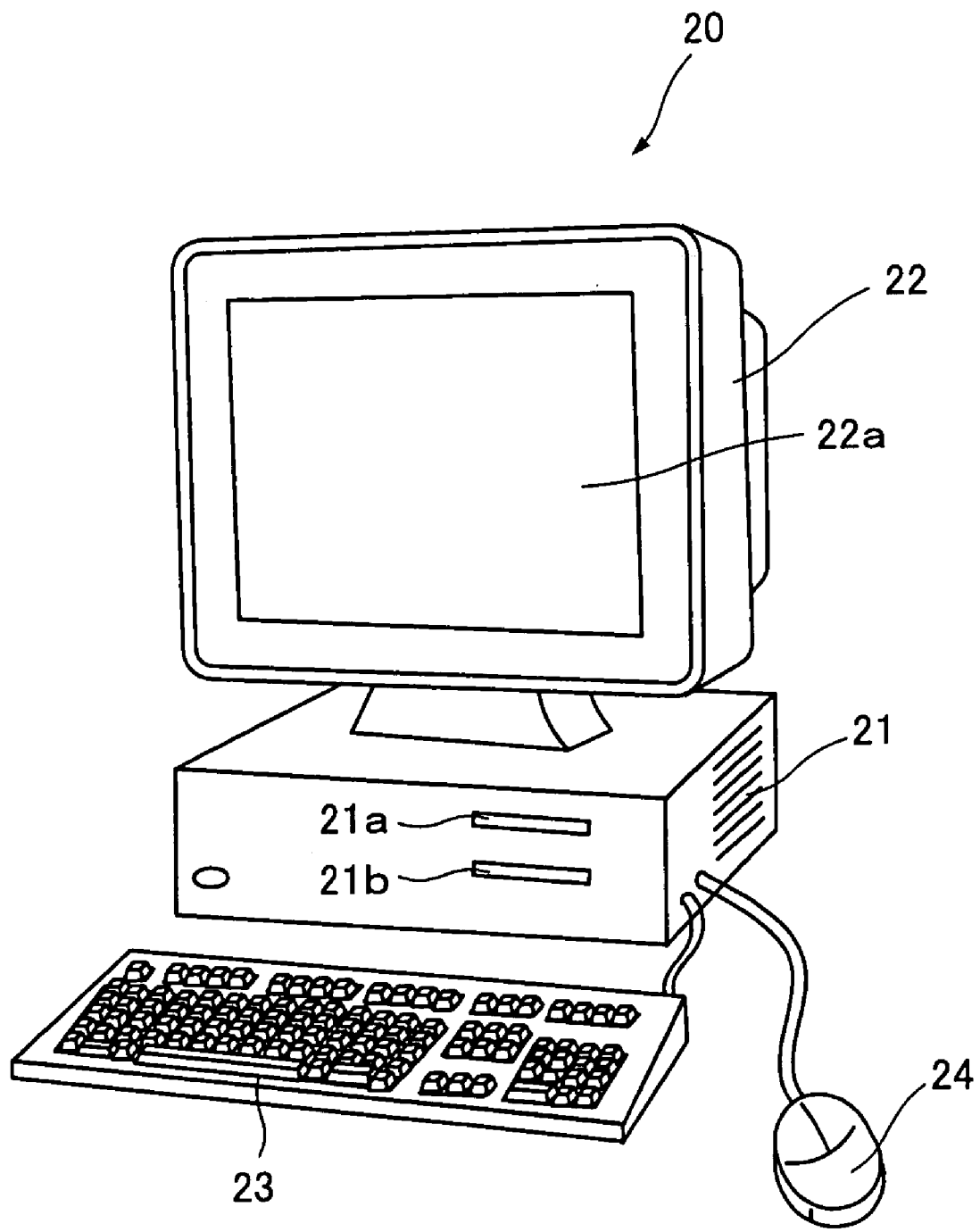
FIG. 2 is a perspective view of a personal computer constituting an embodiment of a color conversion definition creating apparatus of the present invention.
Figure 3:
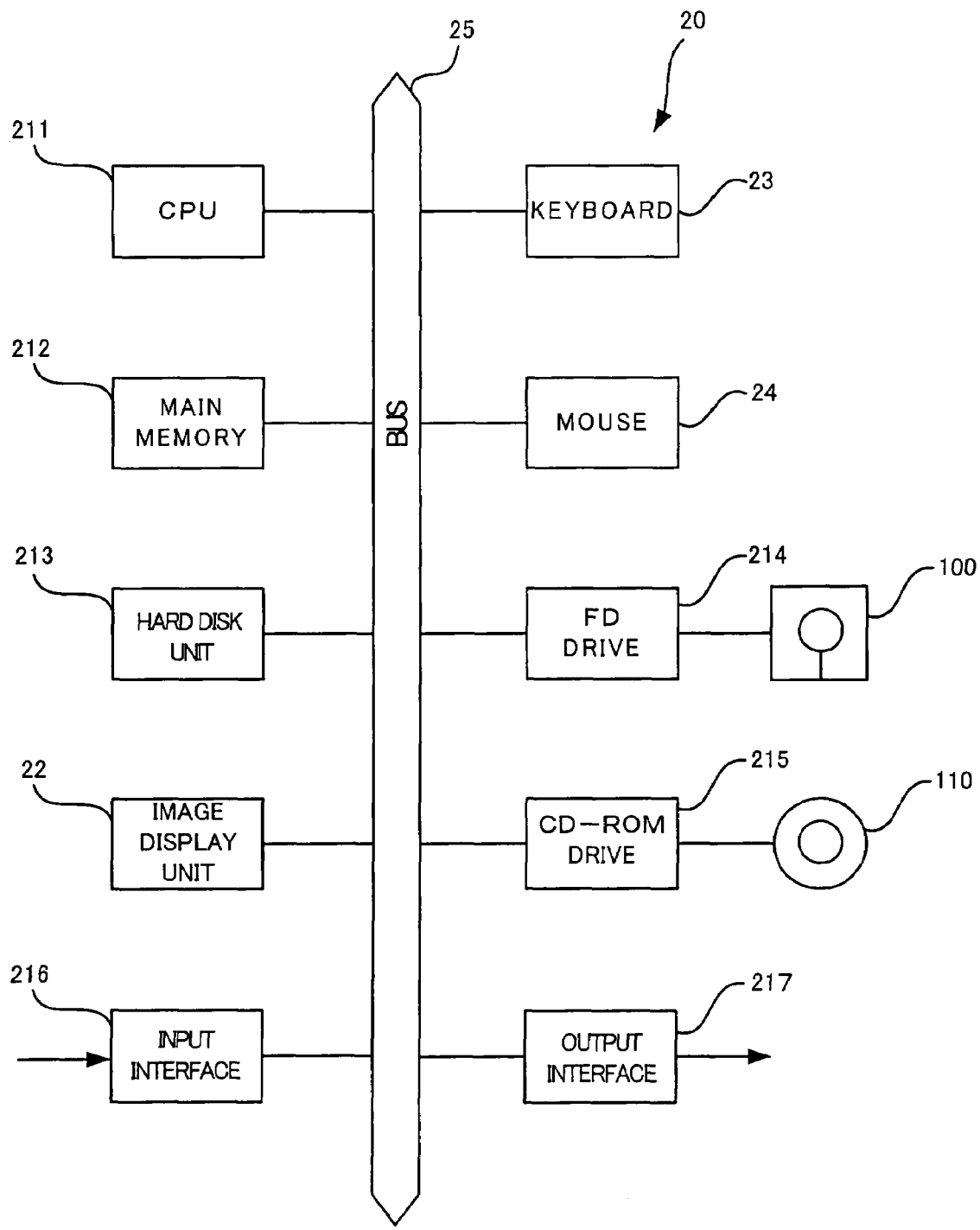
FIG. 3 is a hardware structural view of the personal computer.

FIG. 2 is a perspective view of a personal computer constituting an embodiment of a color conversion definition creating apparatus of the present invention. FIG. 3 is a hardware structural view of the personal computer. A color conversion definition creating apparatus of the present embodiment includes an embodiment of a profile creating apparatus of the present invention.

An embodiment of a color conversion definition creating apparatus of the present invention (including an embodiment of a profile creating apparatus of the present invention) comprises hardware and OS (an operation system) of a personal computer 20 and a color conversion definition creating program (including a profile creating program) to be executed in the personal computer 20.

It is noted that the color conversion apparatus 10 shown in FIG. 1 may also be implemented on the personal computer 20, and according to the present embodiment, the personal computer 20 shown in FIG. 2 and FIG. 3, which constitutes the color conversion definition creating apparatus of the present embodiment, also serves as the color conversion apparatus 10 shown in FIG. 1 on a hardware basis. However, it is acceptable that the personal computer, which constitutes the color conversion definition creating apparatus, is a personal computer that is different from the personal computer constituting the color conversion apparatus 10 shown in FIG. 1, and a color conversion definition, which is created by the color conversion definition creating apparatus, is installed in the color conversion apparatus 10 shown in FIG. 1.

Hereinafter, first, there will be explained the hardware of the personal computer 20 shown in FIG. 2 and FIG. 3, and then there will be explained an embodiment of a color conversion definition creating method, which is implemented using the personal computer 20.

The personal computer 20 comprises, as shown in FIG. 2, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a flexible disk mounting slot 21a for mounting a flexible disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, a flexible disk drive 214 for accessing a flexible disk 100 mounted thereon, a CD-ROM drive 215 for accessing a CD-ROM 110 mounted thereon, an input interface 216 that receives RGB data from the exterior, where the personal computer 20 serves as the color conversion apparatus 10 shown in FIG. 1, and an output interface 217 that transmits CMYK data to the printing system 12. These various types of elements are connected via a bus 25 to the image display unit 22, the keyboard 23 and the mouse 24.

The CD-ROM 110 stores therein a color conversion definition creating program for causing the personal computer 20 to operate as a color conversion definition creating apparatus of the present invention. The CD-ROM 110 is mounted on the CD-ROM drive 215 so that the color conversion definition creating program, which is stored in the CD-ROM 110, is up-loaded on the personal computer 20 and is stored in the hard disk unit 213.

Figure 4:
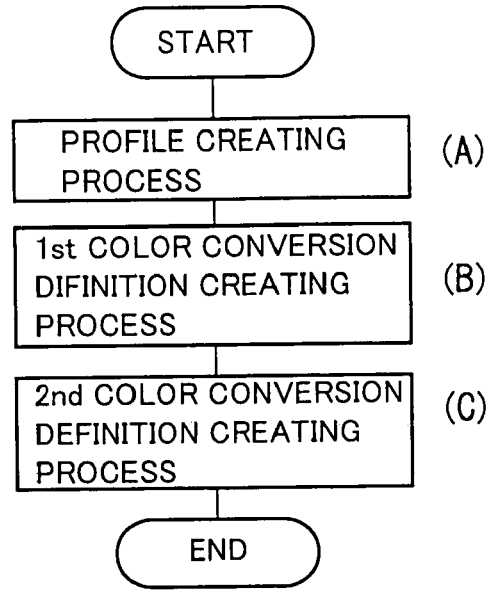
FIG. 4 is a flowchart useful for understanding an embodiment of a color conversion definition creating method of the present invention.

FIG. 4 is a flowchart useful for understanding an embodiment of a color conversion definition creating method of the present invention.

This color conversion definition creating method is of creating a color conversion definition for converting coordinate points of a color reproduction area of a first device (here, the printer 11 in FIG. 1) for mediating between an image and image data in a first RGB color space depending on the first device into coordinate points of a color reproduction area of printing in the CMYK color space for printing in the printing system 12 shown in FIG. 1. This color conversion definition creating method comprise: a profile creating process (a step (A)) of creating a virtual device profile (a proofer profile) between a predetermined common color space (here L*a*b* color space) and a second RGB color space depending on a virtual second device (for example, the proofer 14 shown in FIG. 1) that mediates an image and image data, the virtual device profile, that is, the proofer profile, having a color reproduction area tracing the color reproduction area for printing; a first color conversion definition creating process (a step (B)) of creating a first color conversion definition for converting coordinate points in the color reproduction area of the first device (the printer 11) in the first RGB color space into coordinate points in the color reproduction area of the second device (the proofer 14) in the second RGB color space, using the device profile (the printer profile) of the first device (the printer 11) and the virtual device profile (a proofer profile) created in the profile creating process (the step (A)); and a second color conversion definition creating process (a step (C)) of creating a second color conversion definition for converting coordinate points in the color reproduction area of the second device (the proofer 14) in the second RGB color space into coordinate points in the color reproduction area for printing in the CMYK color space.

Details of the color conversion definition creating method shown in FIG. 4 will be described later.

Figure 5:
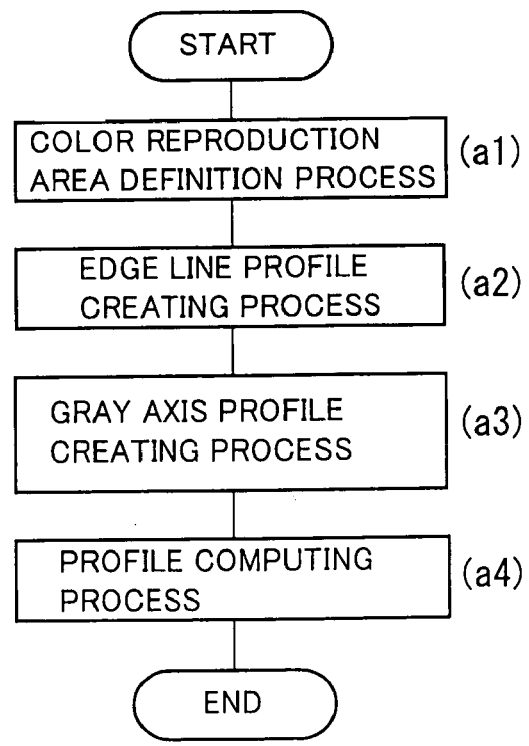
FIG. 5 is a flowchart useful for understanding an embodiment of a first profile creating method of the profile creating methods of the present invention.

FIG. 5 is a flowchart useful for understanding an embodiment of a first profile creating method of the profile creating methods of the present invention. The flowchart of FIG. 5 shows an embodiment of the first profile creating method of the present invention when it is executed independently. And in the embodiment of the color conversion definition creating method shown in FIG. 4, the flowchart of FIG. 5 corresponds to the detailed flow of the step (A).

The first profile creating method (the profile creating process of the step (A) in FIG. 4) as the embodiment shown in FIG. 5 is a profile creating method of creating a virtual device profile (a proofer profile) between a predetermined common color space (here L*a*b* color space) and an RGB color space (the second RGB color space) depending on a virtual device (the proofer 14 shown in FIG. 1) that mediates an image and image data, the virtual device profile, that is, the proofer profile, having a color reproduction area tracing the color reproduction area for printing. The first profile creating method comprises a color reproduction area definition process (a step (a1)), an edge line profile creating process (a step (a2)), a gray axis profile creating process (a step (a3)), and a profile computing process (a step (a4)).

According to the color reproduction area definition process of the step (a1), the color reproduction area of the device (the proofer 14) is defined in such a manner that vertexes of W, C, M, Y, R, G, B of the color reproduction area of the device (the proofer 14) are coincident with vertexes of associated W, C, M, Y, R, G, B of the color reproduction area for printing, respectively, and edge lines for connecting the vertexes of W, C, M, Y, R, G, B of the color reproduction area of the device (the proofer 14) with one another are coincident with the associated edge lines of the color reproduction area for printing, respectively, and with respect to the vertex of K of the color reproduction area of the device (the proofer 14), the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the device (the proofer 14), when they start from the respective vertexes of R, G and B, up to Kparam (Kparam<Kmax) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value Kparam, they swerve away from the respective edge lines to construct edge lines up to (C, M, Y, K)=(100, 100, 100, Kmax), which is the vertex of K.

According to the edge line profile creating process of the step (a2), there is created an edge line profile that associates coordinate points in the RGB color space (the second RGB color space) with coordinate points in the common color space, with respect to the edge lines of the color reproduction area of the device (the proofer 14), in such a manner that when pluralities of dots are determined at even intervals on an arbitrary one side that defines the color reproduction area of the device (the proofer 14) in the RGB color space (the second RGB color space) to map the pluralities of dots onto the common color space (here L*a*b* color space), the pluralities of dots mapped on the common color space are disposed on the edge line associated with the arbitrary one side, of the edge lines defining the color reproduction area of the device (the proofer 14) defined in the color reproduction area definition process of the step (a1), and are also disposed at even intervals.

According to the gray axis profile creating process of the step (a3), there is created a gray axis profile that associates coordinate points in the RGB color space (the second RGB color space) with coordinate points in the common color space, with respect to the gray axis of the color reproduction area of the device (the proofer 14), in such a manner that when pluralities of dots are determined at even intervals on a gray axis connecting two vertexes of W and K with one another in the color reproduction area of the device (the proofer 14) in the RGB color space (the second RGB color space) to map the pluralities of dots onto the common color space, the pluralities of dots mapped on the common color space are disposed on the gray axis connecting two vertexes of W and K with one another defined in the color reproduction area definition process of the step (a1), and are also disposed at even intervals.

According to the profile computing process of the step (a4), there are computed a profile of a surface other than the edge lines of the color reproduction area of the device (the proofer 14) and a profile of the interior other than the gray axis, through an interpolation operation taking as boundary conditions both the edge line profile created in the edge line profile creating process of the step (a2) and the gray axis profile created in the gray axis profile creating process of the step (a3).

Detailed explanation for the first profile creating method shown in FIG. 5, that is, the profile creating process of the step (A) in FIG. 4, will also be made later.

Figure 6:
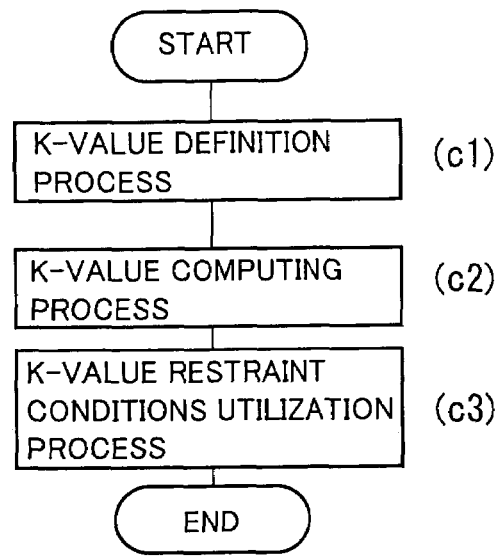
FIG. 6 is a flowchart useful for understanding an embodiment of a second profile creating method of the profile creating methods of the present invention.

FIG. 6 is a flowchart useful for understanding an embodiment of a second profile creating method of the profile creating methods of the present invention. The flowchart shown in FIG. 6 shows an embodiment of the second profile creating method of the present invention when it is executed independently. And in the embodiment of the color conversion definition creating method shown in FIG. 4, the flowchart of FIG. 6 corresponds to the detailed flow of the step (C) too.

The second profile creating method (the second color conversion definition creating process of the step (C) in FIG. 4) as the embodiment shown in FIG. 6 is a profile creating method of creating a link profile for converting coordinate points in the color reproduction area of the device (the proofer 14 shown in FIG. 1) in an RGB color space (the second RGB color space) depending on the device (the proofer 14 shown in FIG. 1) that mediates an image and image data into coordinate points in the color reproduction area for printing in a CMYK color space for printing. The second profile creating method comprises a K-value definition process (a step (c1)), a K-value computing process (a step (c2)), and a K-value restraint conditions utilization process (a step (c3)).

According to the K-value definition process of the step (c1), there are determined K-values on points on the gray axis of the color reproduction area of the device (the proofer 14) and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space.

According to the K-value computing process of the step (c2), there are computed K-values of the points of a surface other than the edge lines of the color reproduction area of the device (the proofer 14) and the points of the interior other than the gray axis, through an interpolation operation taking as boundary conditions the K-values on the points on the gray axis and the points on the edge lines wherein stronger weight is applied to the points on the gray axis as compared with the points on the edge lines.

According to the K-value restraint conditions utilization process of the step (c3), there is created a link profile throughout the color reproduction area of the device (the proofer 14) by referring to the printing profile taking as restraint conditions K-values throughout the color reproduction area of the device (the proofer 14), the K-values comprising the K-values defined in the K-value definition process of the step (c1) and the K-values computed in the K-value computing process of the step (c2).

Detailed explanation for the second profile creating method shown in FIG. 6, that is, the second color conversion definition creating process of the step (C) in FIG. 4, will also be made later.

The color conversion definition creating method (including the first profile creating method and the second profile creating method, which are shown in FIG. 5 and FIG. 6, respectively) shown in FIG. 4 is implemented when a color conversion definition creating program related to the present invention is installed and executed in the personal computer 20 shown in FIG. 2 and FIG. 3.

Figure 7:
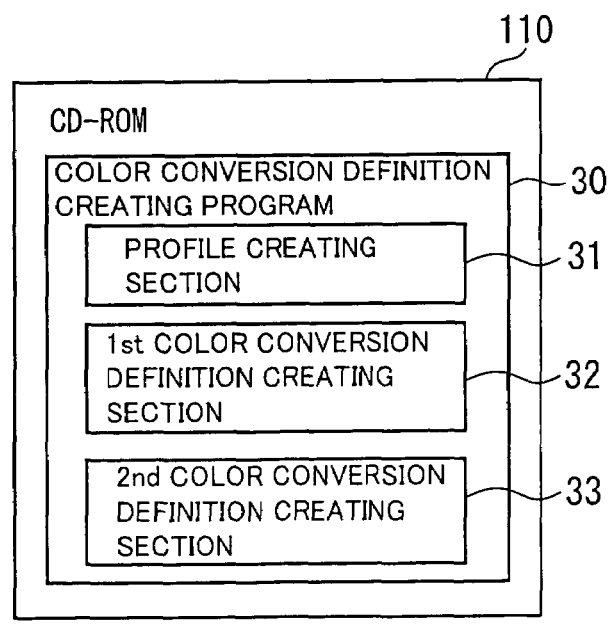
FIG. 7 is a typical structural view useful for understanding an embodiment of a color conversion definition creating program stored in a color conversion definition creating program storage medium of the present invention.

FIG. 7 is a typical structural view useful for understanding an embodiment of a color conversion definition creating program stored in a color conversion definition creating program storage medium of the present invention.

A color conversion definition creating program 30 shown in FIG. 7, which is stored in the CD-ROM 110 that is also shown in FIG. 3, causes the personal computer 20 shown in FIG. 3 to operate as a color conversion definition creating apparatus that creates a color conversion definition for converting coordinate points in a color reproduction area of a first device (the printer 11) that mediates between an image and image data, in a first RGB color space, which depends on the first device, into coordinate points in a color reproduction area of a print in a CMYK color space for printing, when the color conversion definition creating program is installed from the CD-ROM 110 into the personal computer 20 shown in FIG. 2 and FIG. 3 and executed in the personal computer 20. The color conversion definition creating program 30 comprises a profile creating section 31, a first color conversion definition creating section 32, and a second color conversion definition creating section 33.

The profile creating section 31, the first color conversion definition creating section 32, and the second color conversion definition creating section 33 serve as program parts which cause the personal computer 20 shown in FIG. 2 and FIG. 3 to implement the profile creating process of the step (A), the first color conversion definition creating process of the step (B), and the second color conversion definition creating process of the step (C), of the color conversion definition creating method shown in FIG. 4, when the color conversion definition creating program 30 shown in FIG. 7 is installed in the personal computer 20 and is executed. Detailed explanation for the profile creating section 31, the first color conversion definition creating section 32, and the second color conversion definition creating section 33 will be made later.

Figure 8:
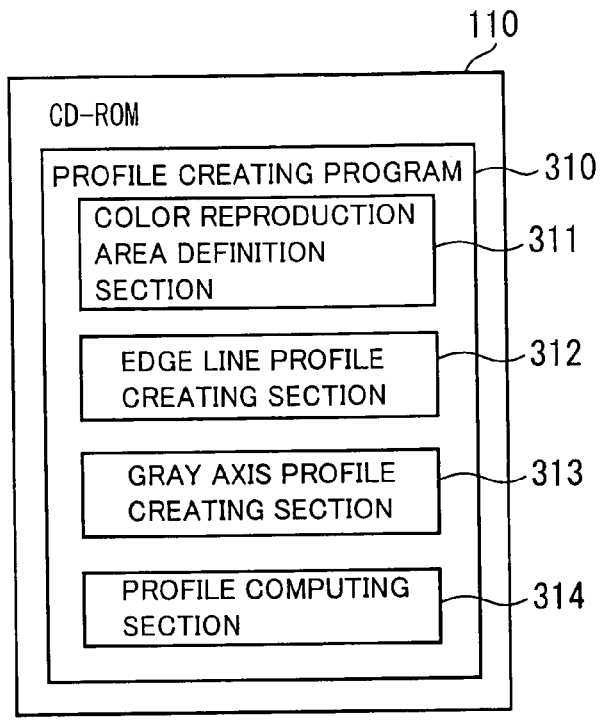
FIG. 8 is a typical structural view useful for understanding an embodiment of a first profile creating program stored in a first profile creating program storage medium of the present invention.

FIG. 8 is a typical structural view useful for understanding an embodiment of a first profile creating program stored in a first profile creating program storage medium of the present invention. In FIG. 8, the CD-ROM 110 independently stores a profile creating program 310. It is noted that the profile creating section 31 of the color conversion definition creating program 30 shown in FIG. 7 has the same structure as the profile creating program 310 in FIG. 8.

The profile creating program 310 shown in FIG. 8 causes the personal computer 20 shown in FIG. 2 and FIG. 3 to operate as a profile creating apparatus for creating a virtual device profile (a proofer profile) between a predetermined common color space and an RGB color space (the second RGB color space) depending on a virtual device (the proofer 14 shown in FIG. 1) that mediates an image and image data, when the profile creating program 310 is installed into the personal computer 20 shown in FIG. 2 and FIG. 3 and executed in the personal computer 20, the virtual device profile, that is, the proofer profile, having a color reproduction area tracing the color reproduction area for printing. The profile creating program 310 comprises a color reproduction area definition section 311, an edge line profile creating section 312, a gray axis profile creating section 313, and a profile computing section 314.

The color reproduction area definition section 311, the edge line profile creating section 312, the gray axis profile creating section 313, and the profile computing section 314 serve as program parts which cause the personal computer 20 shown in FIG. 2 and FIG. 3 to implement the color reproduction area definition process of the step (a1), the edge line profile creating process of the step (a2), the gray axis profile creating process of the step (a3), and the profile computing process of the step (a4), of the first profile creating method shown in FIG. 5, when the profile creating program 310 shown in FIG. 8 is installed in the personal computer 20 and is executed. The color reproduction area definition section 311, the edge line profile creating section 312, the gray axis profile creating section 313, and the profile computing section 314 also serve as program parts which implement the profile creating process of the step (A) of the color conversion definition creating method in FIG. 4 in its entirety. Detailed explanation for the color reproduction area definition section 311, the edge line profile creating section 312, the gray axis profile creating section 313, and the profile computing section 314 will be made later.

Figure 9:
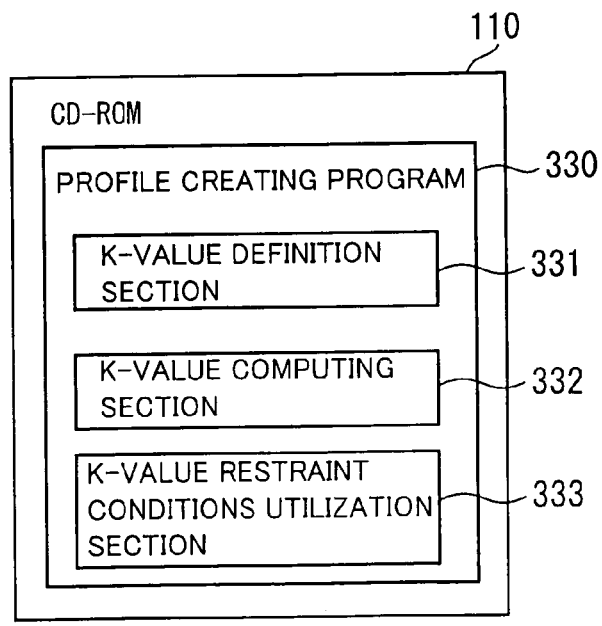
FIG. 9 is a typical structural view useful for understanding an embodiment of a second profile creating program stored in a second profile creating program storage medium of the present invention.

FIG. 9 is a typical structural view useful for understanding an embodiment of a second profile creating program stored in a second profile creating program storage medium of the present invention. In FIG. 9, the CD-ROM 110 independently stores a profile creating program 330. It is noted that the second color conversion definition creating section 33 of the color conversion definition creating program 30 shown in FIG. 7 has the same structure as the profile creating program 330 in FIG. 9.

The profile creating program 330 shown in FIG. 9 causes the personal computer 20 shown in FIG. 2 and FIG. 3 to operate as a profile creating apparatus for creating a link profile for converting coordinate points in a color reproduction area of a device (the proofer 14 in FIG. 1) that mediates between an image and image data, in a RGB color space (the second RGB color space), which depends on the device (the proofer 14 in FIG. 1), into coordinate points in a color reproduction area of a print in a CMYK color space for printing, when the profile creating program 330 is installed into the personal computer 20 shown in FIG. 2 and FIG. 3 and executed in the personal computer 20. The profile creating program 330 comprises a K-value definition section 331, a K-value computing section 332, and a K-value restraint conditions utilization section 333.

The K-value definition section 331, the K-value computing section 332, and the K-value restraint conditions utilization section 333 serve as program parts which cause the personal computer 20 shown in FIG. 2 and FIG. 3 to implement the K-value definition process of the step (c1), the K-value computing process of the step (c2), and the K-value restraint conditions utilization process of the step (c3), of the second profile creating method shown in FIG. 6, when the profile creating program 330 shown in FIG. 9 is installed in the personal computer 20 and is executed. The K-value definition section 331, the K-value computing section 332, and the K-value restraint conditions utilization section 333 also serve as program parts which implement the second color conversion definition creating process of the step (C) of the color conversion definition creating method in FIG. 4 in its entirety. Detailed explanation for the K-value definition section 331, the K-value computing section 332, and the K-value restraint conditions utilization section 333 will be made later.

Figure 10:
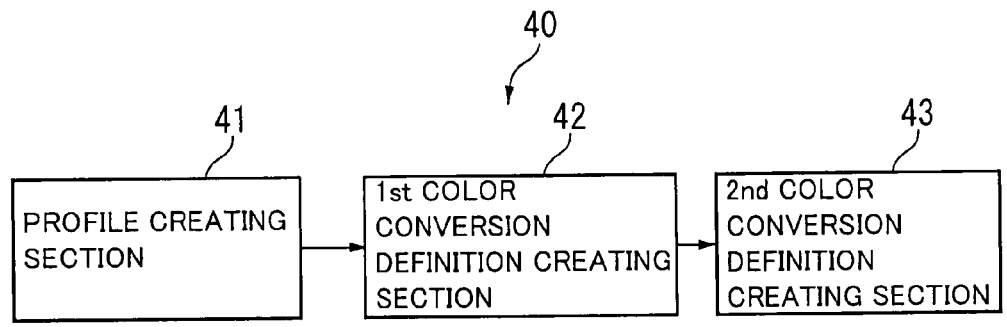
FIG. 10 is a functional structural view useful for understanding an embodiment of a color conversion definition creating apparatus of the present invention.

FIG. 10 is a functional structural view useful for understanding an embodiment of a color conversion definition creating apparatus of the present invention.

A color conversion definition creating apparatus 40 shown in FIG. 10 is constructed in the personal computer 20 shown in FIG. 2 and FIG. 3 when the color conversion definition creating program 30 shown in FIG. 7 is installed from the CD-ROM 110 shown in FIG. 7 into the personal computer 20 and executed in the personal computer 20. The color conversion definition creating apparatus 40 comprises a profile creating section 41, a first color conversion definition creating section 42, and a second color conversion definition creating section 43. The profile creating section 41, the first color conversion definition creating section 42, and the second color conversion definition creating section 43 are implemented when the profile creating section 31, the first color conversion definition creating section 32, and the second color conversion definition creating section 33, of the color conversion definition creating program 30 shown in FIG. 7 are executed in the personal computer 20. Detailed explanation of those sections will be made later.

Figure 11:
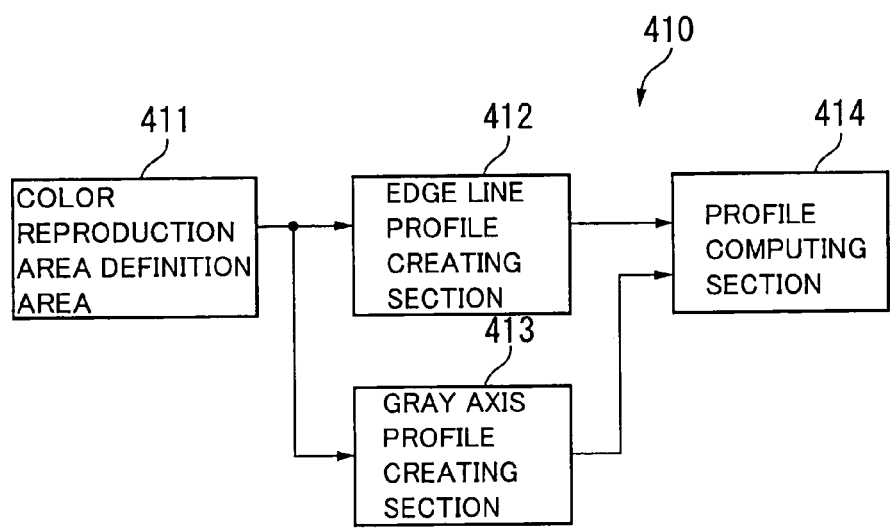
FIG. 11 is a functional structural view useful for understanding an embodiment of a first profile creating apparatus.

FIG. 11 is a functional structural view useful for understanding an embodiment of a first profile creating apparatus.

A profile creating apparatus 410 shown in FIG. 11 is constructed in the personal computer 20 shown in FIG. 2 and FIG. 3 when the profile creating program 310 shown in FIG. 8 is installed from the CD-ROM 110 shown in FIG. 8 into the personal computer 20 and executed in the personal computer 20. The profile creating apparatus 410 comprises a color reproduction area definition section 411, an edge line profile creating section 412, a gray axis profile creating section 413, and a profile computing section 414. The color reproduction area definition section 411, the edge line profile creating section 412, the gray axis profile creating section 413, and the profile computing section 414 are implemented when the color reproduction area definition section 311, the edge line profile creating section 312, the gray axis profile creating section 313, and the profile computing section 314, of the profile creating program 310 shown in FIG. 8, are executed in the personal computer 20. The profile creating section 41 of the color conversion definition creating apparatus 40 shown in FIG. 10 has the same structure as the profile creating apparatus 410 in FIG. 11. Detailed explanation of those sections will be made later.

Figure 12:
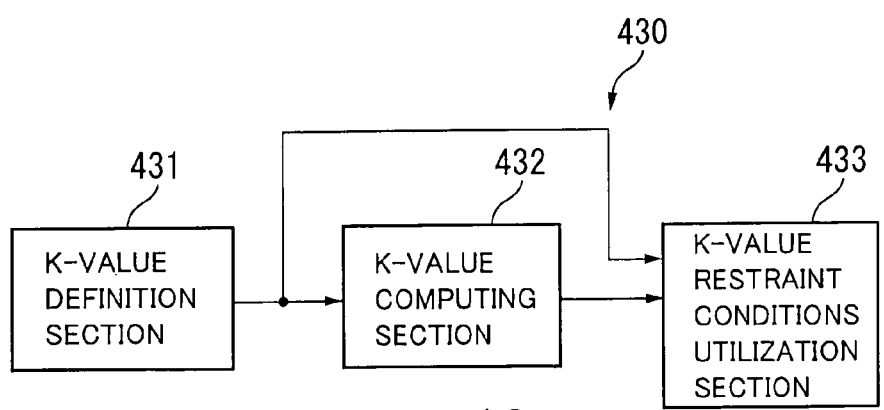
FIG. 12 is a functional structural view useful for understanding an embodiment of a second profile creating apparatus.

FIG. 12 is a functional structural view useful for understanding an embodiment of a second profile creating apparatus.

A profile creating apparatus 430 shown in FIG. 12 is constructed in the personal computer 20 shown in FIG. 2 and FIG. 3 when the profile creating program 330 shown in FIG. 9 is installed from the CD-ROM 110 shown in FIG. 9 into the personal computer 20 and executed in the personal computer 20. The profile creating apparatus 430 comprises a K-value definition section 431, a K-value computing section 432, and a K-value restraint conditions utilization section 433. The K-value definition section 431, the K-value computing section 432, and the K-value restraint conditions utilization section 433 are implemented when the K-value definition section 331, the K-value computing section 332, and the K-value restraint conditions utilization section 333, of the profile creating program 330 shown in FIG. 9, are executed in the personal computer 20. The second color conversion definition creating section 43 of the color conversion definition creating apparatus 40 shown in FIG. 10 has the same structure as the profile creating apparatus 430 in FIG. 12.

Hereinafter, there will be explained together the color conversion definition creating method shown in FIG. 4, the color conversion definition creating program 30 shown in FIG. 7, and the color conversion definition creating apparatus 40 shown in FIG. 10, and there will be separately explained more in detail the profile creating process (the profile creating section 31 in FIG. 7, and the profile creating section 41 in FIG. 10) of the step (A) in FIG. 4, the first color conversion definition creating process (the first color conversion definition creating section 32 in FIG. 7, and the first color conversion definition creating section 42 in FIG. 10) of the step (B) in FIG. 4, and the second color conversion definition creating process (the second color conversion definition creating section 33 in FIG. 7, and the second color conversion definition creating section 43 in FIG. 10) of the step (C) in FIG. 4. Further, there will be described more in detail the profile creating method of FIG. 5 (the profile creating program 310 in FIG. 8, and the profile creating apparatus 410 in FIG. 11), and the profile creating method of FIG. 6 (the profile creating program 330 in FIG. 9, and the profile creating apparatus 430 in FIG. 12).

Hereinafter, the explanation of the present invention will be made with reference to the color conversion definition creating method and the profile creating method of FIG. 4 to FIG. 6. It is noted that the explanation for those methods is applicable also to the program and the apparatus.

Here, on condition that the color conversion definition creating method of FIG. 4 is implemented, it is assumed that a printer profile, a printing profile, and K-plate restraint conditions, which will be described later, are already obtained.

Figure 13:
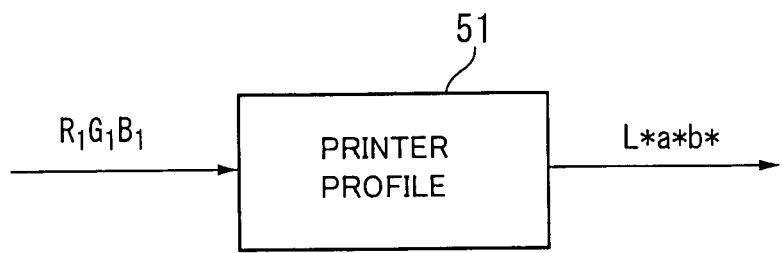
FIG. 13 is a conceptual view of a printer profile.

FIG. 13 is a conceptual view of a printer profile.

A printer profile 51 shown in FIG. 13 is a profile for the printer 11 shown in FIG. 1. The printer profile 51 associates RGB data (here, it is noted as $R_1G_1B_1$ for the purpose of the later distinction), which is fed to the printer 11, with colors (here, L*a*b* values) on the image 11a to be printed out from the printer 11. Here, the printer profile 51 is available in form of LUT (look up table).

With respect to a method of creating the printer profile 51, colorimetric values (L*a*b* values) of color patches are obtained in such a manner that $R_1G_1B_1$ data, which is obtained when $R_1$, $G_1$ and $B_1$ are varied, is fed to the printer 11 to print out a color chart consisting of a large number of color patches, so that the color patches constituting the color chart are measured by a calorimeter. Basically, the association of the input $R_1G_1B_1$ values with the colorimetric values (L*a*b* values) thus obtained is the printer profile 51. A method of creating the printer profile 51 is well known and thus the detailed explanation will be omitted.

Figure 14:
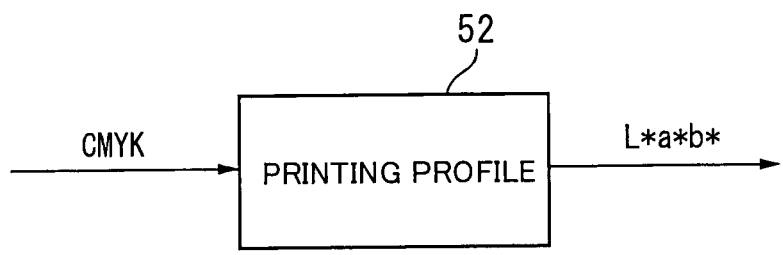
FIG. 14 is a conceptual view of a printing profile.

FIG. 14 is a conceptual view of a printing profile.

A printing profile 52 shown in FIG. 14 is a profile of the printing system 12 shown in FIG. 1. And in a similar fashion to that of the printer profile 51 shown in FIG. 13, the printing profile 52 associates CMYK data fed to the printing system 12 with colors (here, L*a*b* values) on the image 12a on the printed matter printed by the printing system 12. The printing profile 52 is also available in form of LUT (look up table). A method of creating the printing profile 52 is principally also similar to the method of creating the printer profile 51, and it is well known and thus the detailed explanation will be omitted.

The printing profile 52 is not coincident with the printer profile 51 in the color reproduction area, and has such characteristics that the color reproduction area of the printing profile 52 is narrower as compared with the printer profile 51 of a printer that prints a proof sample of printing. While the printer profile 51 in FIG. 13 is a profile (LUT) that associates three-dimensional data of $R_1G_1B_1$ with three-dimensional data of L*a*b* (LUT), the printing profile 52 in FIG. 14 is a profile (LUT) that associates four-dimensional data of CMYK with three-dimensional data of L*a*b* (LUT).

Figure 15:
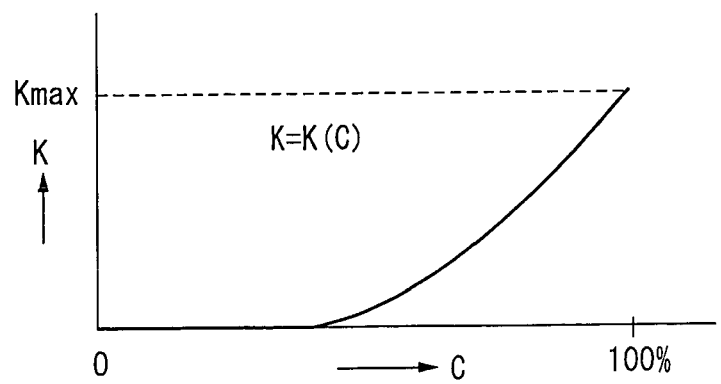
FIG. 15 is a view useful for understanding K-plate restraint conditions shown by way of example.

FIG. 15 is a view useful for understanding K-plate restraint conditions shown by way of example.

According to the example shown here, the K-value is defined in form of a function (K=K(C)) in which a value of C (cyan) is variable. For example, as shown in FIG. 15, in an area wherein a value of C is small, K=0, and in an area wherein the value of C is over a certain value, it is a function wherein K is monotonously increased. The K-plate restraint condition is determined in accordance with way of thinking and taste for printing of the printing company. And with respect to the gray axis, it is requested to faithfully keep the K-plate restraint condition.

Figure 16:
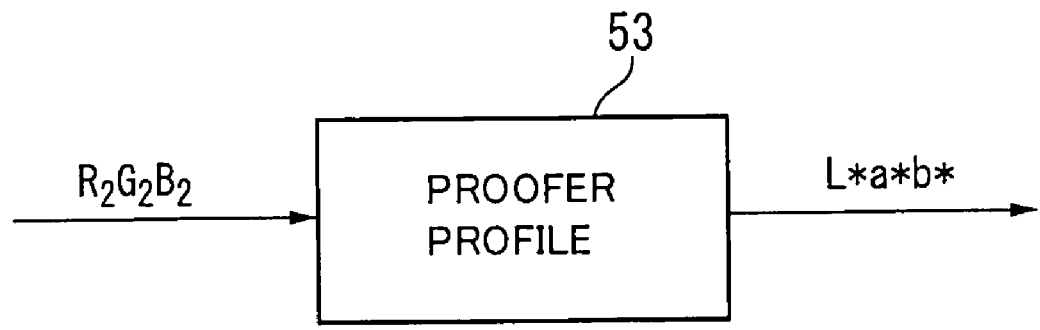
FIG. 16 is a conceptual view of a proofer profile that is a profile created in the profile creating process of the step (A) of the color conversion definition creating method of FIG. 4.

FIG. 16 is a conceptual view of a proofer profile that is a profile created in the profile creating process of the step (A) of the color conversion definition creating method of FIG. 4.

A proofer profile 53 shown in FIG. 16 is a profile for the proofer 14, which is a virtual printer, as shown in FIG. 1. The proofer profile 53 is a LUT that associates RGB data (here, it is noted as $R_2G_2B_2$ for the purpose of distinction from the RGB data to be entered into the printer 11 shown in FIG. 1), which is fed to the proofer 14, with colors (here, L*a*b* values) on the image to be printed out from the proofer 14. The proofer profile 53 is a profile for the virtual proofer 14, and is theoretically created in the manner as will be described hereinafter. The process of creating the proofer profile 53 is also an embodiment of the first profile creating method of the present invention as shown in FIG. 5.

Figure 17:
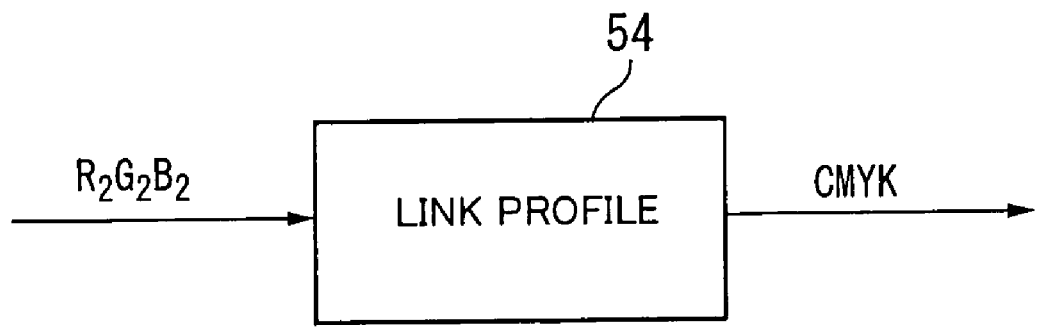
FIG. 17 is a conceptual view of a link profile that is a profile created in the second color conversion definition creating process of the step (C) of the color conversion definition creating method of FIG. 4.

FIG. 17 is a conceptual view of a link profile that is a profile created in the second color conversion definition creating process of the step (C) of the color conversion definition creating method of FIG. 4.

A link profile 54 shown in FIG. 17 corresponds to a second color conversion definition of the color conversion definition creating method of the present invention. The link profile 54 is a LUT that indicates an association between $R_2G_2B_2$ values, that is, values of RGB data to be entered into the proofer 14 in FIG. 1, and CMYK values, that is, values of CMYK data to be entered into the printing system 12 in FIG. 1. The process of creating the link profile 54 is also an embodiment of the second profile creating method of the present invention as shown in FIG. 6.

According to the profile creating process of the step (A) of the color conversion definition creating method of FIG. 4, there is created the proofer profile 53 shown in FIG. 16 when the color reproduction area definition process (the step (a1)), the edge line profile creating process (the step (a2)), the gray axis profile creating process (the step (a3)), and the profile computing process (the step (a4)), of the profile creating method in FIG. 5, are sequentially executed. Detailed explanation will be made hereinafter.

According to the color reproduction area definition process (the step (a1)), with respect to vertexes of W (white), C (cyan), M (magenta), Y (yellow), R (red), G (green), and B (blue), of the color reproduction area of the proofer 14 in FIG. 1, that is, vertexes excepting K (black), are coincident with vertexes of the associated W, C, M, Y, R, G, and B, of the color reproduction area of printing, respectively, and edge lines connecting the vertexes of W, C, M, Y, R, G, and B, of the color reproduction area of the proofer 14 with one another are coincident with the associated edge lines of the color reproduction area of printing, respectively.

Further, according to the color reproduction area definition process (the step (a1)), the color reproduction area of the proofer 14 is defined in such a manner that with respect to the vertex of K(black) of the color reproduction area of the proofer 14, the vertex of K is coincident with points (C, M, Y, K)=(100, 100, 100, Kmax) adopting the maximum value Kmax of K of K-plate restraint conditions for printing, and with respect to the way between the vertex of K and the respective vertexes of R, G and B of the color reproduction area of the proofer 14, when they start from the respective vertexes of R, G and B, up to the mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and thereafter they swerve away from the respective edge lines to construct edge lines up to (C, M, Y, K)=(100, 100, 100, Kmax), which is the vertex of K. Vertexes and edge lines in the color reproduction area of printing, and positions on the L*a*b* color space associated with the points (C, M, Y, K) can be determined in accordance with the printing profile shown in FIG. 14.

First, there will be described the color reproduction area of printing with reference to the figures.

Figure 18:
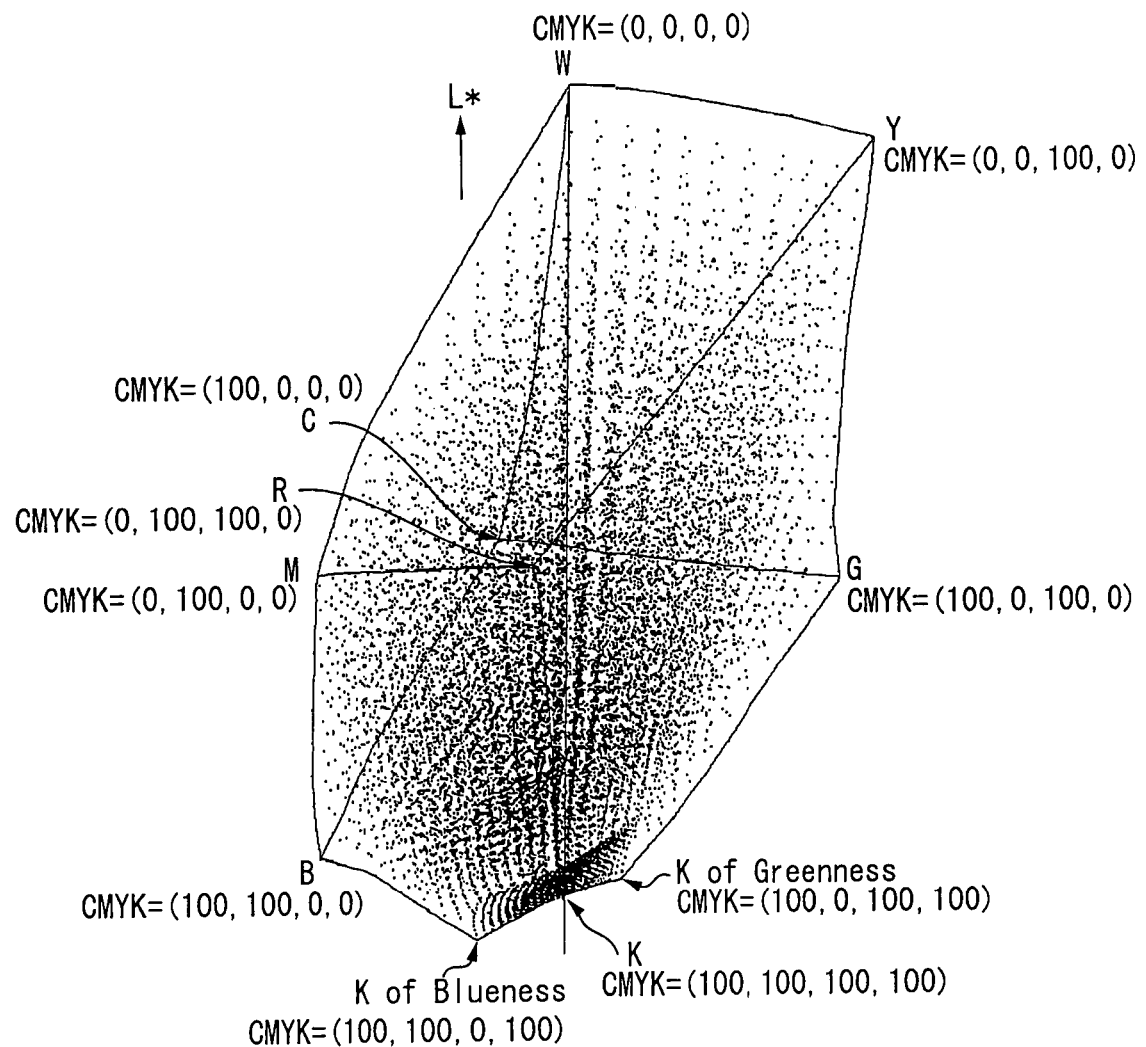
FIG. 18 is a view useful for understanding a color reproduction area of printing shown by way of example.
Figure 19:
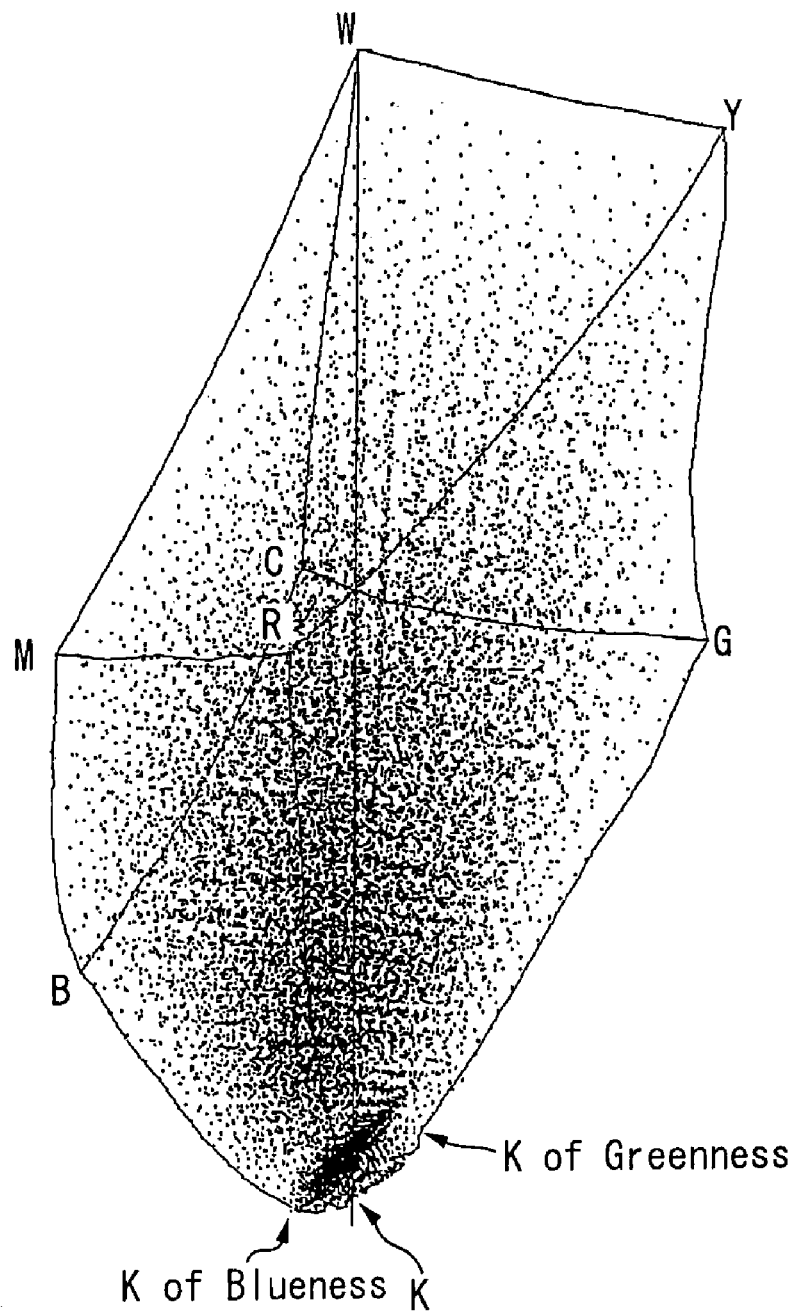
FIG. 19 is a view useful for understanding a color reproduction area of printing shown by way of example.

FIG. 18 and FIG. 19 are each a view useful for understanding a color reproduction area of printing shown by way of example.

FIG. 18 and FIG. 19 can be conceptually determined in accordance with the printing profile 52 shown in FIG. 14, but actually determined in accordance with a different type of printing profile which is different in the internal definition (an association between CMYK and L*a*b*).

FIG. 18 and FIG. 19 show each a color reproduction area of printing on the L*a*b* color space. In those figures, dots denote lattice points of the LUT which defines the printing profile, and solid lines surrounding the dots denote edge lines that connect vertexes with one another.

Each of the color reproduction areas of printing of FIG. 18 and FIG. 19 has a "squashed" configuration. Vertexes of W, C, M, Y, R, G and B are each established by one, but in vicinity of K there are concentrated some vertexes as well as vertexes (C, M, Y, K)=(100, 100, 100, 100).

According to the color reproduction area definition process (the step (a1) of FIG. 5), first, the vertex (the white point) of W in the color reproduction area of the proofer 14, that is, $(R_2, G_2, B_2)$=(255, 255, 255) (here the value 255 is the maximum value in the color reproduction area of the proofer 14 in the $R_2G_2B_2$ color space), is associated with a paper color of the printed matter, that is, (C, M, Y, K)=(0, 0, 0, 0).

As the vertex (the black point) of K in the color reproduction area of the proofer 14, that is, $(R_2, G_2, B_2)$=(0, 0, 0) (here the value 0 is the minimum value in the color reproduction area of the proofer 14 in the $R_2G_2B_2$ color space), in the manner as mentioned above, there is adopted the point (C, M, Y, K)=(100, 100, 100, $K_{max}$) that is determined from the maximum value $K_{max}$ in the K-plate restraint condition K=K (C) shown in FIG. 15.

Vertexes other than W and K, that is, vertexes of C, M, Y, R, G and B, are coincident with vertexes C, M, Y, R, G and B in the color reproduction area for printing on the L*a*b* color space. Further, three edge lines connecting W to C, M and Y, and six edge lines connecting C to G and B, M to B and R, and Y to R and G, that is, nine edge lines excepting three edge lines connecting R, G and B with K, are also coincident with the associated edge lines in the color reproduction area for printing on the L*a*b* color space.

FIG. 20 and FIG. 21 show each a view showing tables defining edge lines connecting W and C, and edge lines connecting C and G.

In FIG. 20, $(R_2, G_2, B_2)$=(255, 255, 255) is associated with a white point (C, M, Y, K)=(0, 0, 0, 0). The L*a*b* values of the white point are denoted by $L_W^* a_W^* b_W^*$ representative of white of a sheet.

The table of FIG. 20 shows an association table in which CMYK values are varied by 10 (here values of C vary by 10), and $(R_2, G_2, B_2)$=(255×(9/10), 255, 255) is associated with (C, M, Y, K)=(10, 0, 0, 0). The associated L*a*b* values are denoted by $L_{11}^* a_{11}^* b_{11}^*$. Hereinafter, in a similar fashion, there is established an association tracing the edge line connecting W to C, in which the vertex of C: $(R_2, G_2, B_2)$=(0, 255, 255) is associated with (C, M, Y, K)=(100, 0, 0, 0). The associated L*a*b* values are denoted by $Lc^* ac^* bc^*$.

An association between values of $R_2, G_2, B_2$ and values of C, M, Y, K establishes an association of an edge line connecting W to C, and an association between CMYK and L*a*b* is determined from the printing profile 52 shown in FIG. 14.

In the highest stage of the table in FIG. 21, in a similar fashion to the lowest stage of the table in FIG. 20, the vertex of C: $(R_2, G_2, B_2)$=(0, 255, 255) is associated with the vertex of C: (C, M, Y, K)=(100, 0, 0, 0). The associated L*a*b* values are denoted by $Lc^* ac^* bc^*$. A point of $(R_2, G_2, B_2)$=(0, 255, 255×(9/10)) is associated with (C, M, Y, K)=(100, 0, 10, 0) from the vertex of C to the vertex of G. The associated L*a*b* values are denoted by $L_{21}^* a_{21}^* b_{21}^*$. Hereinafter, in a similar fashion, there is established an association tracing the edge line connecting C to G, in which the vertex of G: $(R_2, G_2, B_2)$=(0, 255, 0) is associated with the vertex of G: (C, M, Y, K)=(100, 0, 100, 0). The associated L*a*b* values are denoted by $L_G^* a_G^* b_G^*$.

In the manner as mentioned above, nine edge lines, excepting three edge lines connecting the vertexes of R, G and B to the vertex of K, are defined.

Next, in the manner, which will be described hereinafter, there are defined edge lines between the vertexes of R, G and B and the vertex of K: (C, M, Y, K)=(100, 100, 100, $K_{max}$) that is defined in the manner as mentioned above.

Figures 22, 23:
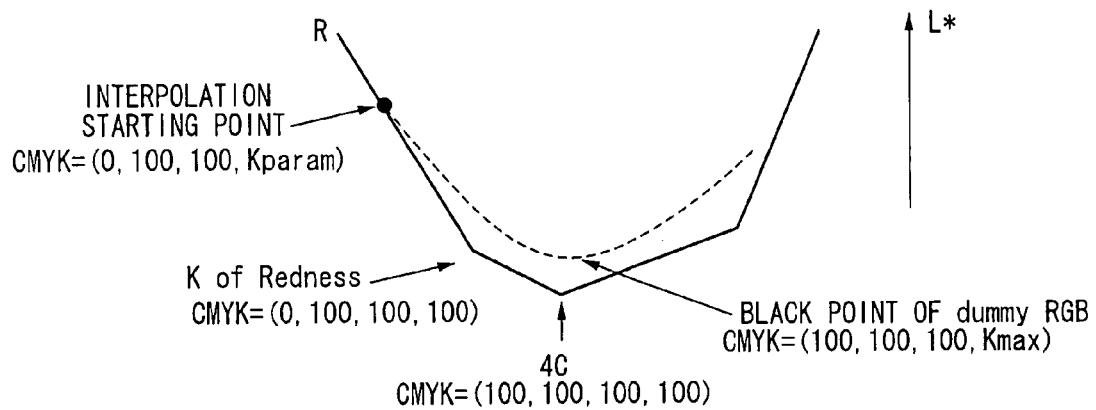
FIG. 22 is an explanatory view for a definition of an edge line between a vertex of R and a vertex of K.
FIG. 23 is a view showing tables defining an edge line between a vertex of R and a vertex of K.

FIG. 22 is an explanatory view for a definition of an edge line between a vertex of R and a vertex of K.

To state conceptually, there is defined an edge line starting from the vertex of R and going toward K of redness up to the half way, and swerving away from the edge line connecting R to K of redness at the point of (C, M, Y, K)=(0, 100, 100, $K_{param}$) in mid way, and going toward the vertex of K defined as mentioned above, that is, (C, M, Y, K)=(100, 100, 100, $K_{max}$).

FIG. 23 is a view showing tables defining an edge line between a vertex of R and a vertex of K.

First, with respect to the vertex of R, $(R_2, G_2, B_2)$=(255, 0, 0) is associated with the vertex of C: (C, M, Y, K)=(0, 100, 100, 0). The associated L*a*b* values are denoted by $L_R^* a_R^* b_R^*$. A point of $(R_2, G_2, B_2)$=(255×(9/10), 0, 0) is associated with (C, M, Y, K)=(0, 100, 100, 0) tracing an edge line from R to K of redness. The associated L*a*b* values are denoted by $L_{31}^* a_{31}^* b_{31}^*$. Hereinafter, in a similar fashion, up to the point K=(C, M, Y, K)=(0, 100, 100, $K_{param}$), there is established an association tracing the edge line connecting R to K of redness, in which $(R_2, G_2, B_2)$=(Rp, 0, 0) is associated with (C, M, Y, K)=(0, 100, 100, $K_{param}$). The associated L*a*b* values are denoted by $L_{3P}^* a_{3P}^* b_{3P}^*$.

Incidentally, while FIG. 23 shows as if $K_{param}$ is a multiple of 10, this is simply made for the sake of convenience, and there is no need that $K_{param}$ is a multiple of 10.

At the point of K=$K_{param}$ on an edge line going from R toward K of redness, it swerves away from the edge line and goes toward the vertex of the defined K: (C, M, Y, K)=(100, 100, 100, $K_{max}$). The point on the curve, which swerves away from the edge line and goes toward the vertex of K, can be determined in accordance with the interpolation operation such as quasi-Hermitian interpolation. Here, what is a point to notice is that on the edge line going from R toward K of redness, $R_2G_2B_2$ are associated with CMYK, and also on the vertex of K, $(R_2, G_2, B_2)$=(0, 0, 0) is associated with (C, M, Y, K)=(100, 100, 100, $K_{max}$) and the associated L*a*b* are associated with $L_k^* a_k^* b_k^*$, but after it swerves away from R and goes toward K of redness, and up to reaching the vertex of K, $R_2 G_2 B_2$ are directly associated with L*a*b* without any association with the values of CMYK. In this respect, there occurs no problem by applying processing, which will be described later. In view of the fact that the values of CMYK are used for the purpose of associating the edge lines (including not only the edge lines from R, G and B to K, but also other all edge lines) with the edge lines in the color reproduction area for printing, the values of CMYK are unnecessary after the edge lines are determined in the manner as mentioned above.

Here, there is a need that $K=K_{param}$, where it swerves away from the edge line going from R toward K of redness, is smaller than the maximum value $K_{max}$ of K in the K-plate restraint conditions K=K (C), that is, $K_{param} < K_{max}$. In the event that $K_{param}$ is larger than $K_{max}$, K-value around the gray axis is larger than K-value of the gray axis. On the other hand, the black point on the profile of the proofer 14 is fixed to $K_{max}$, as mentioned above, and thus there is a possibility that an inversion of K-plate will occur on the shadow portion of the gray axis of the proofer profile. An occurrence of the inversion of K-plate may cause an inversion of the remaining plates of C, M and Y. Thus, as mentioned above, there is a high possibility that an operator of printing does not accept this aspect.

Further, the gray axis of the profile (the printer profile 13 in FIG. 13) of the printer 11 that is the input device shown in FIG. 1 is not always coincident with the gray axis of the proofer profile now creating, and usually, there is a discrepancy somewhat between the two gray axes. On the other hand, what is to keep the K-plate restraint condition K=K(C) in FIG. 15 is the printer 11, but not the virtual proofer 14. Accordingly, there is a need to keep the K-plate restraint condition K=K(C) not only on the gray axis of the proofer profile now creating, but also on the periphery of the gray axis. As mentioned above, however, in the event that $K_{param}$ is larger than $K_{max}$, even if the K-plate restraint condition K=K (C) is satisfied on the gray axis of the proofer profile now creating, there is a possibility that the K-plate restraint condition K=K(C) is not satisfied on the periphery of the gray axis, for example, on the gray axis of the printer 11.

For the reason as mentioned above, here, it is always set up to satisfy $K_{param} < K_{max}$.

While there has been explained the edge line connecting the vertex of R with the vertex of K, this explanation is applicable to a case where edge lines connecting vertexes of G and B with the vertex of K are created. In this case, it is acceptable that the value of $K_{param}$ is common on three edge lines connecting vertexes of R, G and B with the vertex of K, or alternatively, it is acceptable that the value of $K_{param}$ is different values for the three edge lines.

Figure 24:
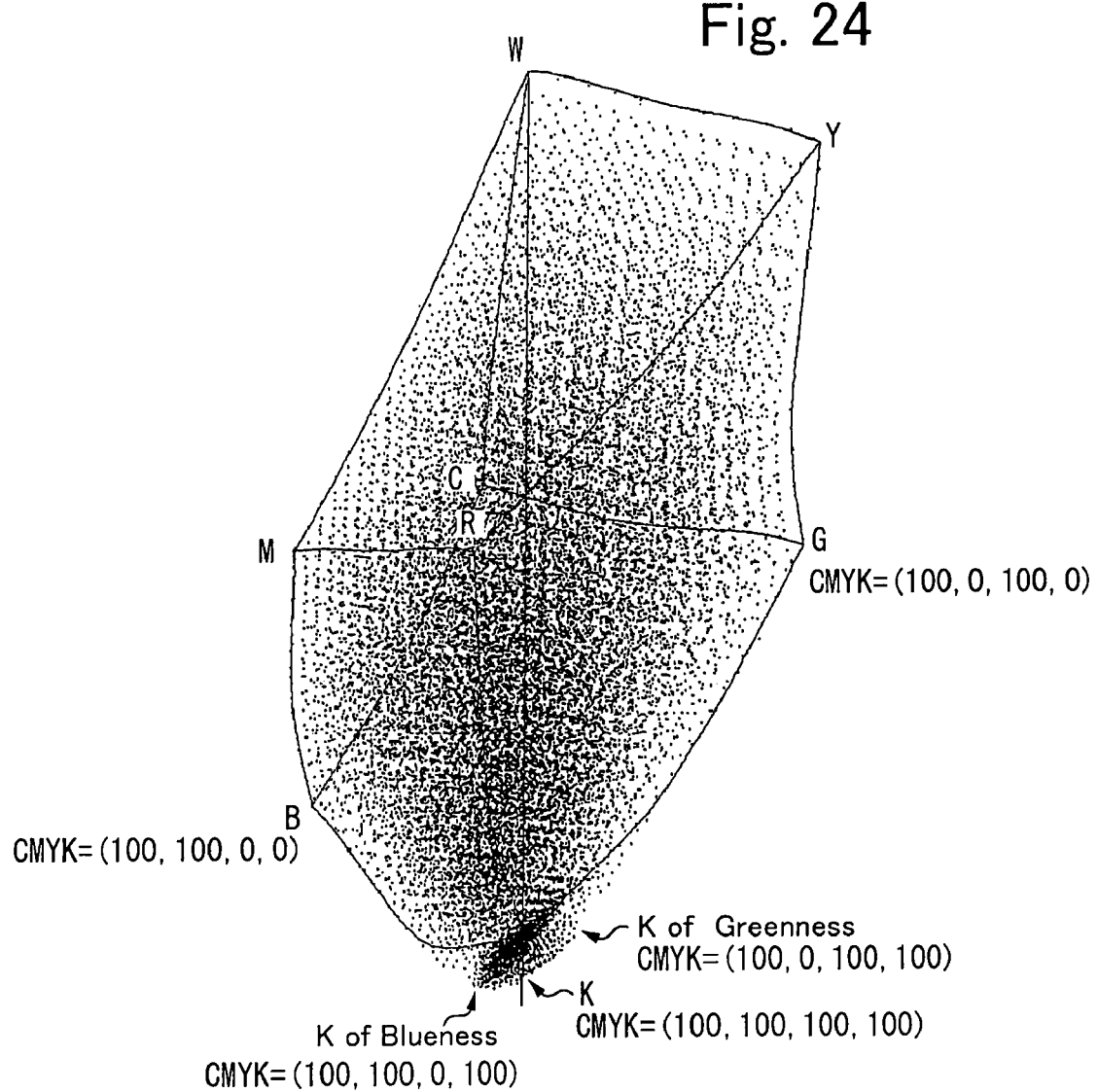
FIG. 24 is a view showing a color reproduction area of the proofer 14 tracing the color reproduction area of printing.
Figure 25:
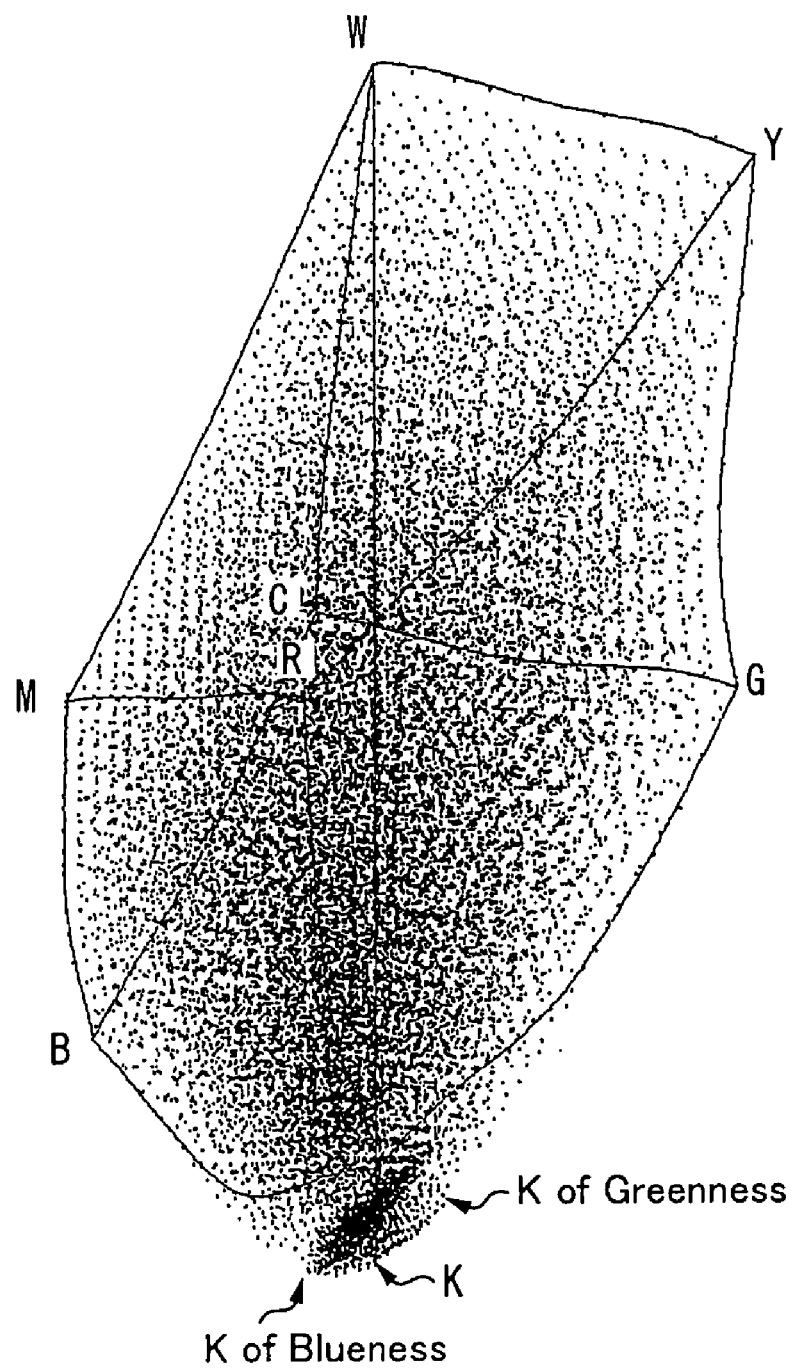
FIG. 25 is a view showing a color reproduction area of the proofer 14 tracing the color reproduction area of printing.
Figure 26:
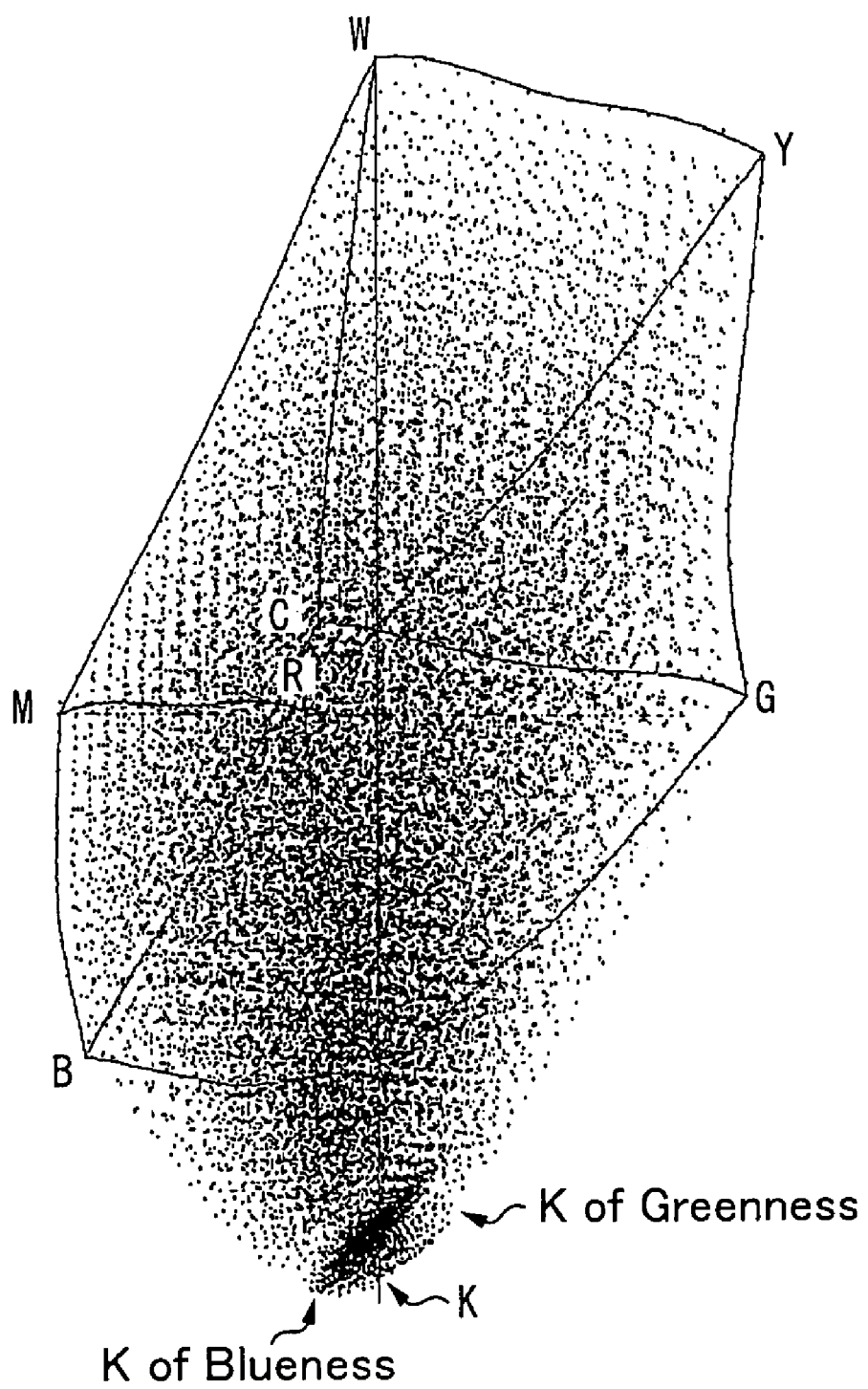
FIG. 26 is a view showing a color reproduction area of the proofer 14 tracing the color reproduction area of printing.

Each of FIG. 24 to FIG. 26 is a view showing a color reproduction area of the proofer 14 tracing the color reproduction area of printing.

Dots on FIG. 24 to FIG. 26 are the same as the dots on the printing profile (LUT) shown in FIG. 19. Solid lines on FIG. 24 to FIG. 26 show edge lines in the color reproduction area of the proofer that is created in the manner as mentioned above, where the maximum values $K_{max}$ of K in the K-plate restraint condition K=K(C) are given by $K_{max}=86$, $K_{max}=64$, $K_{max}=18$.

As will be seen from FIG. 24 to FIG. 26, the smaller value of $K_{max}$, as to periphery of K, the printing profile is not further coincident with the proofer profile now creating. However, there is a way of thinking of the printing company that K-plate does not exceed $K_{max}$, and thus there is no need that the proofer profile is coincident with the printing profile up to the portion exceeding $K_{max}$. Therefore, it is sufficient that $K_{max}$ is established as the black point of the proofer profile.

The above-mentioned description is concerned with the processing in the color reproduction area definition process (the step (a1)) in FIG. 5.

Next, there will be described the processing in the edge line profile creating process (the step (a2)) in FIG. 5.

Here, there is created an edge line profile in which values of $R_2 G_2 B_2$ are re-associated with values of L*a*b* so that pluralities of dots, which are determined at even intervals on edge lines of a $R_2 G_2 B_2$ color space, or sides of a regular hexahedron in the $R_2 G_2 B_2$ color space, are arranged at even intervals on edge lines of a L*a*b* color space too.

Figure 27:
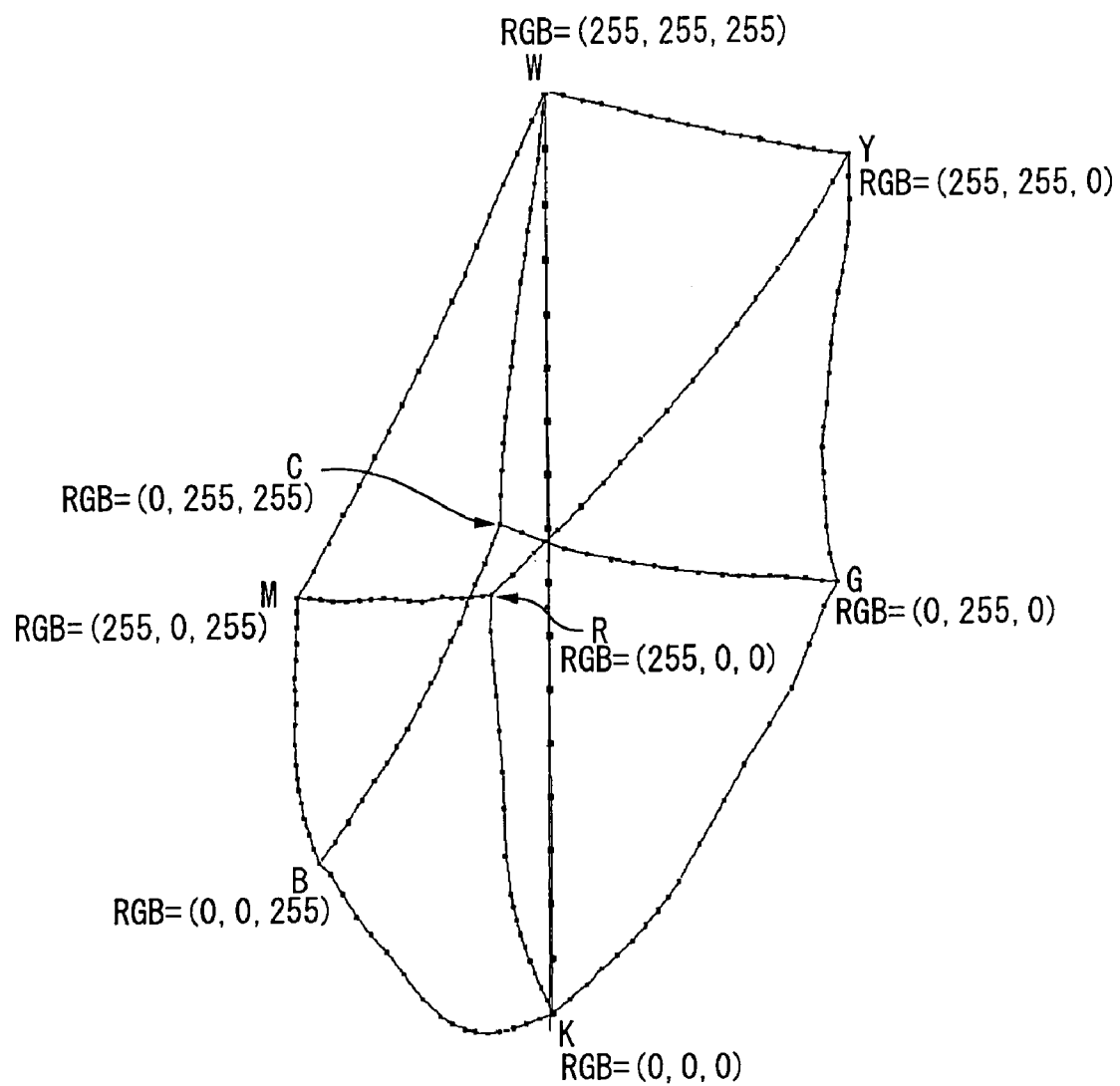
FIG. 27 is a view showing dots on the edge lines before the re-association.
Figure 28:
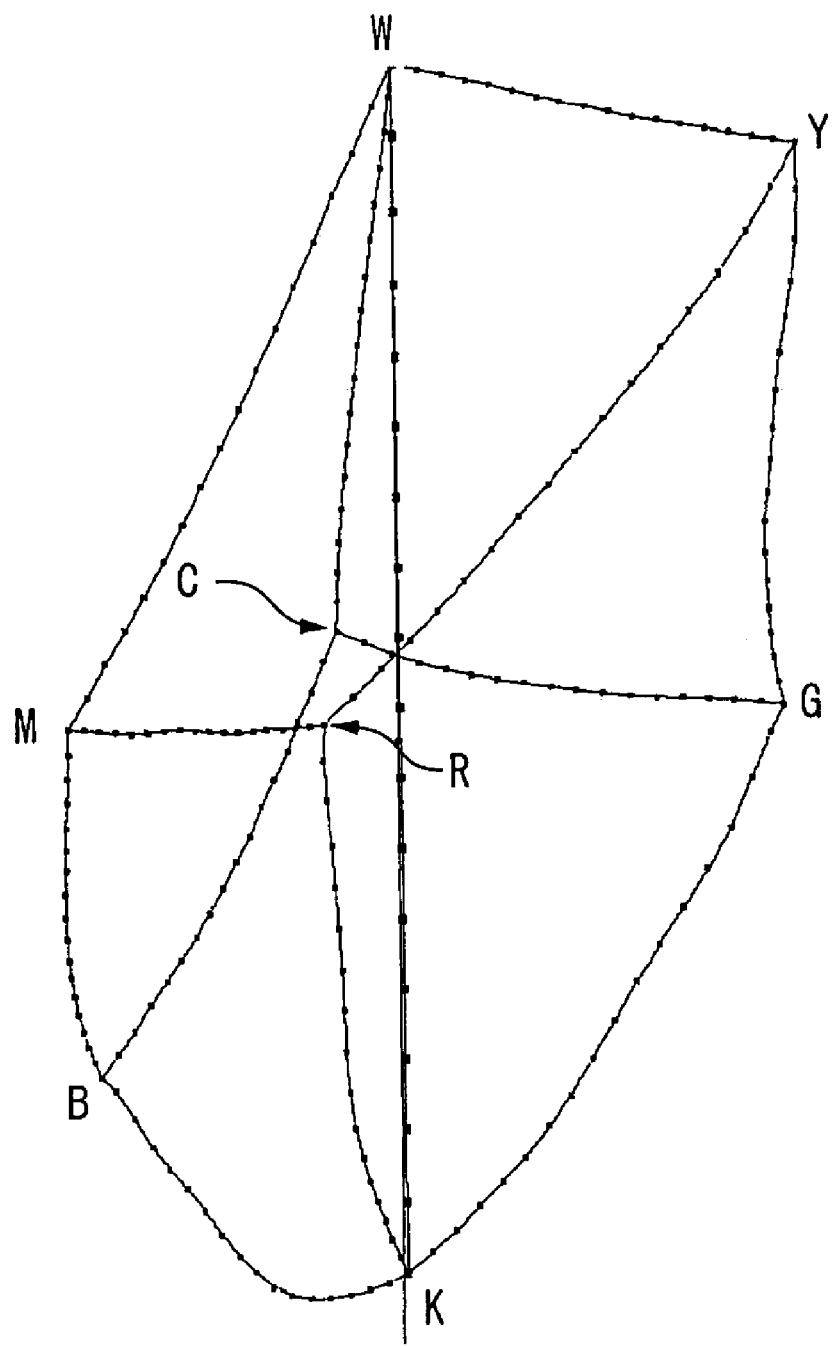
FIG. 28 is a view showing dots on the edge lines after the re-association.

FIG. 27 is a view showing dots on the edge lines before the re-association. FIG. 28 is a view showing dots on the edge lines after the re-association.

As shown in FIG. 20, FIG. 21 and FIG. 22 (here, typically referring to FIG. 20), in the $R_2 G_2 B_2$ color space, pluralities of dots: $(R_2, G_2, B_2)=(255, 255, 255)$, $(255 \times (9/10), 255, 255)$, $(255 \times (8/10), 255, 255), \ldots, (0, 255, 255)$ are arranged at even intervals. When the pluralities of dots are mapped into the L*a*b* color space, those dots are expressed by $(L^*, a^*, b^*)=(L^*_W, a^*_W, b^*_W)$, $(L^*_{11}, a^*_{11}, b^*_{11})$, $(L^*_{12}, a^*_{12}, b^*_{12}), \ldots, (L^*_C, a^*_C, b^*_C)$. Those dots are not arranged at even intervals in the L*a*b* color space, but generally at irregular intervals as shown in FIG. 27. For this reason, the values of L*a*b* are defined over again (cf. FIG. 28) so that the pluralities of dots on the $R_2 G_2 B_2$ color space are arranged at even intervals on the L*a*b* color space without swerving away from the edge line when the intervals are measured on the same edge line. It is acceptable that intervals along the respective edge lines on the L*a*b* color space are different from one another for each edge line.

FIG. 29 is a view showing a table defining edge lines connecting W and C after re-association.

$(R_2, G_2, B_2)=(255, 255, 255)$, $(255 \times (9/10), 255, 255)$, $(255 \times (8/10), 255, 255), \ldots, (0, 255, 255)$ as shown in FIG. 29 are the same as one before re-association as shown in FIG. 20, and are arranged at even intervals on the $R_2 G_2 B_2$ color space. However, with respect to L*a*b*, it is different from the case of FIG. 20, $(L^*, a^*, b^*)=(L^*_W, a^*_W, b^*_W)$, $(L^*_{111}, a^*_{111}, b^*_{111})$, $(L^*_{112}, a^*_{112}, b^*_{112}), \ldots, (L^*_C, a^*_C, b^*_C)$ are also arranged at even intervals on the L*a*b* color space. Here, values of CMYK are not defined. With respect to the values of CMYK, they are associated after determination of K-plate restraint conditions for the overall area of the color reproduction areas in the manner, which will be described later.

Here, it is possible to perform, for example, a re-association in which L*, a*, b* are arranged at even intervals on the L*a*b* color space using a one-dimensional LUT where as input values there are adopted distances (color differences) along edge lines from edge line terminal points (vertexes) with respect to the respective L*, a*, b*.

While FIG. 29 shows, by way of example, edge lines between W and C, there is performed re-association between L*a*b* values and $R_2 G_2 B_2$ values on the edge lines as to twelve all edge lines.

Implementing such a re-association makes it possible to perform a gamut mapping free from a tone fault through adopting a gamut mapping algorithm, which will be described later.

The above-mentioned description is concerned with the processing in the edge line profile creating process (the step (a2)) in FIG. 5.

Next, there will be described the processing in the gray axis profile creating process (the step (a3)) in FIG. 5.

Here, there is created a gray axis profile in which coordinate points in a $R_2G_2B_2$ color space are associated with coordinate points in a $L^*a^*b^*$ color space, with respect to the gray axis in the color reproduction area of the proofer 14 in such a manner that pluralities of dots are determined at even intervals on a gray axis connecting with one another two vertexes of W and K in the color reproduction area of the proofer 14 in the $R_2G_2B_2$ color space, and when the pluralities of dots are mapped on the $L^*a^*b^*$ color space, the pluralities of dots mapped on the $L^*a^*b^*$ color space are arranged at even intervals on the gray axis connecting with one another two vertexes of W and K, which are defined in the color reproduction area definition process (the step (a1)).

FIG. 30 is a view showing a table representative of a gray-axis profile.

Here, vertex of W: $(R_2, G_2, B_2)=(255, 255, 255)$ is associated with W point $(L^*, a^*, b^*)=(L^*_W, a_W^*, b_W^*)$ on $L^*a^*b^*$, which is associated with $(C, M, Y, K)=(0, 0, 0, 0)$, vertex of K: $(R_2, G_2, B_2)=(0, 0, 0)$ is associated with K point $(L^*, a^*, b^*)=(L^*_K, a_K^*, b_K^*)$ on $L^*a^*b^*$, which is associated with vertex of K $(C, M, Y, K)=(100, 100, 100, K_{max})$, and pluralities of points: $(R_2, G_2, B_2)=(255, 255, 255), (255\times(9/10), 255\times(9/10), 255\times(9/10)), \ldots, (0, 0, 0)$, which are arranged at even intervals on a gray axis connecting with one another two vertexes of W and K on a $R_2G_2B_2$ color space, are associated with pluralities of points: $(L^*, a^*, b^*)=(L^*_W, a_W^*, b_W^*), (L^*_W\times(9/10)+L^*_K\times(1/10), a_W^*\times(9/10)+a_K^*\times(1/10), b_W^*\times(9/10)+b_K^*\times(1/10)), \ldots, (L^*_K, a_K^*, b_K^*)$, which are arranged at even intervals on a gray axis connecting with one another two vertexes of W and K on a $L^*a^*b^*$ color space.

The reason why there is provided such an association that an arrangement of pluralities of dots at even intervals on the gray axis in the $R_2G_2B_2$ color space is implemented on the gray axis in the $L^*a^*b^*$ color space too is that there is implemented a gamut mapping free from a tone fault, in a similar fashion to the re-association on the edge lines as mentioned above.

FIG. 27 and FIG. 28 show an arrangement of pluralities of dots at even intervals on the gray axis.

According to the profile computing process (the step (a4)) in FIG. 5, there are computed a profile of a surface other than the edge lines of the color reproduction area of the proofer 14 and a profile of the interior other than the gray axis, through an interpolation operation taking as boundary conditions both the edge line profile created in the edge line profile creating process of the step (a2) and the gray axis profile created in the gray axis profile creating process of the step (a3).

Here, with respect to $L^*a^*b^*$, quadratic expressions as set forth below are used to determine factors of $a_0$-$a_9$, $b_0$-$b_9$, $c_0$-$c_9$, taking as sample points the associated dots between $R_2G_2B_2$ values and $L^*a^*b^*$ values, of the edge line profile and the gray axis profile which are created in the manner as mentioned above.

$$L^*=a_0R_2^2+a_1G_2^2+a_2B_2^2+a_3R_2G_2+a_4G_2B_2+a_5B_2R_2+a_6R_2+a_7G_2+a_8B_2+a_9$$

$$a^*=b_0R_2^2+b_1G_2^2+b_2B_2^2+b_3R_2G_2+b_4G_2B_2+b_5B_2R_2+b_6R_2+b_7G_2+b_8B_2+b_9$$

$$b^*=c_0R_2^2+c_1G_2^2+c_2B_2^2+c_3R_2G_2+c_4G_2B_2+c_5B_2R_2+c_6R_2+c_7G_2+c_8B_2+c_9$$

The thus determined factors are substituted for the quadratic expression set forth above to perform the association between the $R_2G_2B_2$ values and the $L^*a^*b^*$ values on overall area of the color reproduction area of the proofer 14.

Figure 31:
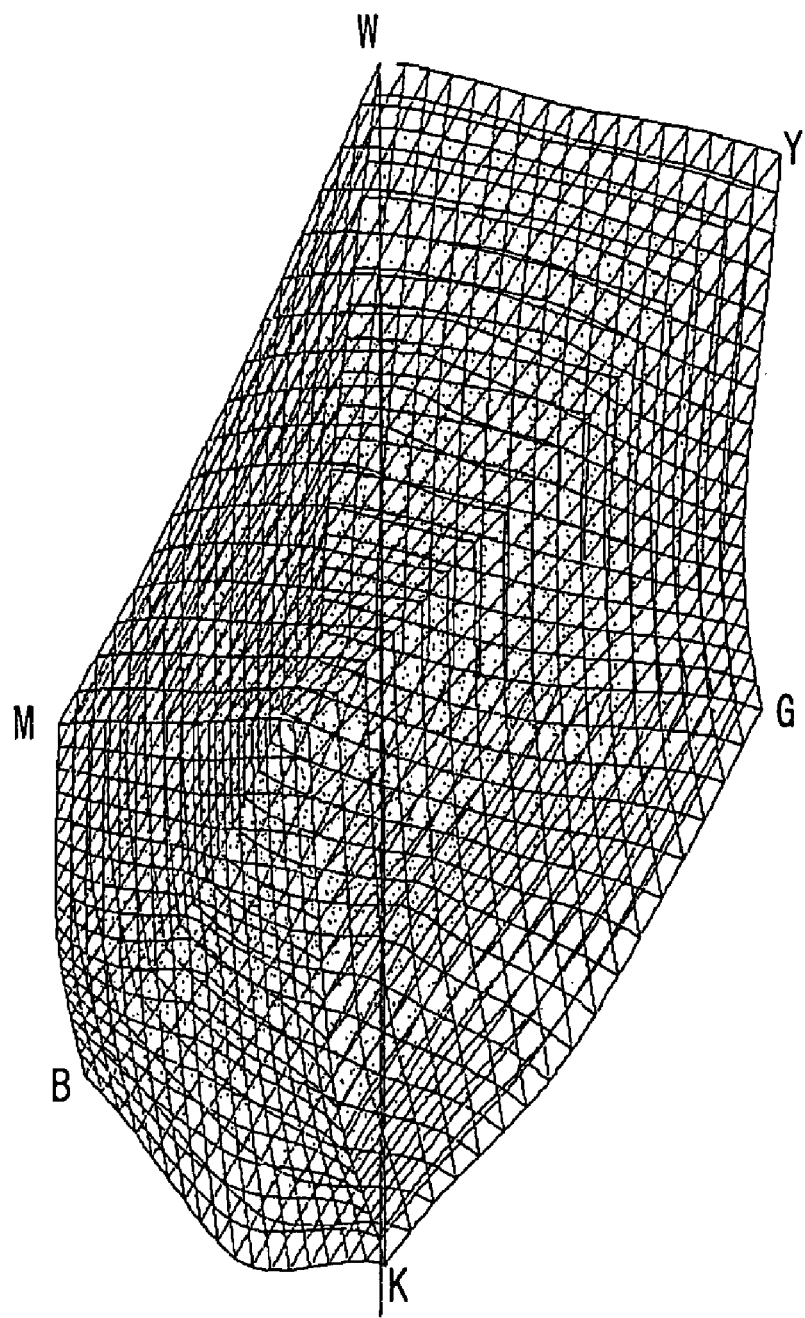
FIG. 31 is a conceptual view showing color reproduction characteristics (a proofer profile).

FIG. 31 is a conceptual view showing color reproduction characteristics (a proofer profile) which is created by performing the association between the $R_2G_2B_2$ values and the $L^*a^*b^*$ values on overall area of the color reproduction area of the proofer 14.

According to the profile creating process (the profile creating method of FIG. 5) of the step (A) of the color conversion definition creating method of FIG. 4, the proofer profile of the virtual proofer 14 shown in FIG. 1 is determined in the manner as mentioned above. The proofer profile thus obtained is a profile which is faithfully patterned after the color reproduction area for printing except for the area exceeding $K_{max}$ that is omitted as unnecessary parts.

Next, there will be explained the first color conversion definition creating process (the step (B)) of the color conversion definition creating method of FIG. 4. Here, there will be explained the technology disclosed in Japanese Patent Reference TokuKai 2001-103329.

Figure 32:
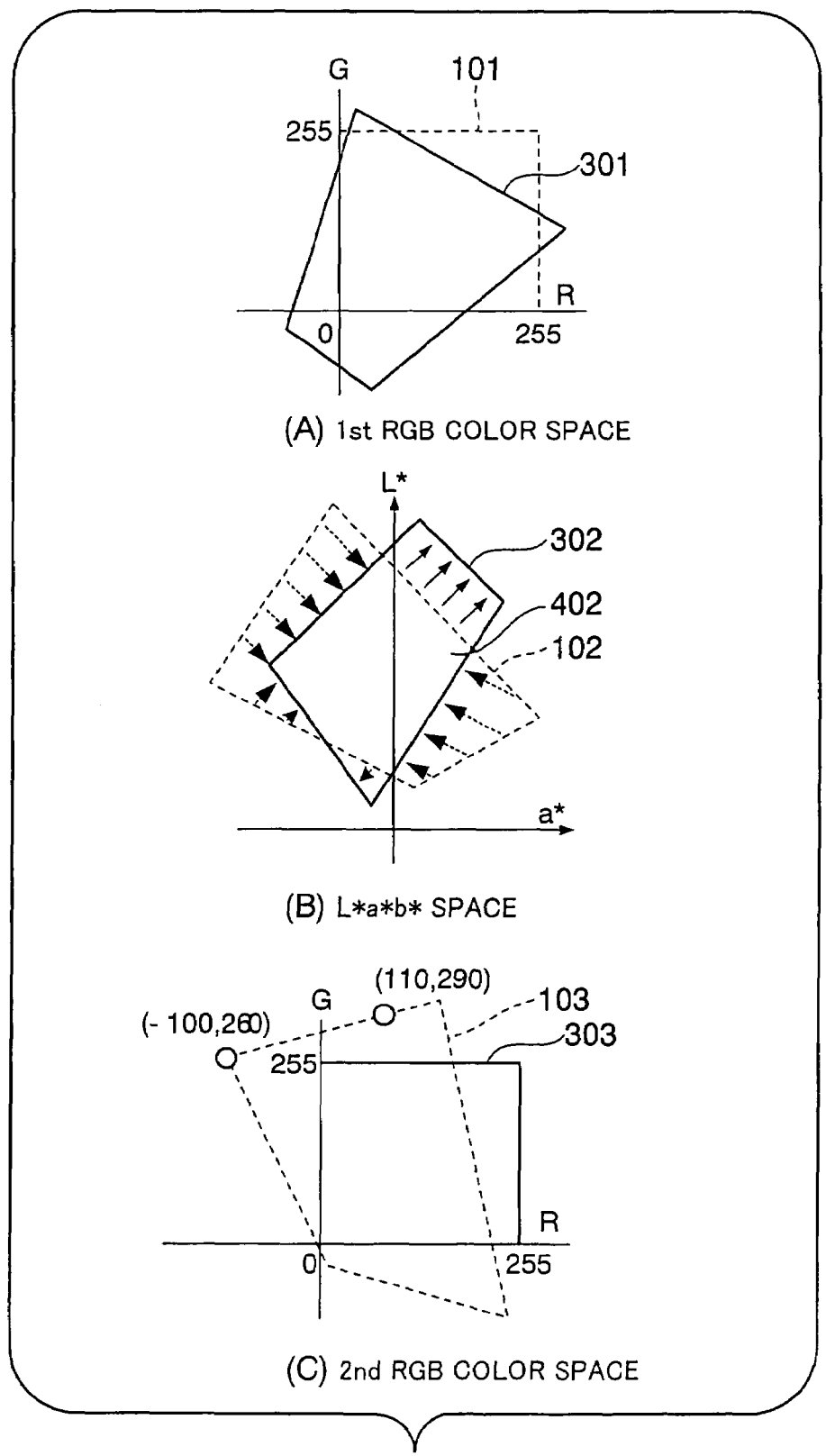
FIG. 32 is a typical illustration of color reproduction areas of the printer and the proofer, which are shown in FIG. 1.

FIG. 32 is a typical illustration of color reproduction areas of the printer and the proofer, which are shown in FIG. 1.

A part (A) of FIG. 32 essentially shows a first RGB color space (the $R_1G_1B_1$ color space) that depends on the printer 11. However, for the purpose of simplification in illustration, the part (A) of FIG. 32 simply shows an R-G plane. Similarly, a part (B) of FIG. 32 shows an $L^*$-$a^*$ plane in the $L^*a^*b^*$ space, which is one of the common color spaces. And the part (C) of FIG. 32 shows an R-G plane of a second RGB color space (the $R_2G_2B_2$ color space) that depends on the proofer 14.

The printer 11 prints out the printed image 11a in accordance with image data representative of numerical values of 0-255 on R, G and B. In this case, the color reproduction area of the printer 11 is a rectangular area 101 shown in the part (A) of FIG. 32.

Now, referring to the color reproduction characteristics (the printer profile 51) of the printer 11 as shown in FIG. 13, the rectangular area 101 of the printer 11 shown in the part (A) of FIG. 32 is mapped into the $L^*a^*b^*$ space. As a result, the color reproduction area of the printer 11 is represented by an area 102 shown in the part (B) of FIG. 32. Further, referring to the color reproduction characteristics (the proofer profile 53 (cf. FIG. 16) of the proofer 14, the color reproduction area 102 is mapped into the second RGB color space (the $R_2G_2B_2$ color space) that depends on the proofer 14. As a result, the color reproduction area of the printer 11 is represented by an area 103 shown in the part (C) of FIG. 32.

On the other hand, the color reproduction area (the proofer profile) of the proofer 14 shown in FIG. 1 is a cubic area represented by the numerical value range of 0 to 255 in each of R, G and B, on the second RGB color space of the part (C) of FIG. 32, or a rectangular area 303 on the R-G plane in the part (C) of FIG. 32. In other words, when image data representative of coordinate points within the numerical value range of 0 to 255 in each of R, G and B, of the first RGB color space (the $R_1G_1B_1$ color space) that depends on the printer 11, is converted via the $L^*a^*b^*$ space into image data on the second RGB color space (the $R_2G_2B_2$ color space), it happens that the image data representative of coordinate points within the numerical value range of 0 to 255 in each of R, G and B is converted into values exceeding colors that can be expressed by the proofer 14 (the range of 0 to 255 in each of R, G and B on the image data), for example, $(R, G)=(110, 290)$, or $(R, G)=(-100, 260)$, as shown in the part (C) of FIG. 32. In such a situation, the image data, that is, the image data out of the color reproduction area of the proofer 14, cannot be outputted by the proofer 14, and thus it is proposed to clip the image data so that the image data is located at the boundary of the color reproduction area of the proofer 14. Specifically, (R, G)=(110, 290) is altered to (R, G)=(110, 255), and (R, G)=(−100, 260) is altered to (R, G)=(0, 255).

In case of the mapping in the color space depending the side (here the proofer 14) to be subjected to the conversion, a degree of freedom of the mapping is small, and there is performed a mapping that data out of the color reproduction area of the proofer 14 is simply clipped in the manner as mentioned above so as to move the data to the boundary of the color reproduction area. According to such a mapping, however, when a mapping is carried out from the color reproduction area of one device (e.g. the printer 11) to the color reproduction area of another device (e.g. the proofer 14), it happens that accuracy of the mapping is greatly lowered particularly in vicinity of the boundary of their color reproduction areas.

On the other hand, when the color reproduction area 303 of the proofer 14, which is represented by the rectangular area of 0 to 255 in the part (C) of FIG. 32, is mapped into the L*a*b* space using color reproduction characteristics (a proofer profile) of the proofer 14, the color reproduction area 303 is represented by an area 302 shown in the part (B) of FIG. 32. There are proposed some technologies that in the common color space represented by the L*a*b* space, data in the color reproduction area 102 of the printer 11 (the first device) is converted into data in the color reproduction area 302 of the proofer 14 (the second device).

According to the color conversion (the mapping) in the L*a*b* space, when it is intended that the color reproduction area, which can be expressed by the proofer 14, is utilized as wider as possible, generally, there are performed both processing of "compression", as shown by arrows of broken lines in the part (B) of FIG. 32, in which data out of a common area 402 of the color reproduction area 101 of the printer 11 and the color reproduction area 302 of the proofer 14 is mapped into the inside of the common area 402, and "expansion", as shown by arrows of solid lines in the part (B) of FIG. 32, in which data inside the common area 402 is expanded outside the common area 402 on condition that it is inside the color reproduction area 302 of the proofer 14.

According to the mapping in the common color space represented by the L*a*b* space, which is now proposed, a degree of freedom for the mapping is too large, and thus there is a great possibility that a tone is discontinuous and an image is unnatural.

When the color reproduction area 302 of the proofer 14, which is mapped into the L*a*b* space in the part (B) of FIG. 32, is further mapped into the first RGB color space in the part (A) of FIG. 32, the color reproduction area 302 is expressed by a "squashed" configuration of area 301, which has portions going over the rectangular area 101 that is the color reproduction area of the printer 11.

Next, there will be explained the common color space. With respect to the common color space, there has been explained the L*a*b* color space, by way of example. However, there is no need that the common color space is the L*a*b* color space, and any one is acceptable, as the common color space, that is defined not so as to depend on the specific input device or the specific output device. For example, it is acceptable that the common color space is an XYZ color space as well as the L*a*b* color space, or alternatively, it is acceptable that the common color space is a coordinate system that is clearly defined in such a manner that coordinate points on the color spaces have a one-to-one correspondence with the color spaces. As an example of such a coordinate system, there is raised a standard RGB signal defined as set forth below.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Now, for example, when one wherein $R_{SRGB}$ is expressed with 8 bits is referred to as $R_{8bit}$, the following equations exist.

$R_{8bit} = 255 \times 12.92 R_{SRGB}$ ($0 < R_{SRGB} < 0.00304$)

$R_{8bit} = 255 \times 1.055 R_{SRGB}{}^{(1.0/2.4)} - 0.055$
($0.00304 = R_{SRGB} = 1$)

Also with respect to $G_{8bit}$ and $B_{8bit}$, wherein $G_{SRGB}$ and $B_{SRGB}$ are expressed with 8 bits, respectively, in a similar fashion to that of $R_{8bit}$, it is possible to convert those items from $G_{SRGB}$ and $B_{SRGB}$.

Alternatively, it is acceptable that the color space, which is defined by CMY density of the reversal film, is adopted as the common color space. Determination of the common color space make sit possible to clearly define the color reproduction area in the common color space.

Figure 33:
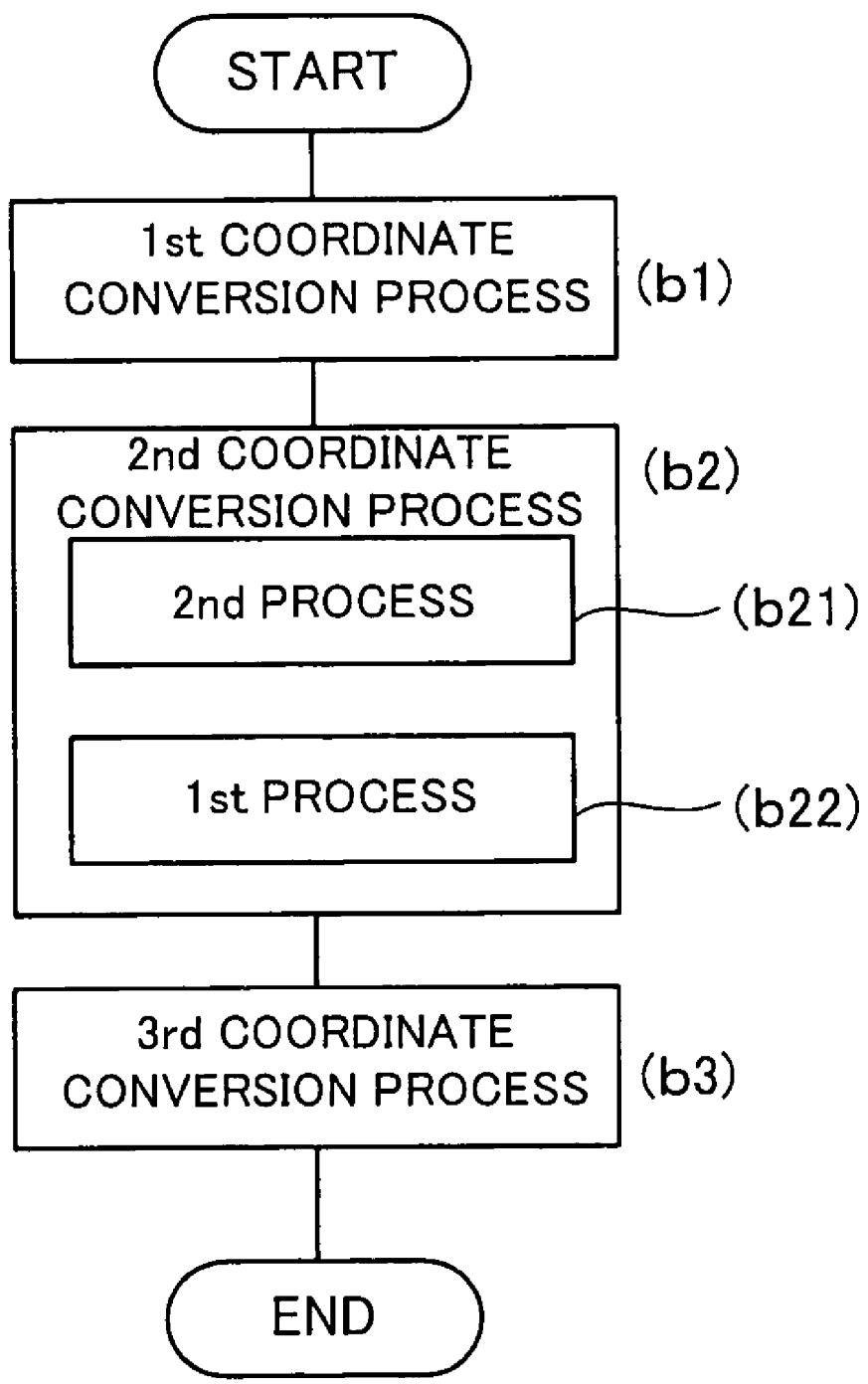
FIG. 33 is a flowchart useful for understanding a first color conversion definition creating process of a color conversion definition creating method according to a color conversion definition creating program to be executed in the computer system shown in FIG. 2 and FIG. 3.

FIG. 33 is a flowchart useful for understanding a first color conversion definition creating process of a color conversion definition creating method according to a color conversion definition creating program to be executed in the computer system shown in FIG. 2 and FIG. 3. The first color conversion definition creating process shown in FIG. 33 corresponds to the first color conversion definition creating process of the step (B) of FIG. 4.

Here, there is created the first color conversion definition referred to in the present invention through a first coordinate conversion process (a step b1), a second coordinate conversion process (a step b2), a third coordinate conversion process (a step b3). According to the second coordinate conversion process (the step b2), basically, a first process (a step b22) is carried out. However, according to the present embodiment, a second process (a step b21) is placed before the first process (a step b22), so that a color conversion definition is created with greater accuracy.

Figure 34:
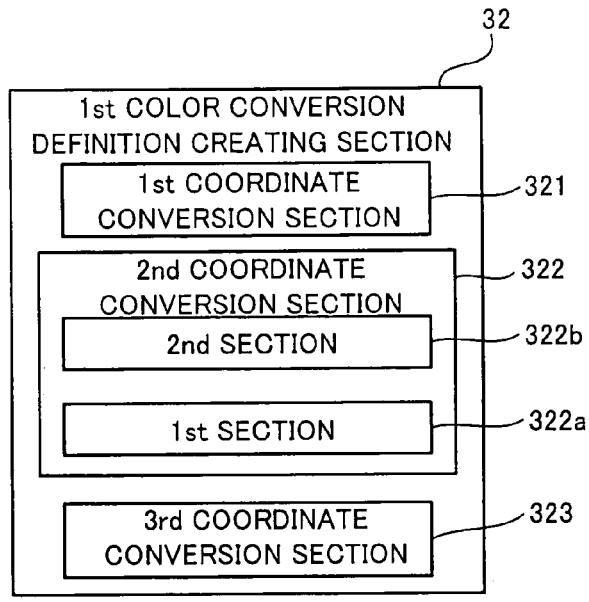
FIG. 34 is a structural view of a first color conversion definition creating section of a color conversion definition creating program to be executed in the computer system shown in FIG. 2 and FIG. 3.

FIG. 34 is a structural view of the first color conversion definition creating section 32 (c.f. FIG. 7) of a color conversion definition creating program to be executed in the computer system shown in FIG. 2 and FIG. 3.

The first color conversion definition creating section 32 comprises a first coordinate conversion section 321, a second coordinate conversion section 322, a third coordinate conversion section 323. The second coordinate conversion section 322 comprises a first section 322*a* and a second section 322*b* that is to be carried out before the first section 322*a*.

Figure 35:
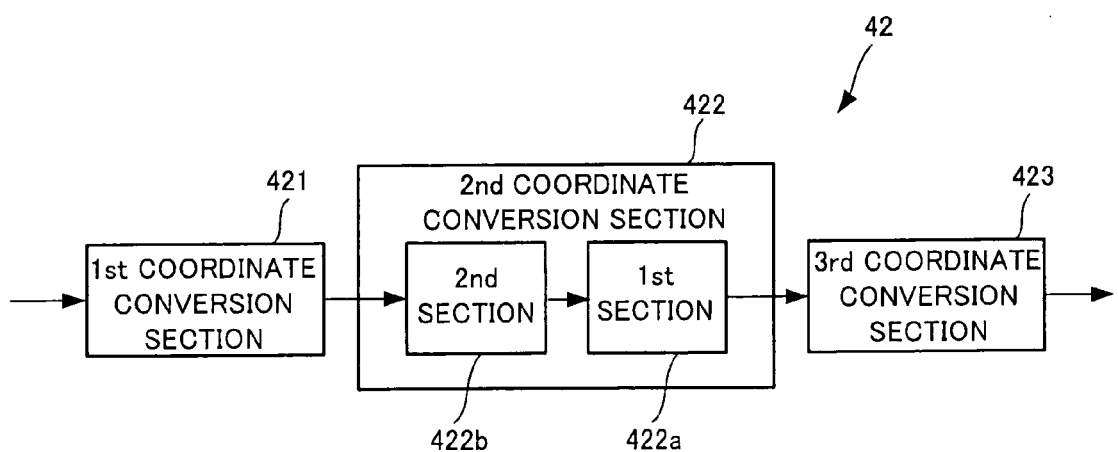
FIG. 35 is a functional block diagram of a first color conversion definition creating section of a color conversion definition creating apparatus that is constructed in the computer system shown in FIG. 2 and FIG. 3 when the color conversion definition creating program is executed in the computer system.

FIG. 35 is a functional block diagram of the first color conversion definition creating section 42 (c.f. FIG. 10) of the color conversion definition creating apparatus 40 that is constructed in the computer 20 shown in FIG. 2 and FIG. 3 when the color conversion definition creating program is executed in the computer 20.

The first color conversion definition creating section 42 comprises a first coordinate conversion section 421, a second coordinate conversion section 422, a third coordinate conversion section 423. The second coordinate conversion section 422 comprises a first section 422*a* and a second section 422*b* that is displaced before the first section 422*a*.

Steps b1, b2 (b21, b22), and b3 of the first color conversion definition creating process of the color conversion definition creating method shown in FIG. 33 correspond to the sections 321, 322 (322a, 322b), and 323 that constitute the first color conversion definition creating section 32 shown in FIG. 34, respectively, and also correspond to the sections 421, 422 (422a, 422b), and 423 that constitute the first color conversion definition creating section 42 shown in FIG. 35, respectively. Hereinafter, there will be explained the steps b1, b2 (b21, b22), and b3 of the first color conversion definition creating process of FIG. 33. This explanation will serve as the explanation of the sections 321, 322 (322a, 322b), and 323 of the first color conversion definition creating section 32 in FIG. 34, and the explanation of the sections 421, 422 (422a, 422b), and 423 of the first color conversion definition creating section 42 of FIG. 35.

Hereinafter, there will be explained the steps b1, b2 (b21, b22), and b3 of the first color conversion definition creating process shown in FIG. 33.

First, in the step b1 of FIG. 33, the color reproduction quality (the printer profile) of the printer 11 is referred to, so that coordinate points in the first RGB color space, which depend on the printer 11, that is, coordinate points on the lattices set up on a discrete basis, are mapped onto the common color space (for example, the L*a*b* space) that is independent of a device.

Figure 36:
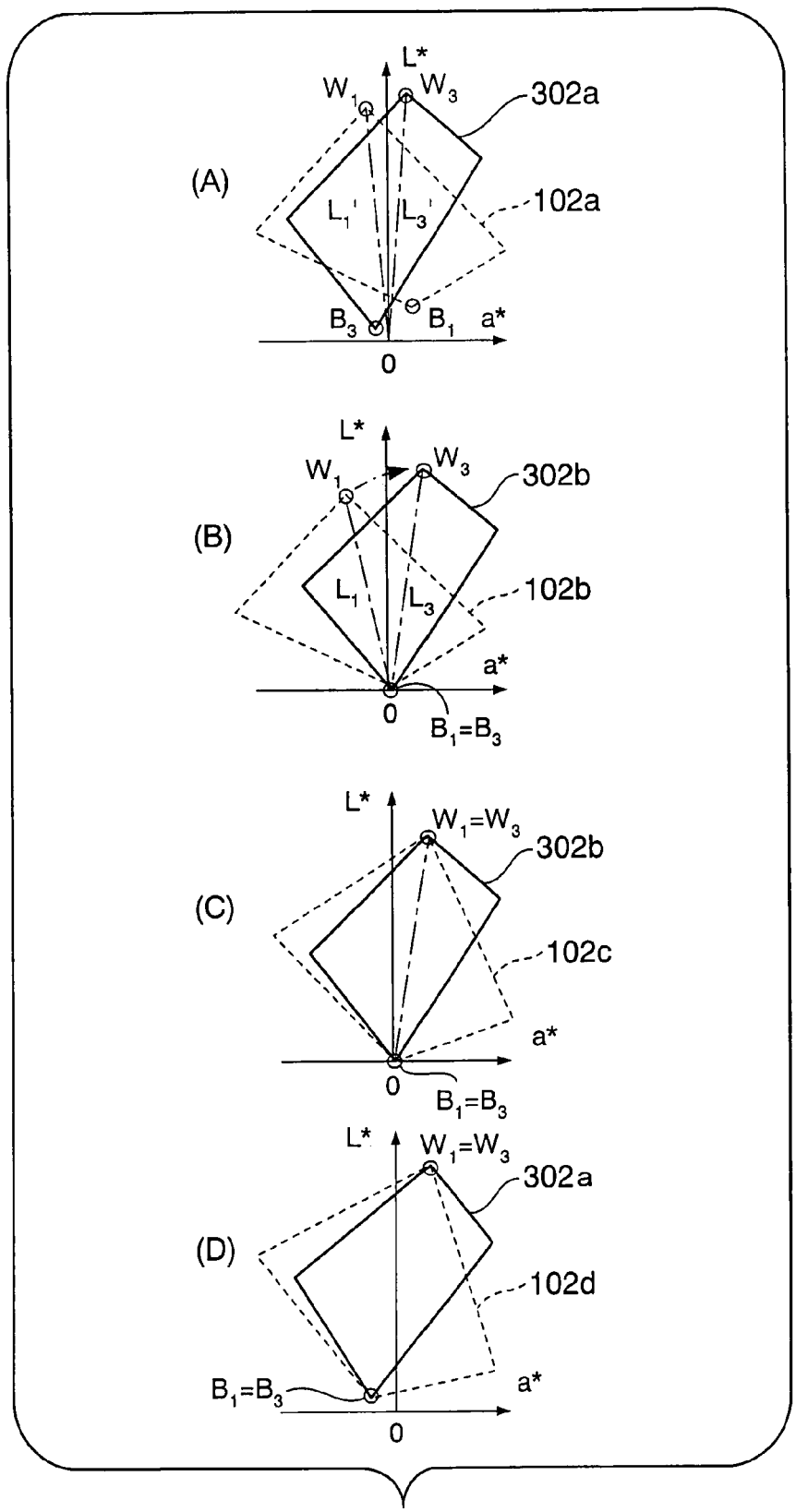
FIG. 36 is an explanatory view for the second process in the second coordinate conversion process, which is executed in the step b21 of FIG. 33.

FIG. 36 is an explanatory view for the second process in the second coordinate conversion process, which is executed in the step b21 of FIG. 33. FIG. 36 shows the color reproduction area of the printer 11 in the L*a*b* space and the color reproduction area of the proofer 14.

Here, there is performed an adaptational conversion applying Von Kries conversion. More in detail, here, there is performed a coordinate conversion in such a manner that coordinate point $W_1$ corresponding to white (the color of a sheet of the printed image 11a (cf. FIG. 1)) represented by the printed image 11a printed out by the printer 11, and coordinate point $B_1$ corresponding to black (a state that the printer 11 printed out using the maximum amount of inks of R, G and B) capable of expressing in form of the printed image 11a, are coincident with coordinate point $W_3$ corresponding to white of a proof image that is virtually outputted by the proofer 14 (that is, the color of a sheet of the proof image), and coordinate point $B_3$ corresponding to black (a state that the proofer 14 printed out using the maximum amount of inks of R, G and B) capable of being outputted by the proofer 14, respectively.

FIG. 36 is illustrations useful for understanding the coordinate conversion processes. First, a color reproduction area 102a of the printer 11 and a color reproduction area 302a of the proofer 14, as shown in a part (A) of FIG. 36, are translated in parallel so that black points $B_1$ and $B_1$ are coincident with the origin 0 (the black point in theory), as shown in a part (B) of FIG. 36. Thus, first, the black point of the color reproduction area 102a of the printer 11 is coincident with the black point of the color reproduction area 302a of the proofer 14.

Next, there is performed a coordinate conversion involving rotation and expansion and contraction throughout the color reproduction area 102a of the printer 11 so that the white point $W_1$ of the color reproduction area 102a of the printer 11, after the parallel translation, is coincident with the white point $W_3$ of the color reproduction area 302a of the proofer 14, after the parallel translation, in other words, a straight line $L_1$ of the part (B) of FIG. 36 is coincident with a straight line $L_3$.

A part (C) of FIG. 36 shows a state after the coordinate conversion involving rotation and expansion and contraction is carried out, in which the color reproduction area of the printer 11 is converted from the color reproduction area 102a shown in the part (B) of FIG. 36 to a color reproduction area 102c shown in the part (C) of FIG. 36. At that time, the white point $W_1$ of the color reproduction area of the printer 11 is coincident with the white point $W_3$ of the color reproduction area of the proofer 14.

Thereafter, as shown in a part (D) of FIG. 36, the color reproduction area 102c of the printer 11, which is coincident in the white point and the black point in the manner as shown in the part (C) of FIG. 36, is translated in parallel to the original color reproduction area of the proofer 14, that is, the position in which the color reproduction area 302a of the proofer 14, which is coincident in the white point $W_3$ and the black point $B_3$, as shown in the part (A) of FIG. 36.

This feature makes it possible to obtain a color reproduction area 102d of the printer 11 in which the white point $W_1$ and the black point $B_1$ are coincident with the white point $W_3$ and the black point $B_3$ Of the proofer 14, respectively.

The above-mentioned operation may be expressed in equations as follows.

While FIG. 36 shows the color reproduction areas in the L*a*b* space, it happens that Von Kries conversion and an adaptational conversion applying Von Kries conversion are carried out in the XYZ space. And thus the explanation will be made assuming the XYZ space. The XYZ space is one of the common color spaces in which coordinate points on the XYZ space have a one-to-one correspondence with coordinate points of the L*a*b* space.

A Von Kries matrix for rotation and expansion and contraction is created in such a manner that XYZ coordinates ($LXW_1'$, $LYW_1'$, $LZW_1'$) and ($LXW_3'$, $LYW_3'$, $LZW_3'$), which correspond to the white points $W_1$ and $W_3$ shown in the part (B) of FIG. 36, are determined in accordance with equations as set forth below and the white point $W_1$ ($LXW_1'$, $LYW_1'$, $LZW_1'$) is coincident with the white point $W_3$ ($LXW_3'$, $LYW_3'$, $LZW_3'$).

$$LXW_1' = LXW_1 - LXB_1$$

$$LYW_1' = LYW_1 - LYB_1$$

$$LZW_1' = LZW_1 - LZB_1 \tag{1}$$

$$LXW_3' = LXW_3 - LXB_3$$

$$LYW_3' = LYW_3 - LYB_3$$

$$LZW_3' = LZW_3 - LZB_3 \tag{2}$$

Where the XYZ coordinates of the white point $W_1$ and the black point $B_1$ of the color reproduction area 102a of the printer 11 shown in the part (A) of FIG. 36 are expressed by ($LXW_1$, $LYW_1$, $LZW_1$) and ($LXB_1$, $LYB_1$, $LZB_1$), respectively, and the XYZ coordinates of the white point $W_3$ and the black point $B_3$ of the color reproduction area 302a of the proofer 14 shown in the part (A) of FIG. 36 are expressed by ($LXW_3$, $LYW_3$, $LZW_3$) and ($LXB_3$, $LYB_3$, $LZB_3$), respectively.

Here, the Von Kries matrix is expressed as follows.

$$VK = [MTX_{VK}] \tag{3}$$

The Von Kries matrix is 3×3 matrix.

Next, in the step b1 of FIG. 33, coordinate points in the first RGB space that depends on the printer 11, are mapped onto the L*a*b* space. When a large number of coordinate points, which are converted into the XYZ space, or directly mapped from the first RGB space that depends on the printer 11 to the XYZ space, are represented by (X, Y, Z), with respect to this (X, Y, Z), the following processing is applied.

A black point correction (cf. the part (B) of FIG. 36) is carried out in accordance with equations (4) set forth below.

$$X1 = X - L \times B_1$$
$$Y1 = Y - L \times B_1$$
$$Z1 = Z - L \times B_1 \quad (4)$$

Next, the Von Kries conversion (cf. the part (C) of FIG. 36) is carried out in accordance with equation (5) set forth below.

$$\begin{pmatrix} X2 \\ Y2 \\ Z2 \end{pmatrix} = (MTX_{VK}) = \begin{pmatrix} X1 \\ Y1 \\ Z1 \end{pmatrix} \quad (5)$$

Next, a correction (cf. the part (D) of FIG. 36) for coincidence of the black point with the black point of the proofer 14 is carried out in accordance with equations (6) set forth below.

$$X' = X2 - L \times B_3$$
$$Y' = Y2 - L \times B_3$$
$$Z' = Z2 - L \times B_3 \quad (6)$$

When the above-mentioned operations are carried out on all the coordinate points, the color reproduction area 102a shown in the part (A) of FIG. 36, wherein it is represented in the L*a*b* space, is converted into the color reproduction area 102d shown in the part (D) of FIG. 36 in which the white point and the black point are coincident with the white point and the black point of the color reproduction area 302a of the proofer 14, respectively.

When the above-mentioned adaptational conversion is carried out on the XYZ space, the coordinates (X, Y, Z) of the black points before the adaptational conversion, that is, the black points $B_1$ and $B_3$ of the part (A) of FIG. 36, are close to (0, 0, 0). Accordingly, it is sufficient for the correction of the black points to slightly vary the numerical values, and a short migration length of the coordinates of the white points is acceptable even if the coordinates of the white points are moved in accordance with the equations (1) and (2). Thus, it is advantageous that the adaptational conversion can be performed using the wide area of the XYZ space. The adaptational conversion is not always performed in the XYZ space. It is acceptable that the adaptational conversion is performed in the L*a*b* space, or alternatively in another common color space.

While there is explained the adaptational conversion in which both the white point and the black point are coincident, it is acceptable that the adaptational conversion is carried out in such a manner that only the white point is coincident without taking into consideration the black point, while an accuracy of the color conversion is somewhat degraded.

The adaptational conversion, in which only the white point is coincident, means such a coordinate conversion that the straight line $L_1'$ shown in the part (A) of FIG. 36 is coincident with the straight line $L_3'$, and the white point $W_1$ is coincident with the white point $W_3$. On a numerical expression basis, the adaptational conversion means that a Von Kries matrix for rotation and expansion and contraction is determined in such a manner that the white point $W_1$ ($LXW_1$, $LYW_1$, $LZW_1$) is coincident with the white point $W_3$ ($LXW_3$, $LYW_3$, $LZW_3$), without subtracting the coordinates of the black points as in the equations (1) and (2), and the Von Kries matrix is used to directly convert (X, Y, Z), without subtracting the coordinates of the black points as in the equation (4).

Further, the adaptational conversion is needed in case of the color conversion between devices having whites different from one another on a calorimetric basis, for example, in a case where "white" on a CRT display is white that is considerably tinged with blue and there is a need to print out an image displayed on the CRT display. However, in a case where both "whites" are substantially coincident with one another, for example, in a case where the printed image 11a, which is printed out on a white sheet by the printer 11, is compared with a proof image assuming that it is printed out on a similar white sheet by the virtual proofer 14, it is acceptable to omit the adaptational conversion, that is, the second process (the step b21) of the second coordinate conversion process in FIG. 33.

Next, there will be explained the first process (the step b22) of the second coordinate conversion process of the flowchart shown in FIG. 33, raising some examples.

Figure 37:
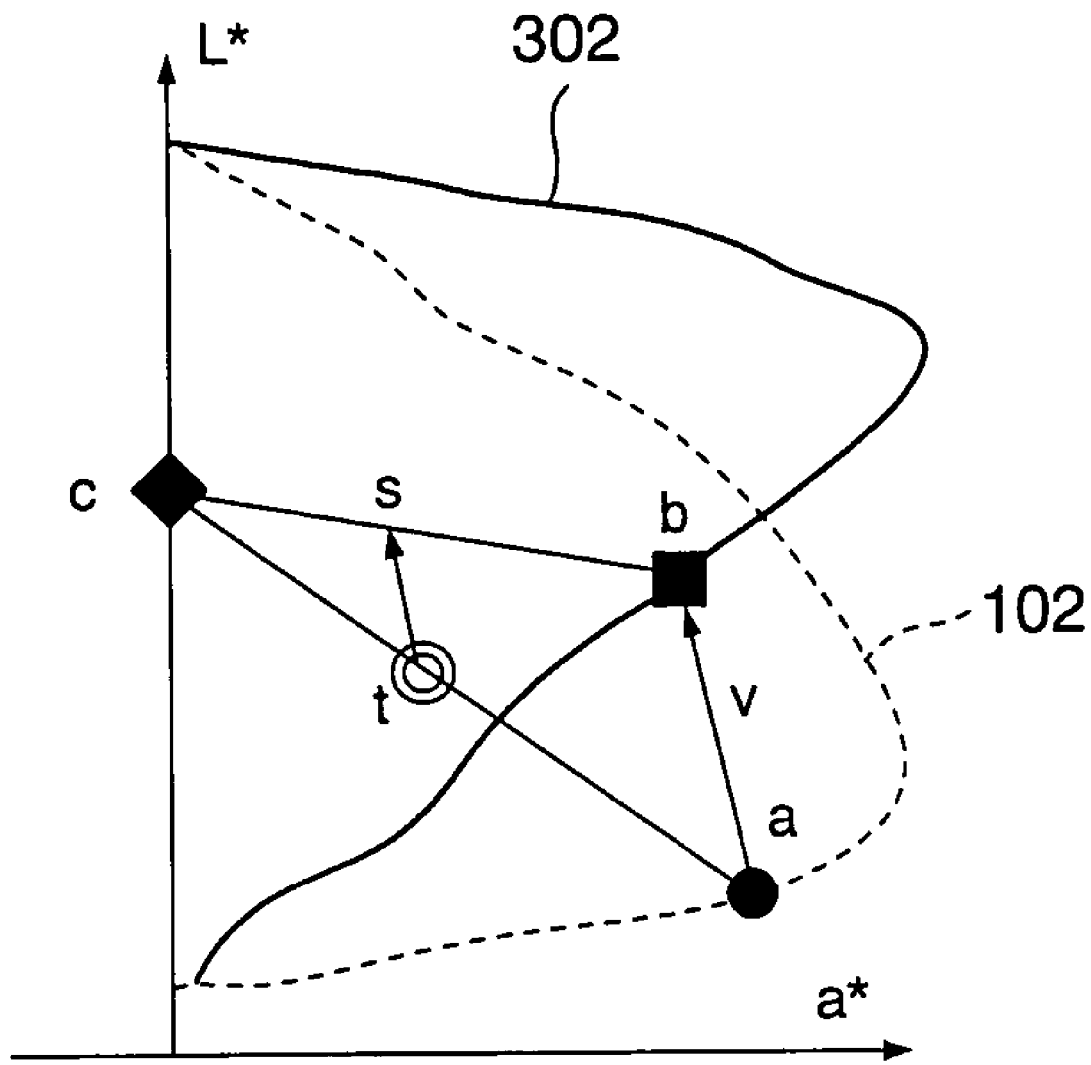
FIG. 37 is an explanatory view for a first example of the coordinate conversion in a first process.
Figure 38:
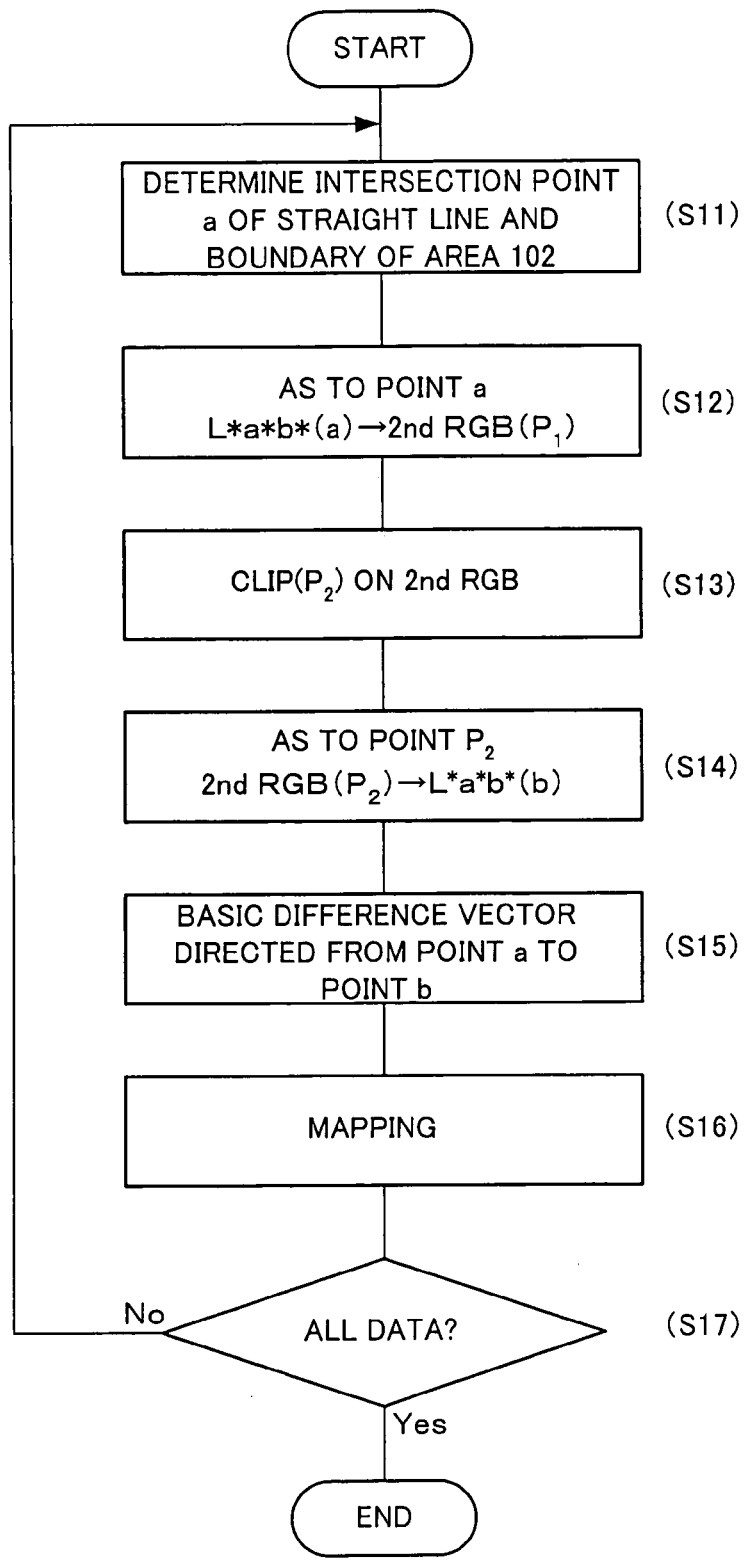
FIG. 38 is a flowchart useful for understanding the first example of the coordinate conversion in a first process.

FIG. 37 is an explanatory view for a first example of the coordinate conversion in a first process. FIG. 38 is a flowchart useful for understanding the first example of the coordinate conversion in a first process. While FIG. 37 illustrates an L*-a* plane of the L*a*b* space, this is made for the sake of convenience. Actually, a three-dimensional coordinate conversion is performed in the L*a*b* space. This is applicable to other examples, which will be explained hereinafter, as well as FIG. 37.

Here, first, there is established a coordinate conversion reference coordinate point c that is a standard of the coordinate conversion. The coordinate conversion reference coordinate point c is established somewhat arbitrarily empirically or in accordance with a predetermined set standard, and particularly, be established in the common area of the color reproduction area 102 of the printer 11 mapped into the L*a*b* space and the color reproduction area 302 of the proofer 14. More particularly, the coordinate conversion reference coordinate point c is established on the L* axis (the gray axis) in the common area. The reason why this is to do so is, as will be understood by the following explanation, that the coordinate conversion reference coordinate point c is not mapped onto another coordinate point, and thus it is easy to keep the gray balance. Here, for example, a point of (L*, a*, b*)=(50, 0, 0) is established as the coordinate conversion reference coordinate point c.

Incidentally, when the second coordinate conversion process (the step b2) in the flowchart of FIG. 33 includes the adaptational conversion (the step b21) as explained with reference to FIG. 36, the color reproduction area 102 of the printer 11 mapped into the L*a*b* space indicates the color reproduction area after the adaptational conversion.

Here, a first coordinate point t denotes the coordinate point of the color reproduction area 102 of the printer 11 on the L*a*b* space that is an object for the mapping.

Now, let us consider a straight line connecting the coordinate conversion reference coordinate point c to the first coordinate point t, and determine an intersection point of the straight line and the boundary of the color reproduction area 102 of the printer 11 (a step S11 of FIG. 38). This intersection point is referred to as the first reference coordinate point a.

The flowchart shown in FIG. 38 is a flowchart wherein the thus determined first reference coordinate point a is out of the color reproduction area 302 of the proofer 14 mapped into the L*a*b* space, as shown in FIG. 37. When this condition is satisfied, the processing is advanced as follows.

The thus determined first reference coordinate point a is mapped from the L*a*b* space into the second RGB color space depending on the proofer 14 (a step S12). Here, $P_1$ denotes a first reference coordinate point mapped into the second RGB color space.

Next, a coordinate value of the first reference coordinate point $P_1$ is clipped in the second RGB color space, so that the first reference coordinate point $P_1$ is mapped on the boundary of the color reproduction area of the proofer 14 of the second RGB color space (a step S13). A point $P_2$, which is obtained on the boundary of the color reproduction area of the proofer 14 by the mapping, is mapped from the second RGB color space into the L*a*b* space (a step S14). A coordinate point, which is mapped into the L*a*b* space, is denoted as a second reference coordinate point b (cf. FIG. 3).

Next, in a step S15, there is determined a basic difference vector v representative of a difference between the first reference coordinate point a and the second reference coordinate point b, as shown in FIG. 37, wherein the first reference coordinate point a is a starting point, and the second reference coordinate point b is a terminal point. In a step S16, the first coordinate point t, which is now to be mapped, is moved in the same direction as the direction of the basic difference vector v, onto the straight line connecting the coordinate conversion reference coordinate point c with the second reference coordinate point b.

In a step S17, such a coordinate conversion is carried out on all the coordinate points, in which the first reference coordinate point a that is determined in the step S11 in FIG. 38, is out of the color reproduction area 102 of the printer 11, of the coordinate points included in the color reproduction area 102 of the printer 11, mapped into the L*a*b* space.

In the manner as mentioned above, as to the coordinate conversion explained with reference to FIG. 37 and FIG. 38, when the direction of the coordinate conversion is determined, or when the basic difference vector v is determined, the second RGB color space is used to determine the second reference coordinate point b on the boundary of the color reproduction area of the proofer 14, which corresponds to the first reference coordinate point a on the boundary of the color reproduction area of the proofer 14, and thus the coordinate conversion is performed, and the actual mapping is performed on the L*a*b* space.

That is, according to the present embodiment of the invention mentioned above, the direction of the coordinate conversion (or the mapping) is determined in a color space matching human feeling in color addressed as the second RGB color space (the color space of the device-dependence). This feature makes it possible to suppress possibilities of discontinuity in tone and unnatural images, as less as possible. Further, according to the present embodiment, the actual coordinate conversion is performed in the L*a*b* space (the common color space). This feature makes it possible to perform the coordinate conversion (or the mapping) with greater accuracy in color.

For the sake of convenience of illustration, FIG. 37 illustrates the coordinate conversion (or the mapping) on the two-dimensional plane. Actually, however, as described above, the mapping is performed on a three-dimensional basis.

Figure 39:
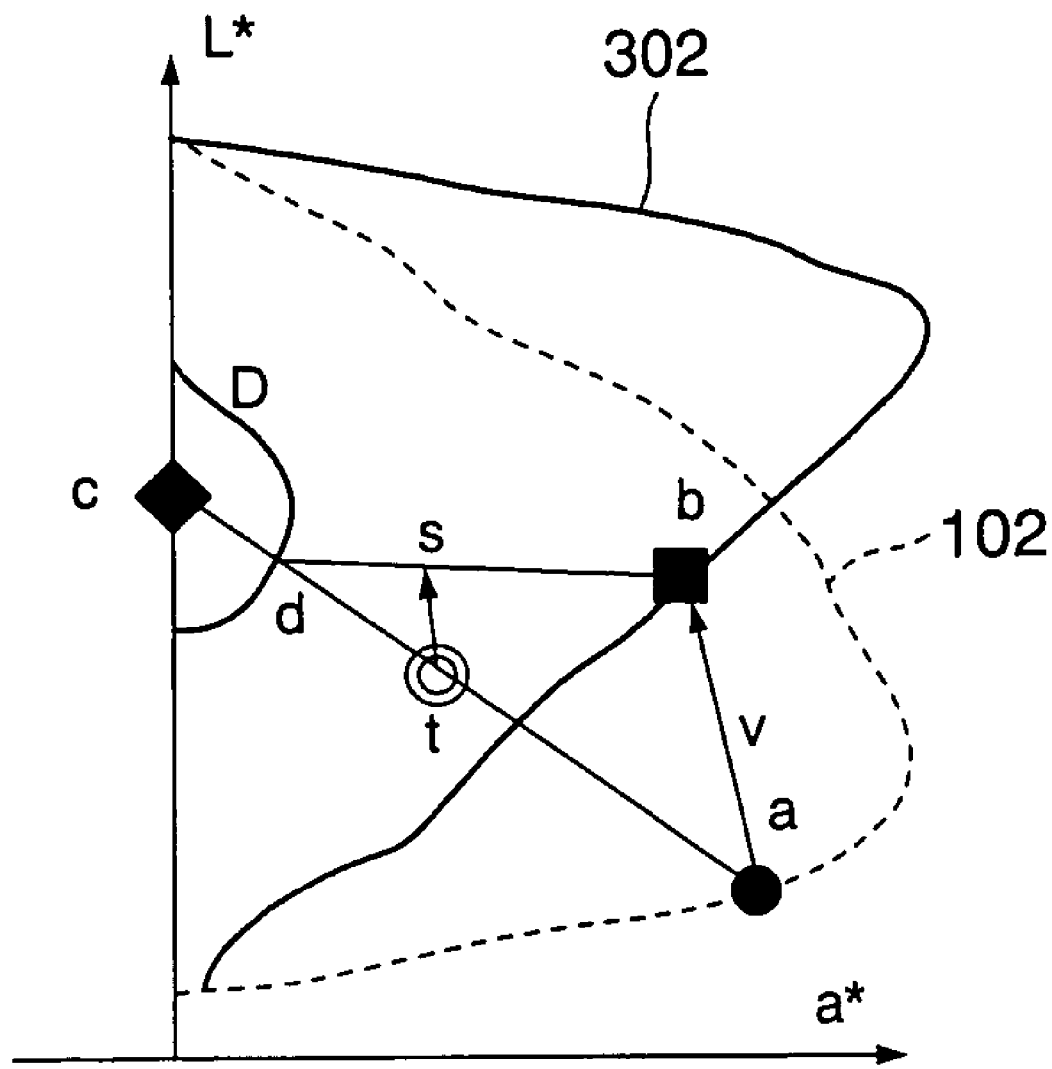
FIG. 39 is a view useful for understanding a modification of the coordinate conversion explained in conjunction with FIG. 37 and FIG. 38.

FIG. 39 is a view useful for understanding a modification of the coordinate conversion explained in conjunction with FIG. 37 and FIG. 38.

Here, there is established an area D surrounding the coordinate conversion reference coordinate point c, and there is determined an intersection point d of a straight line connecting the coordinate conversion reference coordinate point c with the first reference coordinate point a and the boundary of the area D. In mapping of the first coordinate point t, the first coordinate point t is mapped on the coordinate point s connecting the intersection point d with the second reference coordinate point d.

This feature makes it possible to establish the area in which coordinates are not moved, addressed as the area D. As mentioned above, in order to keep the gray balance, it is preferable that the coordinate on the L* axis (the gray axis) is not moved. An establishment of the area D as shown in FIG. 39 makes it possible to arbitrarily establish an area in which the coordinate is not moved.

Figure 40:
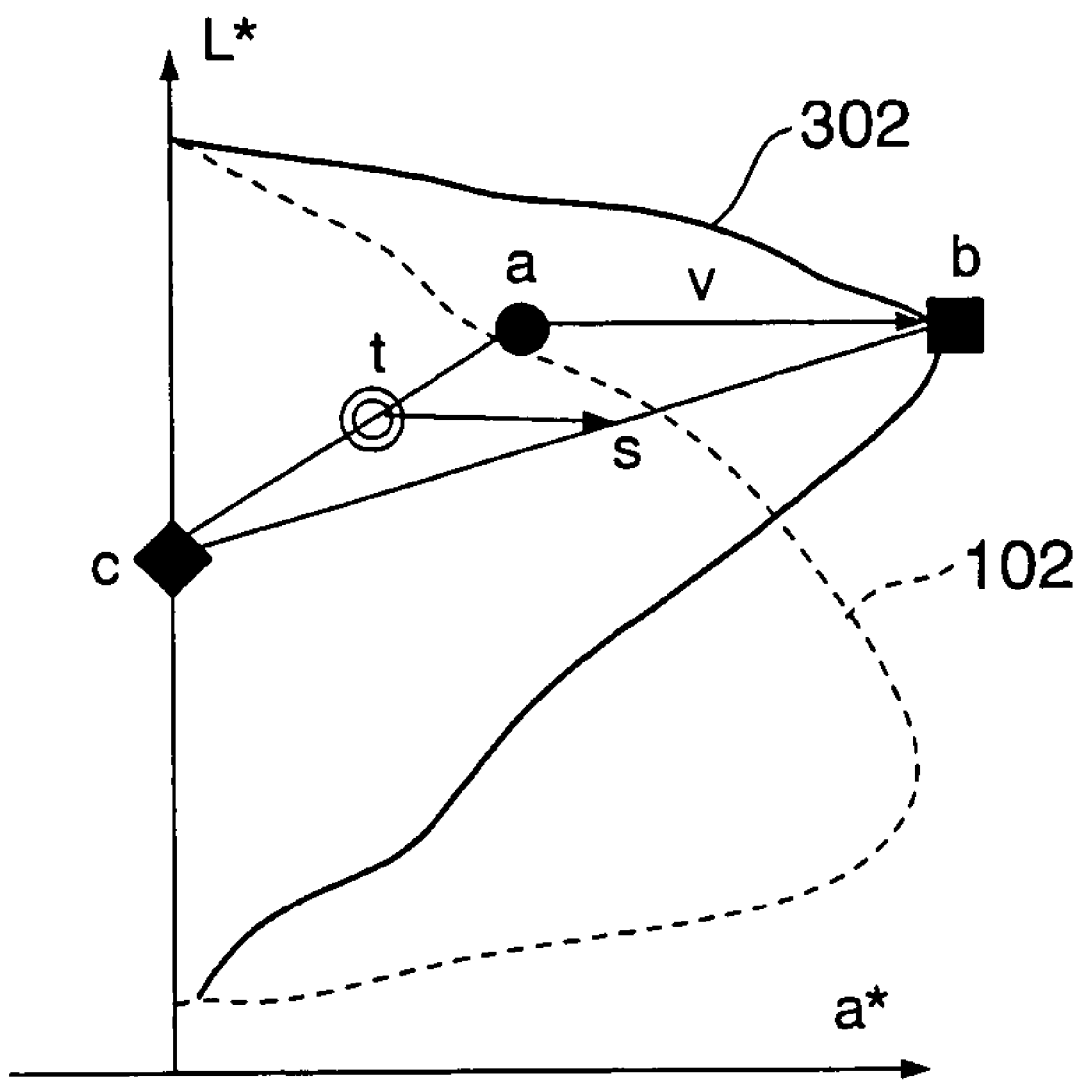
FIG. 40 is an explanatory view for a second example of the coordinate conversion in the first process of the flowchart shown in FIG. 33.
Figure 41:
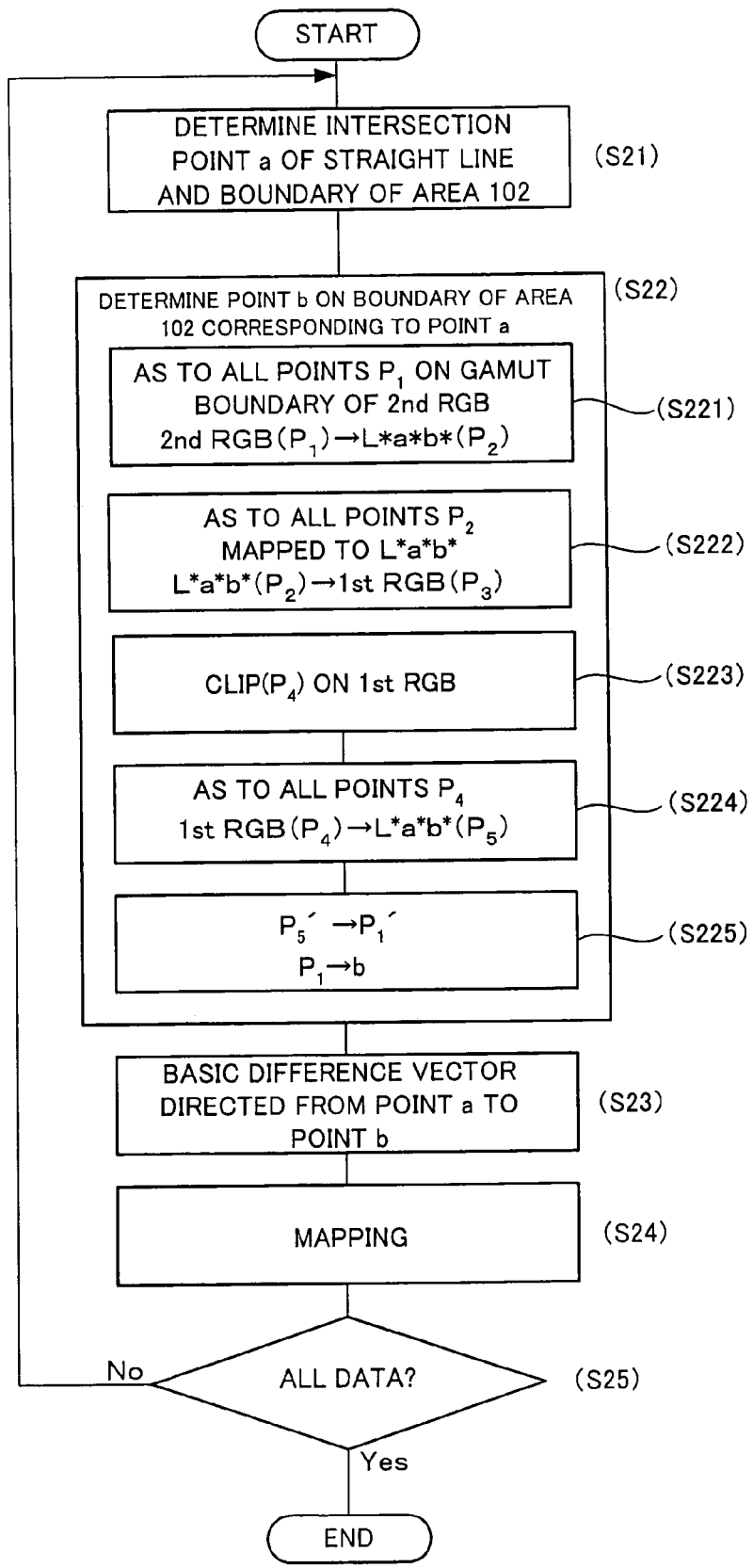
FIG. 41 is a flowchart useful for understanding the second example of the coordinate conversion in the first process of the flowchart shown in FIG. 33.

FIG. 40 is an explanatory view for a second example of the coordinate conversion in the first process of the flowchart shown in FIG. 33. FIG. 41 is a flowchart useful for understanding the second example of the coordinate conversion in the first process of the flowchart shown in FIG. 33.

Here, in a similar fashion to that of the first example explained with reference to the FIG. 37 and FIG. 38, there is established on the L* axis (the gray axis) a coordinate conversion reference coordinate point c that is a standard of the coordinate conversion.

Now, let us consider a straight line connecting the coordinate conversion reference coordinate point c to the first coordinate point t that is an object of the coordinate conversion, and determine an intersection point of the straight line and the boundary of the color reproduction area 102 of the printer 11, which is mapped into the L*a*b* space (a step S21). This intersection point is referred to as the first reference coordinate point a. Here, as mentioned above, when there is performed an adaptational conversion in the second process (the step b21) in the flowchart of FIG. 33, the color reproduction area 102 of the printer 11, which is mapped into the L*a*b* space, indicates the color reproduction area after the adaptational conversion.

The flowchart shown in FIG. 41 is different from the flowchart shown in FIG. 38, but is a flowchart in which the thus determined first reference coordinate point a exists, as shown in FIG. 40, inside the color reproduction area 302 of the proofer 14 mapped into the L*a*b* space. When this condition is satisfied, the procession is advanced as follows.

In a step S22, there is determined a second reference coordinate point b on the boundary of the color reproduction area of the proofer 14, which corresponds to the boundary of the thus determined first reference coordinate point a of the printer 11. To determine the second reference coordinate point b, it is impossible to use the technique explained with reference to FIG. 37 and FIG. 38, since the first reference coordinate point a exists inside the color reproduction area 302 of the proofer 14, as shown in FIG. 40. In other words, in a similar fashion to a case where the first reference coordinate point a exists outside the color reproduction area 302 of the proofer 14, even if the first reference coordinate point a is mapped into the second RGB color space, the mapped first reference coordinate point locates inside the color reproduction area of the proofer 14 in the second RGB color space. Thus, it is impossible to use the above-mentioned technique of clip. In view of the situation, according to the present embodiment, there is determined the first reference coordinate point b in the manner as will be explained below.

First, with respect to all the points (point $P_1$ represents the points) on the boundary of the color reproduction area (gamut) of the proofer 14 in the second RGB color space, the points are mapped from the second RGB color space to the L*a*b* space (a step S221), and all the points $P_2$ mapped onto the L*a*b* space are mapped onto the first RGB color space (a step S222). Next, of the points $P_3$ mapped onto the first RGB color space, the points, which are out of the color reproduction area of the printer 11 on the first RGB color space, are mapped on the boundary of the color reproduction area of the printer 11, as mentioned above, for example, in such a manner that as to R, G and B, values of the minus are clipped to 0 and values exceeding 255 are clipped to 255 (a step S223).

Thus obtained points $P_4$, which are mapped onto the first RGB color space and are all clipped, are mapped from the first RGB color space to the L*a*b* space (a step S224). Of points $P_5$ thus mapped onto the L*a*b* space, there is found point a point $P_5'$, which is coincident with the first reference coordinate point a, or is closest to the first reference coordinate point a, and of all the points $P_1$ on the boundary of the color reproduction area of the proofer 14 in the second RGB color space, there is found a point $P_1'$ of which the point $P_5'$ is obtained on the basis of. The point $P_1'$ is established as a second reference coordinate point b (a step S225).

Thus, it is possible to determine the second reference coordinate point b corresponding to the reference coordinate point shown in FIG. 40.

In case of the flowchart shown in FIG. 41, all the points $P_1$ on the boundary of the color reproduction area of the proofer 14 in the second RGB color space are impartially mapped onto the first RGB color space. However, it is acceptable that, of the coordinate points on the boundary of the color reproduction area 302 of the proofer 14 mapped onto the L*a*b* space, as shown in FIG. 40, only the coordinate points of the portion that juts out from the color reproduction area 102 of the printer 11 mapped onto the L*a*b* space are mapped onto the first RGB color space. Alternatively, when it is possible to narrow a coordinate position of the second reference coordinate point b down by presumption, of the jutting out portion, it is acceptable that only the coordinate points of the narrowed down area are mapped onto the first RGB color space.

In the step S22 shown in FIG. 41, when the second reference coordinate point b is detected, in a similar fashion to that of the flowchart of FIG. 38, as shown in FIG. 40, there is determined the basic difference vector v directing from the first reference coordinate point a to the second reference coordinate point b (a step S23). Further, in a similar fashion to that of the first example, of FIG. 37 and FIG. 38, there is determined the second coordinate point corresponding to the first coordinate point (a step S24).

Such a coordinate conversion is performed on all the coordinate points in which the first reference coordinate point a determined in the step S21 exists inside the color reproduction area 302 of the proofer, of the coordinate points of the color reproduction area 102 of the printer 11 mapped onto the L*a*b* space (a step S25).

Figure 42:
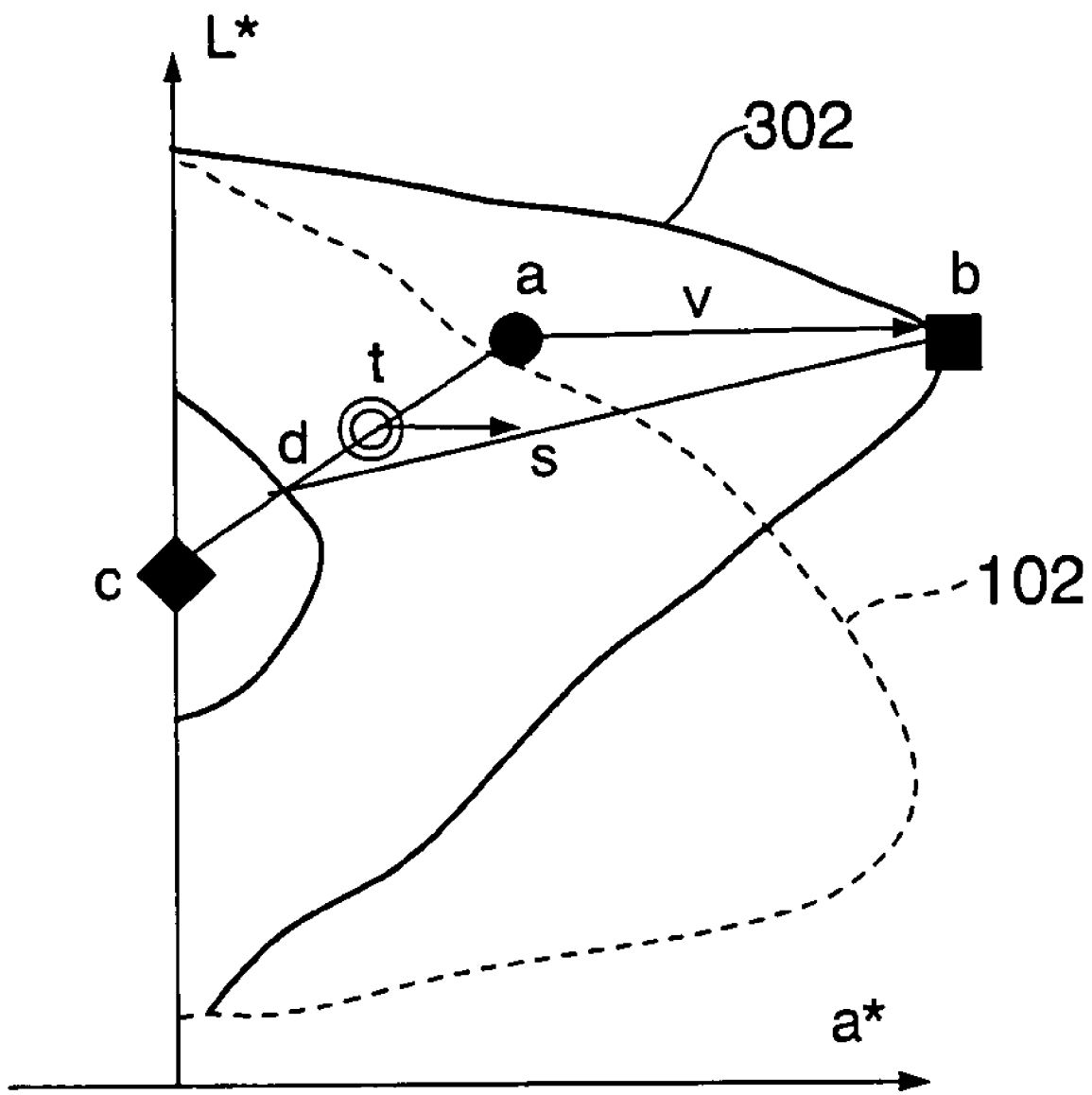
FIG. 42 is a view useful for understanding a second modification of the coordinate conversion explained in conjunction with FIG. 40 and FIG. 41.

FIG. 42 is a view useful for understanding a second modification of the coordinate conversion explained in conjunction with FIG. 40 and FIG. 41.

In a similar fashion to that of FIG. 39, there is established an area D surrounding the coordinate conversion reference coordinate point c, and there is determined an intersection point d of a straight line connecting the coordinate conversion reference coordinate point c with the first reference coordinate point a and the boundary of the area D. In mapping of the first coordinate point t, the first coordinate point t is mapped on the coordinate point s on a straight line connecting the intersection point d with the second reference coordinate point b. This feature makes it possible to establish the area in which coordinates are not moved, addressed as the area D.

Figure 43:
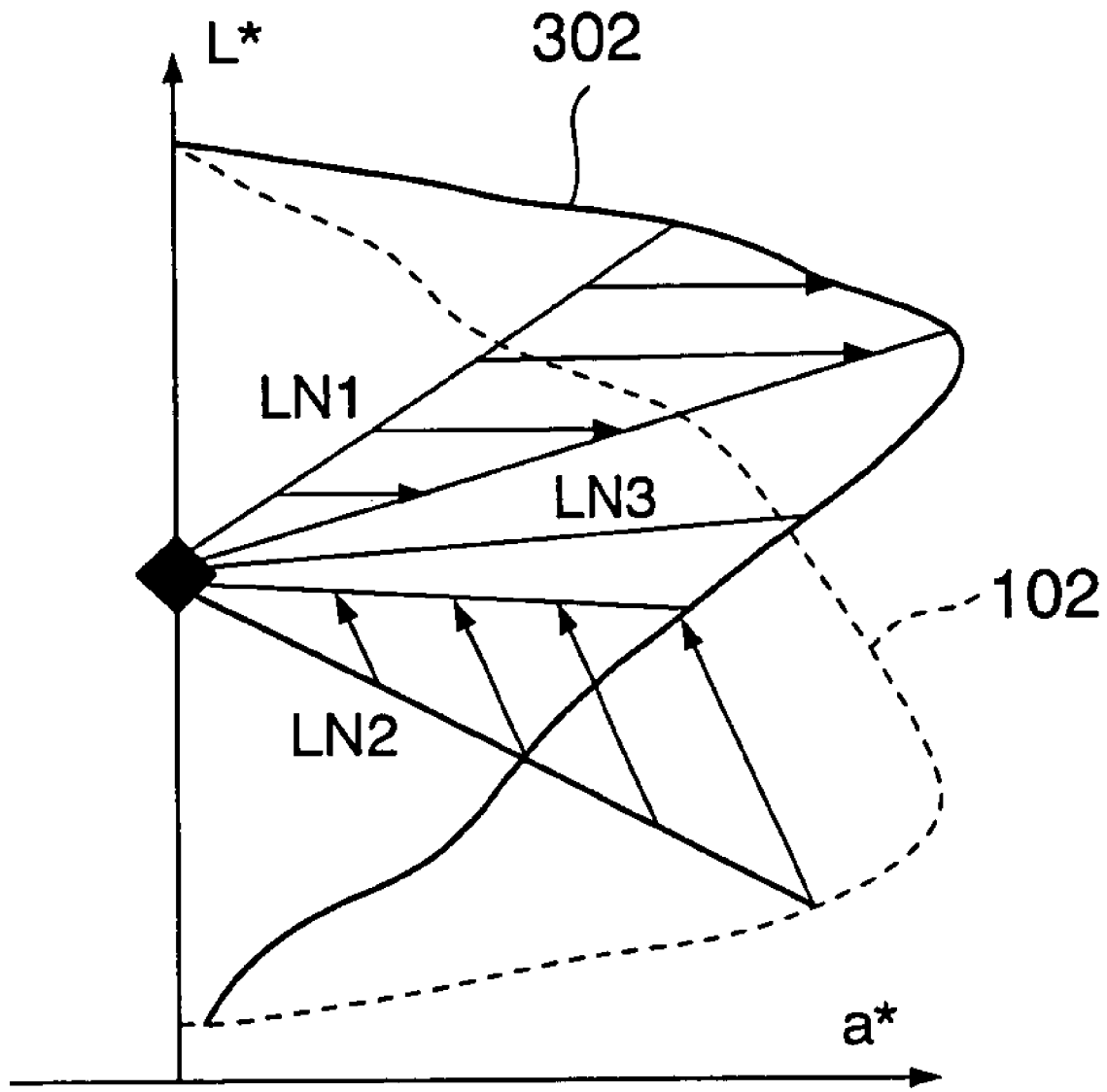
FIG. 43 is an explanatory view for effects of the mapping in combination of the "compression" explained in conjunction with FIG. 37 and FIG. 38 and the "expansion" explained in conjunction with FIG. 40 and FIG. 41.

FIG. 43 is an explanatory view for effects of the mapping in combination of the "compression" explained in conjunction with FIG. 37 and FIG. 38 and the "expansion" explained in conjunction with FIG. 40 and FIG. 41.

Coordinate points on a line LN1, in which the color reproduction area 302 of the proofer 14 on the L*a*b* space is wider than the color reproduction area 102 of the printer 11 on the L*a*b* space, are expanded in such a manner that the color reproduction area 302 of the proofer 14 is used maximum, and coordinate points on a line LN2, in which the color reproduction area 102 of the printer 11 on the L*a*b* space is wider than the color reproduction area 302 of the proofer 14 on the L*a*b* space, are compressed to such a level that the color reproduction area 302 of the proofer 14 is used maximum. The directions of those expansion and compression are determined through utilization of the RGB space depending on a device. Thus, this makes it possible to prevent discontinuity of a tone and an occurrence of a unnatural image, even if the mapping is performed on the L*a*b* space per se. And the mapping is performed on the L*a*b* space per se. This feature makes it possible to perform the mapping with greater accuracy. Further, coordinate points on a line LN3, in which areas of the color reproduction area 102 of the printer 11 and the color reproduction area 302 of the proofer 14 are coincident with one another, are not moved to keep the color.

While FIG. 43 illustrates an L*-a* plane of the L*a*b* space, this is made for the sake of convenience. Actually, a three-dimensional coordinate conversion is performed in the L*a*b* space. This is applicable to other examples, which will be explained hereinafter.

Figure 44:
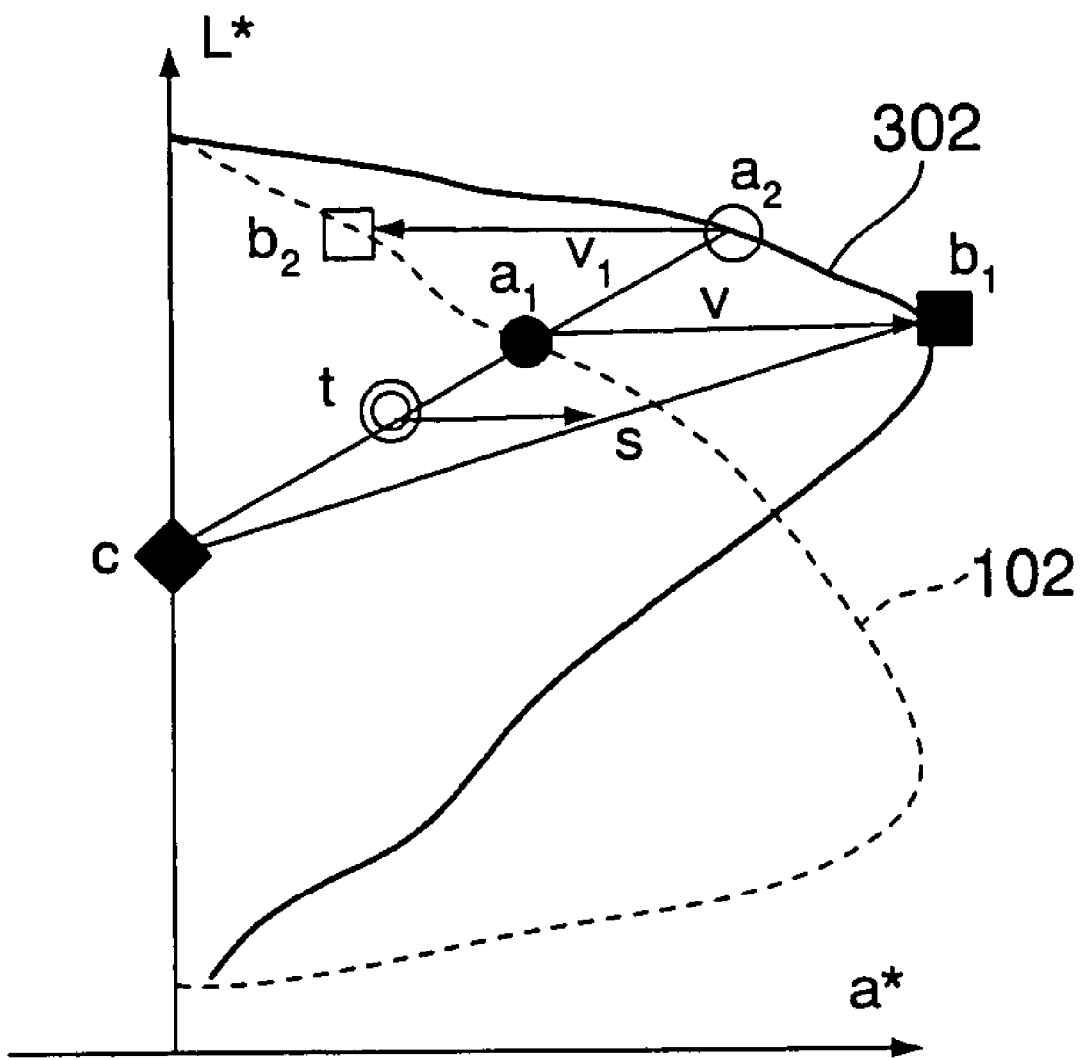
FIG. 44 is an explanatory view for a third example of the coordinate conversion in the first process of the flowchart shown in FIG. 33.
Figure 45:
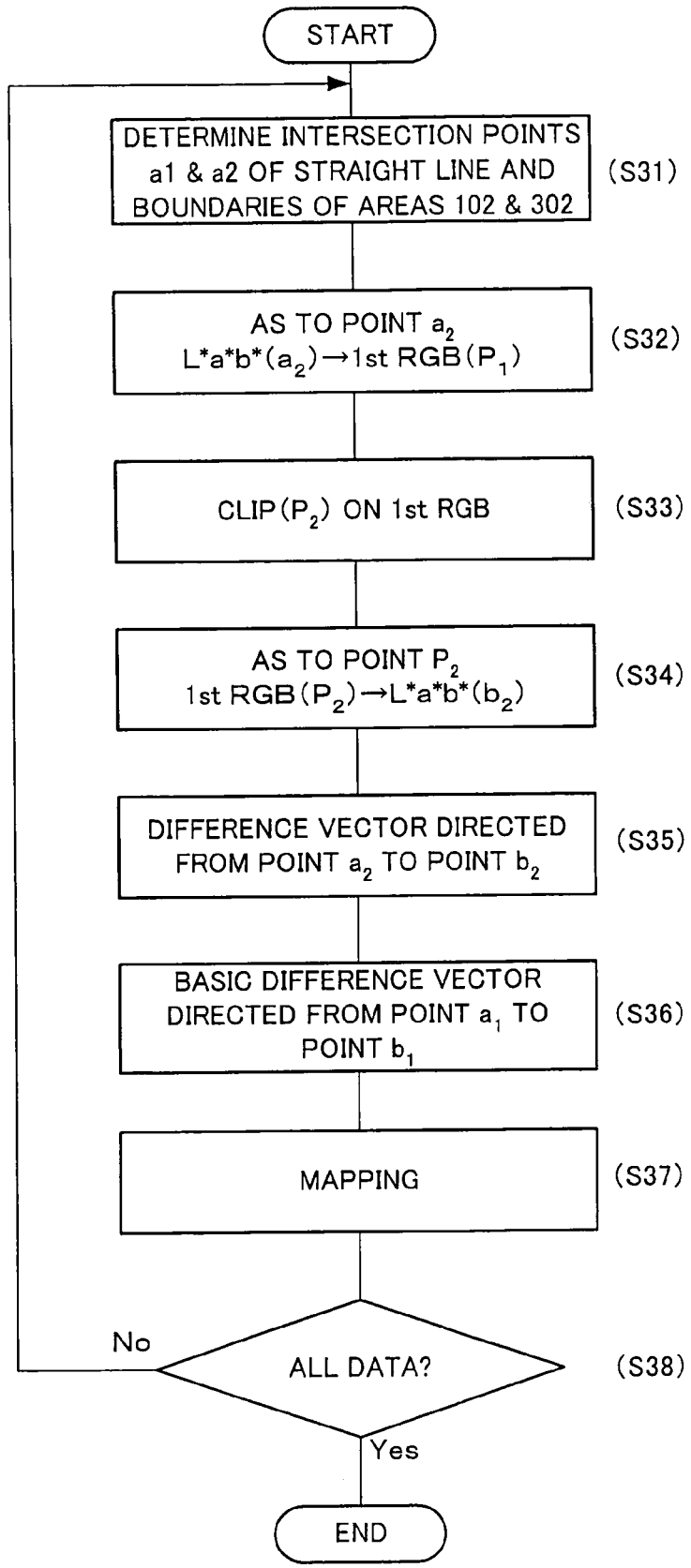
FIG. 45 is a flowchart useful for understanding the third example of the coordinate conversion in the first process of the flowchart shown in FIG. 33.

FIG. 44 is an explanatory view for a third example of the coordinate conversion in the first process of the flowchart shown in FIG. 33. FIG. 45 is a flowchart useful for understanding the third example of the coordinate conversion in the first process of the flowchart shown in FIG. 33. In a similar fashion to that of the second example, of FIG. 40 and FIG. 41, the third example is an example wherein the first reference coordinate point a1 determined in the step S31 exists inside the color reproduction area 302 of the proofer 14 mapped onto the L*a*b* space.

Also here, in a similar fashion to that of the first example and the second example as mentioned above, there is established a coordinate conversion reference coordinate point c that is a standard of the coordinate conversion, on the L* axis (gray axis). Now, let us consider a straight line connecting the coordinate conversion reference coordinate point c to the first coordinate point t, and determine an intersection point of the straight line and the boundary of the color reproduction area 102 of the printer 11 mapped onto the L*a*b* space. This intersection point is referred to as the first reference coordinate point a1. Further, there is determined an intersection point of the straight line and the boundary of the color reproduction area 302 of the proofer 14 mapped onto the L*a*b* space. This intersection point is referred to as the third reference coordinate point a2 (a step S31). Here, in a similar fashion to that of the first example and the second example as mentioned above, when there is performed an adaptational conversion in the second process (the step b21) in the flowchart of FIG. 33, the color reproduction area 102 of the printer 11, which is mapped into the L*a*b* space, indicates the color reproduction area after the adaptational conversion.

Next, in a step S32, the third reference coordinate point a2 thus determined is mapped from the L*a*b* space onto the first RGB color space depending on the printer 11. In a step S33, the point $P_1$, at which the third reference coordinate point a2 is mapped onto the first RGB color space, is clipped in the first RGB color space, so that the point $P_1$ is mapped on the boundary of the color reproduction area of the printer 11. In a step S34, the point $P_2$, which is obtained through the mapping, is mapped onto the L*a*b* space. A thus obtained point on the boundary of the color reproduction area 102 of the printer 11 in the L*a*b* space is referred to as a fourth reference coordinate point b2.

Next, there is determined a difference vector v1 directing from the third reference coordinate point a2 to the fourth reference coordinate point b2 (a step S35). Now let us consider a straight line passing through the first reference coordinate point a1 and parallel to the difference vector v1. An intersection point of the straight line and the boundary of the color reproduction area 302 of the proofer 14 in the L*a*b* space is established as the second reference coordinate point b1, and there is determined the basic difference vector v directing from the first reference coordinate point a1 to the second reference coordinate point b1 (a step S36). Hereinafter, in a similar fashion to that of the first example and the second example as mentioned above, the first coordinate point t is moved in parallel to the basic difference vector v so as to be mapped onto a coordinate point (a second coordinate point s) hitting against a straight line connecting the coordinate conversion reference coordinate point c to the second reference coordinate point b1 (a step S37).

Such a coordinate conversion is carried out on all the coordinate points in which there is determined the first reference coordinate point a1 located inside the color reproduction area 302 of the proofer 14 in the L*a*b* space, of the coordinate points in the color reproduction area of the printer 11 in the L*a*b* space (a step S38).

The third example explained with reference to FIG. 43 and FIG. 44 involves errors when there is a great discrepancy between the color reproduction area 102 of the printer 11 in the L*a*b* space and the color reproduction area 302 of the proofer 14, that is, when there is a great difference between the difference vector v1 and the basic difference vector v. However, when the difference vector v1 and the basic difference vector v are close to one another in length, so that the errors can be neglected, it is possible to adopt the third example and thereby performing a high speed operation as compared with the second example explained with reference to FIG. 40 and FIG. 41.

Figure 46:
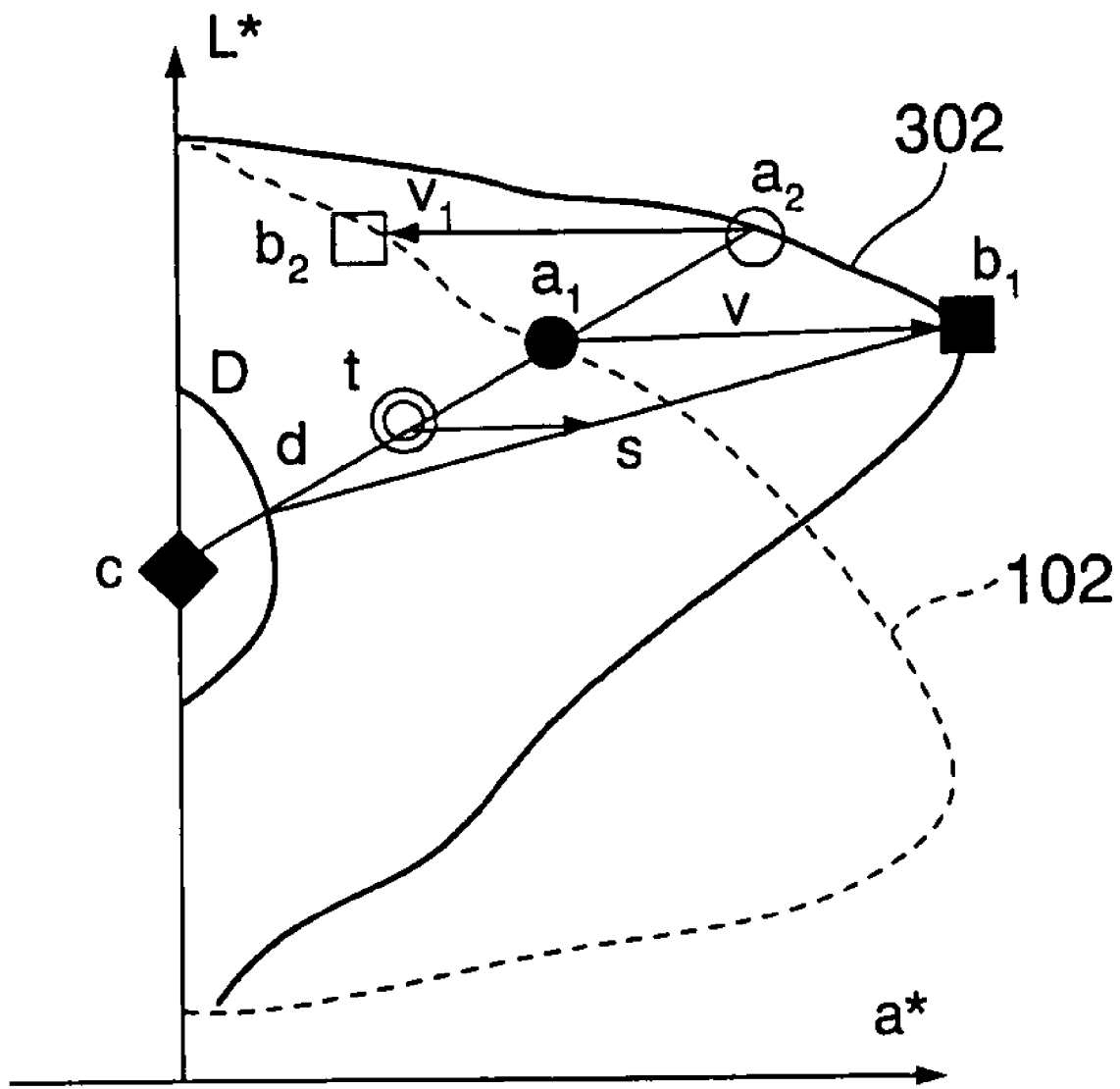
FIG. 46 is a view useful for understanding a third modification of the coordinate conversion explained in conjunction with FIG. 44 and FIG. 45.

FIG. 46 is a view useful for understanding a third modification of the coordinate conversion explained in conjunction with FIG. 44 and FIG. 45.

In a similar fashion to that of FIG. 39 and FIG. 42, there is established an area D surrounding the coordinate conversion reference coordinate point c, and there is determined an intersection point d of a straight line connecting the coordinate conversion reference coordinate point c with the first reference coordinate point a1 and the boundary of the area D. In mapping of the first coordinate point t, the first coordinate point t is mapped on the coordinate point s on a straight line connecting the intersection point d with the second reference coordinate point b1.

This feature makes it possible to establish the area in which coordinates are not moved, addressed as the area D.

Figure 47:
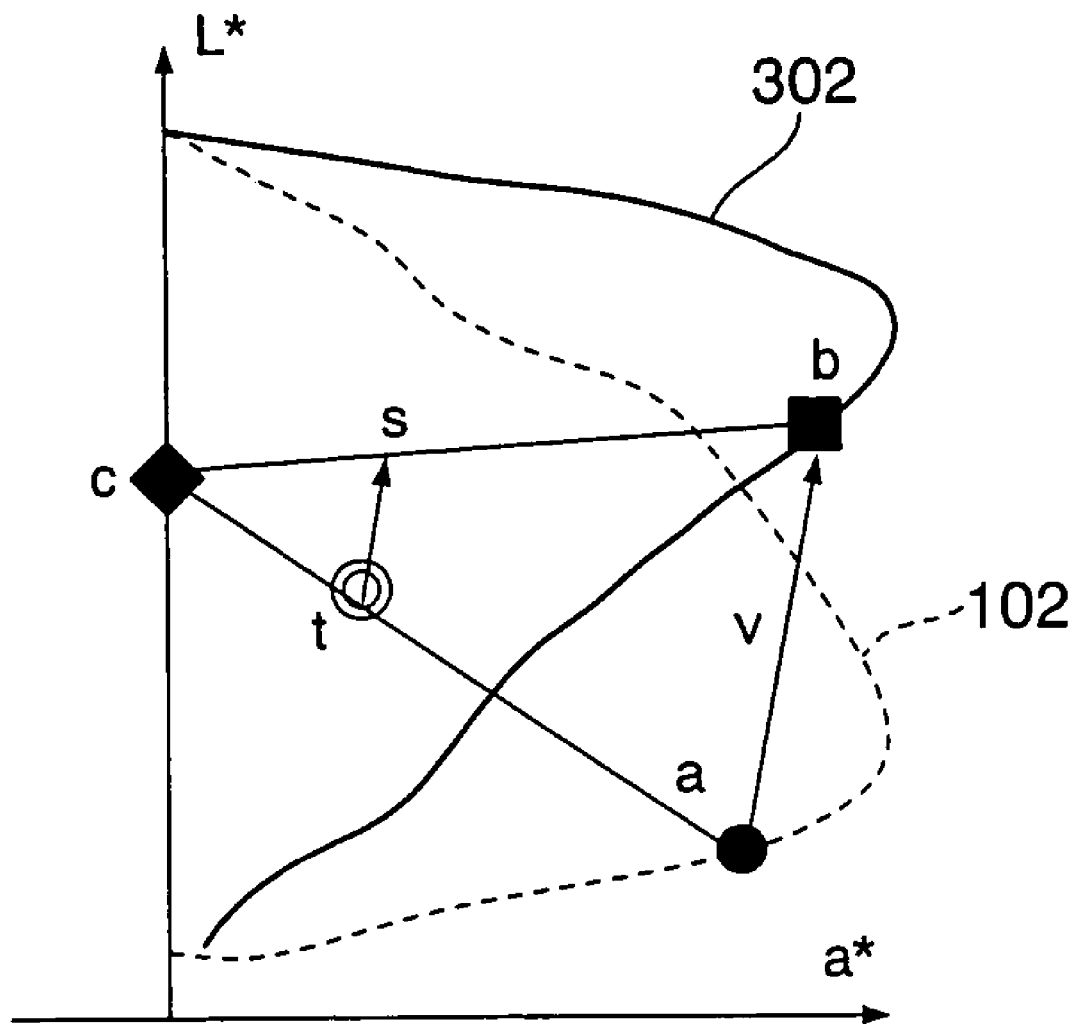
FIG. 47 is an explanatory view for a fourth example of the coordinate conversion in the first process of the flowchart shown in FIG. 33.
Figure 48:
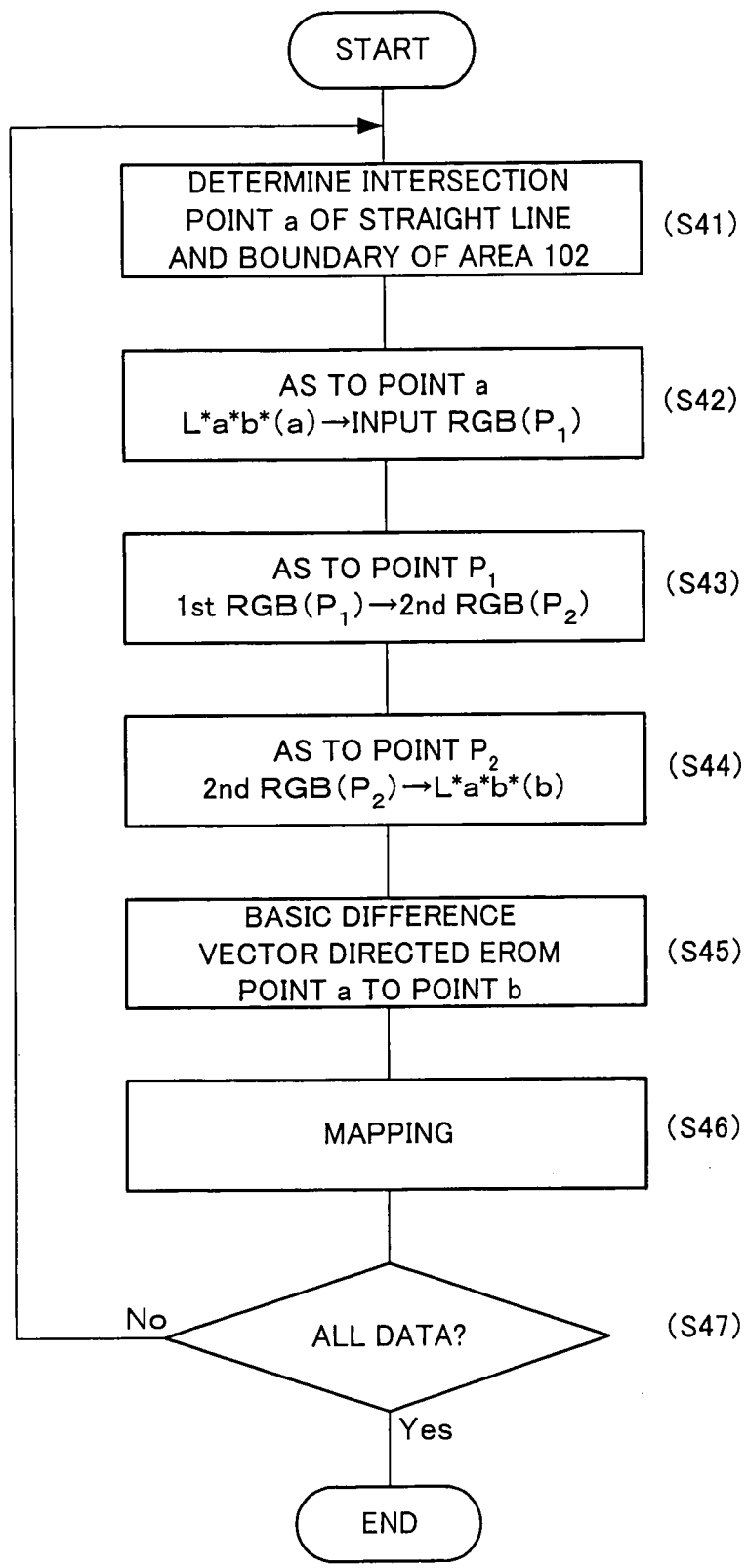
FIG. 48 is a flowchart useful for understanding the fourth example of the coordinate conversion in the first process of the flowchart shown in FIG. 33.

FIG. 47 is an explanatory view for a fourth example of the coordinate conversion in the first process of the flowchart shown in FIG. 33. FIG. 48 is a flowchart useful for understanding the fourth example of the coordinate conversion in the first process of the flowchart shown in FIG. 33.

According to the fourth example, it is possible to apply without considering as to whether a first reference coordinate point a, which is determined in a step S41, exists inside the color reproduction area 302 of the proofer 14 mapped onto the L*a*b* space, or outside the color reproduction area 302.

Also here, in a similar fashion to that of the first example to the third example as mentioned above, there is established a coordinate conversion reference coordinate point c that is a standard of the coordinate conversion, on the L* axis (gray axis). Now, let us consider a straight line connecting the coordinate conversion reference coordinate point c to the first coordinate point t that is an object of the coordinate conversion, and determine an intersection point of the straight line and the boundary of the color reproduction area 102 of the printer 11 mapped onto the L*a*b* space. This intersection point is referred to as the first reference coordinate point a (a step S41).

Next, in a step S42, the first reference coordinate point a thus determined is mapped onto the first RGB color space depending on the printer 11.

Next, in a step S43, there is determined a coordinate point $P_2$ on the second RGB color space that is a color space depending on the proofer 14, which has a coordinate value corresponding to the coordinate value of the point $P_1$ on the first RGB color space mapped onto the first RGB color space in the manner as mentioned above, and typically has the same coordinate value as the coordinate value of the point $P_1$. Specifically, for example, when the coordinate value of the point $P_1$, in which the first reference coordinate point a shown in FIG. 47 is mapped onto the first RGB color space, is expressed by (R, G, B)=(0, 255, 0), a point on the second RGB color space having the same coordinate value (R, G, B)=(0, 255, 0) is denoted as the point $P_2$.

Next, in a step S44, the point $P_2$ on the second RGB color space is mapped from the second RGB color space onto the L*a*b* space, and the mapped point is denoted as a second reference coordinate point b.

The first reference coordinate point a is a point on the boundary of the color reproduction area 102a of the printer 11 on the L*a*b* space. Accordingly, even if the first reference coordinate point a is mapped onto the first RGB color space, the first reference coordinate point a becomes a point (for example, (R, G, B)=(0, 255, 0)) on the boundary of the color reproduction area of the printer 11 in the first RGB color space.

If this point is a point on the second RGB color space as it is, the point becomes, on the second RGB color space, a point on the boundary of the color reproduction area of the proofer 14, so that the second reference coordinate point b, which is determined through mapping of the point onto the L*a*b* space, also becomes a point on the boundary of the color reproduction area 302 of the proofer 14 on the L*a*b* space.

In a step S45, there is determined a basic difference vector v directing from the first reference coordinate point a thus determined to the second reference coordinate point b. In a step S46, there is determined an intersection point of a straight line passing through the first coordinate point t and parallel to the basic difference vector v and a straight line connecting the coordinate conversion reference coordinate point c to the second reference coordinate point b. This intersection point is denoted by a second coordinate point s.

The above-mentioned coordinate conversion is sequentially carried out throughout the color reproduction area 102 of the printer 11 on the L*a*b* space (a step S47).

Figure 49:
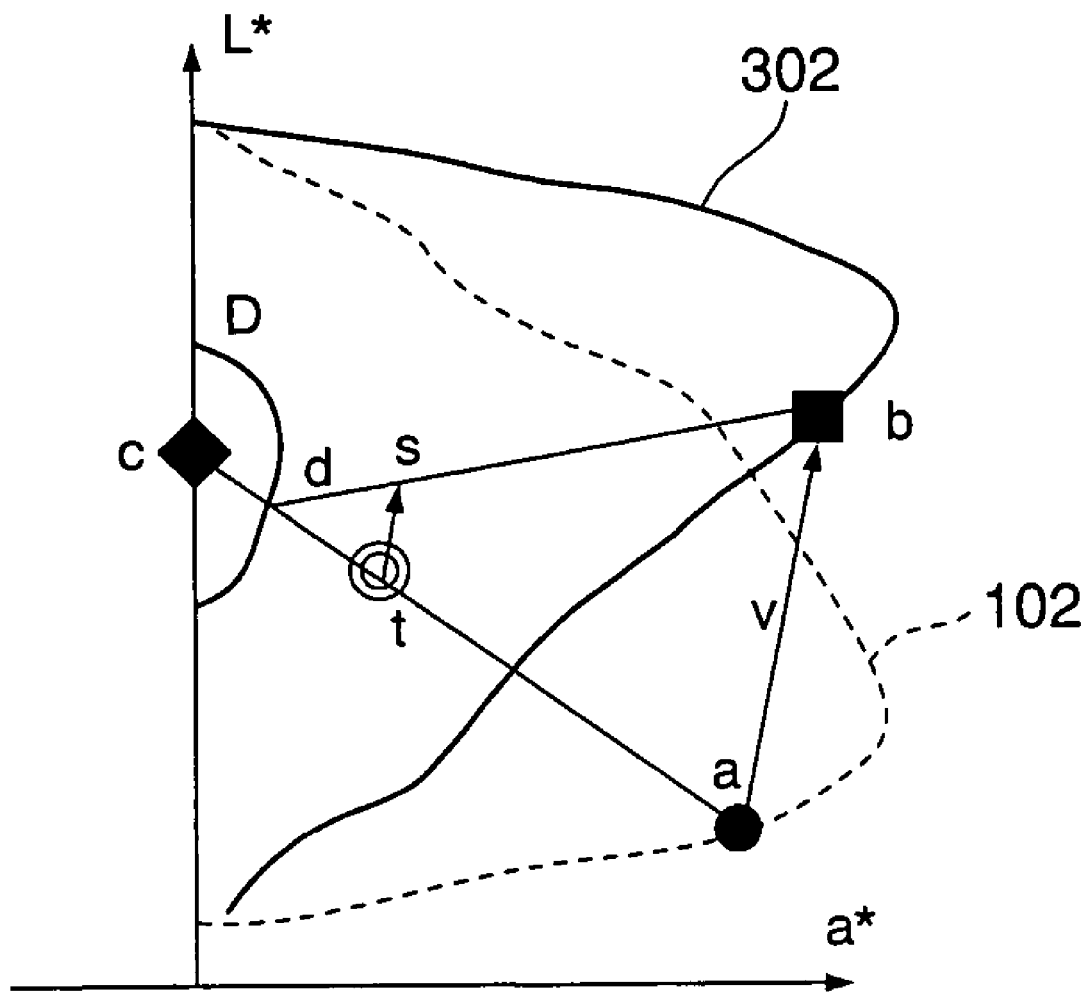
FIG. 49 is a view useful for understanding a fourth modification of the coordinate conversion explained in conjunction with FIG. 47 and FIG. 48.

FIG. 49 is a view useful for understanding a fourth modification of the coordinate conversion explained in conjunction with FIG. 47 and FIG. 48.

Here, in a similar fashion to that of FIG. 39, FIG. 42 and FIG. 46, there is established an area D surrounding the coordinate conversion reference coordinate point c, and the inside of the area D is not subjected to the mapping. Technique as to how the inside of the area D is not subjected to the mapping is the same as those of the examples in FIG. 39, FIG. 42 and FIG. 46, and thus redundant explanation will be omitted.

Now returning to FIG. 33, there will be explained the third coordinate conversion process (the step b3).

According to the third coordinate conversion process (the step b3), the coordinate points in the color reproduction area 302 of the proofer 14, after the coordinate conversion (mapping) from the color reproduction area 102 of the printer 11 to the color reproduction area 302 of the proofer 14 is carried out on the L*a*b* space, are mapped onto the second RGB color space in accordance with the color reproduction quality (the proofer profile) of the proofer 14.

According to the first color conversion definition creating process (the step (B)) of the color conversion definition creating method shown in FIG. 4, in the manner as mentioned above, there is determined a first color conversion definition for converting coordinate points in the color reproduction area 102 of the printer 11 in the first RGB color space (the $R_1G_1B_1$ color space) that is a color space depending on the printer 11 into coordinate points in the color reproduction area (a color reproduction area sufficiently matched to the color reproduction area of the printing system 12) of the proofer 14 in the second RGB color space (the $R_2G_2B_2$ color space) that is a color space depending on the virtual proofer 14 having a color reproduction area sufficiently matched to the color reproduction area of the printing system 12.

Next, there will be explained processing of the second color conversion definition creating process of the step (C) of the color conversion definition creating method of FIG. 4.

In the second color conversion definition creating process of the step (C), there is performed processing of the processes of the profile creating method of FIG. 6, that is, the K-value definition process (the step (c1)), the K-value computing process (the step (c2)), and the K-value restraint conditions utilization process (the step (c3)). An association of CMYK with the proofer profile (cf. FIG. 16) that is created in the profile creating process of the step (A) in FIG. 4 makes it possible to determine the link profile 54 (cf. FIG. 17) in which the CMYK values are the coordinate points (the $R_2G_2B_2$ values) of the second RGB color space.

First, in the K-value definition process (the step (c1)), with respect to the color reproduction area of the proofer 14 determined in the profile creating process of the step (A) in FIG. 4, there are defined values of K as to the respective points on the gray axis of the color reproduction area of the proofer 14 and the respective points on the edge lines in such a manner that with respect to the gray axis there are adopted values of K determined by the K-plate restraint condition K=K(C) (cf. FIG. 15), and with respect to the edge lines there are adopted values of K that is the minimum in the allowable range in definition of coordinate points on the CMYK color space, or within the range defined on the printing profile 52 shown in FIG. 14.

Specifically, with respect to the gray axis of R=G=B, there is adopted the K-plate restraint condition K=K(C) to allot values of K to the points on the gray axis.

With respect to the edge lines other than edge lines connecting vertexes of R, G and B with K, in view of the general nature of ink, there is adopted K=0.

With respect to three edge lines connecting vertexes of R, G and B with K, in order to suppress a rough feel on a printing surface as less as possible, there are adopted values of K that is the minimum within the range in which the printing profile 52 shown in FIG. 14 is able to implement the associated L*a*b* values.

For example, when a value of K implementing $L^*_X a^*_X b^*_X$ that are L*a*b* values of a certain point on the edge line, on the printing profile 52 shown in FIG. 14, is K=30 or more, there is adopted K=30. It is noted that when the value of K implementing $L^*_X a^*_X b^*_X$ is K=29 or less, any combination of C, M, Y and K makes it difficult to implement the $L^*_X a^*_X b^*_X$, and when the value of K implementing $L^*_X a^*_X b^*_X$ is K=30 or more, some combination of C, M, Y and K makes it possible to implement the $L^*_X a^*_X b^*_X$.

After values of K are allotted to the points on the gray axis and the points on the edge lines in the K-value definition process (the step (c1)) of FIG. 6, in the manner as mentioned above, in the K-value computing process (the step (c2)) of FIG. 6, there are determined values of K on the points of the surface other than the edge lines of the color reproduction area of the proofer 14 and the points of the inside other than the gray axis in accordance with the interpolation operation where values of K as to the points on the gray axis and the points on the edge lines are established as boundary conditions. Specifically, a quadratic expression as set forth below is adopted to compute $d_0$-$d_9$, taking as sample points the points of the edge line point and the gray axis of the color reproduction area.

$$K = d_0 R_2^2 + d_1 G_2^2 + d_2 B_2^2 + d_3 R_2 G_2 + d_4 G_2 B_2 + d_5 B_2 R_2 + d_6 R_2 + d_7 G_2 + d_8 B_2 + d_9$$

However, regarding the sample points of $R_2=G_2=B_2$ (points on the gray axis), the computation is performed with 1000 times weighting for instance. Thus, in the vicinity of the gray axis, K values are strongly affected by K values of the points on the gray axis, so that the K values around the gray axis become substantially the same values as the values on the gray axis. This feature makes it possible to faithfully keep the K-plate restraint condition K=K(C) on the gray axis of the printer 11, even if there is somewhat discrepancy between the gray axis of the virtual proofer 14 now computed and the gray axis of the printer 11 shown in FIG. 1.

After the values of K are allotted as to the points on the gray axis and the points on the edge lines in the K-value definition process (the step (c1)) of FIG. 6, in the manner as mentioned above, and then there are determined the values of K throughout the color reproduction area in the K-value computing process (the step (c2)) of FIG. 6, where the values of K as to the points on the gray axis and the points on the edge lines are established as boundary conditions, CMYK values are allotted to the points of the color reproduction area in such a manner that the printing profile 52 shown in FIG. 14 is referred to where the values of K as to the points of the color reproduction area are established as boundary conditions.

According to the profile creating process of the step (A) of FIG. 4, in the manner as mentioned above, there is created the profile of the proofer 14, that is, the proofer profile 53 (cf. FIG. 16)). In other words, there is created the link profile 54, in which the $R_2G_2B_2$ values depending on the proofer 14 shown in FIG. 17 are associated with the CMYK values depending on the printing system, in such a manner that the $R_2G_2B_2$ values depending on the proofer 14 and the L*a*b* values independent of the proofer 14 are allotted to the respective points throughout the color reproduction area of the proofer 14, and the CMYK values are allotted throughout the color reproduction area of the proofer 14. The link profile 54 corresponds to the color matching (the second color conversion definition) in the color conversion apparatus 10 shown in FIG. 1.

Figure 50:
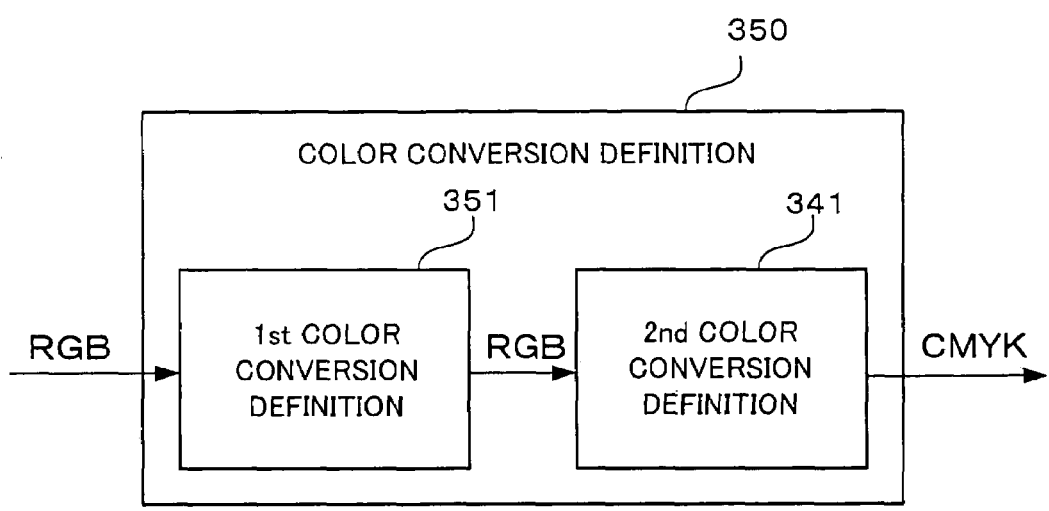
FIG. 50 is a conceptual view useful for understanding a color conversion definition consisting of a first color conversion definition and a second color conversion definition.

FIG. 50 is a conceptual view useful for understanding a color conversion definition consisting of a first color conversion definition and a second color conversion definition.

Here, a first color conversion definition 351, which is determined in the first color conversion definition creating process of the step (B) in FIG. 4, is combined to the second color conversion definition 341, which is determined in the second color conversion definition creating process of the step (C) in FIG. 4, so that there is created a color conversion definition 350 for converting RGB data for a printer, that is, data representative of coordinate points in the first RGB color space, into CMYK data for printing, that is, data representative of coordinate points in the CMYK color space suitable for the printing system (cf. FIG. 1). As mentioned above, the thus created color conversion definition 350 is established on the color conversion apparatus 10. The color conversion definition 350, which is established on the color conversion apparatus 10, is used when the color conversion apparatus 10 converts the RGB data for the printer 11, which is representative of the actual image, into CMYK data for printing.

The CMYK data, which is created through conversion using the color conversion definition 350, has values of K suitable for the printing system 12 (that is, excellent in an aptitude for printing), and absorbs "well" the difference between the color reproduction area of the printer 11 and the color reproduction area of the printing system 12, so that there is obtained the printed image 12a reproduced in color closed to the color of the printed image 11a to be printed out by the printer 11 in accordance with the RGB data for the printer 11 before the conversion.

Incidentally, according to the present embodiments, as the first device referred to in the present invention, there is adopted the printer 11 shown in FIG. 1. However, the first device referred to in the present invention is not restricted to the output device such as the printer 11. As the first device, it is acceptable to adopt an input device such as a color scanner that reads an image and outputs image data of R, G and B. The present invention is applicable in case of creating a color conversion definition for converting RGB data obtained by the input device into CMYK data having a preferable color as to an image which the RGB data is obtained in accordance with, and being excellent in an aptitude for printing.

Further, according to the present embodiments, as the second device referred to in the present invention, there is adopted the proofer 14 shown in FIG. 1. However, the proofer 14 is adopted, for the purpose of easy understanding of the invention by the replacement of the second device with the proofer in the usual printing. And thus, any one is acceptable, as the second device referred to in the present invention, which has a color reproduction area that is sufficiently coincident with the color reproduction area of the printing system 12.

As mentioned above, according to the present invention, even if the color reproduction area of a device is different from the color reproduction area of printing, it is possible to create a color conversion definition for converting RGB data into CMYK data capable of obtaining a printed image reproduced in color very closed to a color of an image by the device dealing with the RGB data, and also a profile for creating the color conversion definition with greater accuracy.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition creating method of creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating method comprising:

a profile creating process of creating a virtual device profile between a predetermined common color space and a second RGB color space depending on a virtual second device that mediates an image and image data, the virtual device profile having a color reproduction area tracing the color reproduction area for printing;

reading a device profile of the first device from memory;

a first color conversion definition creating process of creating a first color conversion definition for converting coordinate points in the color reproduction area of the first device in the first RGB color space into coordinate points in the color reproduction area of the second device in the second RGB color space, using the device profile of the first device and the virtual device profile created in the profile creating process; and a second color conversion definition creating process of creating a second color conversion definition for converting coordinate points in the color reproduction area of the second device in the second RGB color space into coordinate points in the color reproduction area for printing in the CMYK color space, wherein the profile creating process comprises a color reproduction area definition process in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param} < K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

2. A color conversion definition creating method according to claim 1, wherein the profile creating process further comprises:

an edge line profile creating process in which there is created an edge line profile that associates coordinate points in the second RGB color space with coordinate points in the common color space, with respect to the edge lines of the color reproduction area of the second device, in such a manner that when pluralities of dots are determined at even intervals on an arbitrary one side that defines the color reproduction area of the second device in the second RGB color space to map the pluralities of dots onto the common color space, the pluralities of dots mapped on the common color space are disposed on the edge line associated with the arbitrary one side, of the edge lines defining the color reproduction area of the second device defined in the color reproduction area definition process, and are also disposed at even intervals;

a gray axis profile creating process in which there is created a gray axis profile that associates coordinate points in the second RGB color space with coordinate points in the common color space, with respect to the gray axis of the color reproduction area of the second device, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process in which there are computed a profile of a surface other than the edge lines of the color reproduction area of the second device and a profile of the interior other than the gray axis, through an interpolation operation taking as boundary conditions both the edge line profile created in the edge line profile creating process and the gray axis profile created in the gray axis profile creating process.

3. A color conversion definition creating method according to claim 1, wherein the second color conversion definition creating process comprises:

a K-value definition process in which there are determined K-values on points on the gray axis of the color reproduction area of the second device and points on the edge lines in such a manner that with respect to the gray axis there is adopted a K-value that is determined by K-plate restraint conditions for printing, and with respect to the edge lines there is adopted the minimum K-value within the available range in definition of the coordinate points on the CMYK color space;

a K-value computing process in which there are computed K-values of the points of a surface other than the edge lines of the color reproduction area of the second device and the points of the interior other than the gray axis, through an interpolation operation taking as boundary conditions the K-values on the points on the gray axis and the points on the edge lines wherein stronger weight is applied to the points on the gray axis as compared with the points on the edge lines; and a K-value restraint conditions utilization process in which there is created a link profile throughout the color reproduction area of the second device by referring to the printing profile taking as restraint conditions K-values throughout the color reproduction area of the second device, the K-values comprising the K-values defined in the K-value definition process and the K-values computed in the K-value computing process.

4. A profile creating method of creating a virtual device profile between a predetermined common color space and a RGB color space depending on a virtual device that mediates an image and image data, the virtual device profile having a color reproduction area tracing the color reproduction area for printing, the profile creating method comprising:

a color reproduction area definition process in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}<K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

5. A profile creating method according to claim 4, wherein the profile creating method further comprises:

an edge line profile creating process in which there is created an edge line profile that associates coordinate points in the RGB color space with coordinate points in the common color space, with respect to the edge lines of the color reproduction area of the device, in such a manner that when pluralities of dots are determined at even intervals on an arbitrary one side that defines the color reproduction area of the device in the RGB color space to map the pluralities of dots onto the common color space, the pluralities of dots mapped on the common color space are disposed on the edge line associated with the arbitrary one side, of the edge lines defining the color reproduction area of the device defined in the color reproduction area definition process, and are also disposed at even intervals;

a gray axis profile creating process in which there is created a gray axis profile that associates coordinate points in the RGB color space with coordinate points in the common color space, with respect to the gray axis of the color reproduction area of the device, in such a manner that when pluralities of dots are determined at even intervals on a gray axis connecting two vertexes of W and K with one another in the color reproduction area of the device in the RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process in which there are computed a profile of a surface other than the edge lines of the color reproduction area of the device and a profile of the interior other than the gray axis, through an interpolation operation taking as boundary conditions both the edge line profile created in the edge line profile creating process and the gray axis profile created in the gray axis profile creating process.

6. A color conversion definition creating apparatus that creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a profile creating section for creating a virtual device profile between a predetermined common color space and a second RGB color space depending on a virtual second device that mediates an image and image data, the virtual device profile having a color reproduction area tracing the color reproduction area for printing;

a first color conversion definition creating section for creating a first color conversion definition for converting coordinate points in the color reproduction area of the first device in the first RGB color space into coordinate points in the color reproduction area of the second device in the second RGB color space, using the device profile of the first device and the virtual device profile created in the profile creating section; and a second color conversion definition creating section for creating a second color conversion definition for converting coordinate points in the color reproduction area of the second device in the second RGB color space into coordinate points in the color reproduction area for printing in the CMYK color space, wherein the profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

7. A profile creating apparatus that creates a virtual device profile between a predetermined common color space and a RGB color space depending on a virtual device that mediates an image and image data, the virtual device profile having a color reproduction area tracing the color reproduction area for printing, the profile creating apparatus comprising:

a color reproduction area definition section in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

8. A color conversion definition creating program storage medium storing a color conversion definition creating program which causes an information processing apparatus to operate as a color conversion definition creating apparatus, when the color conversion definition creating program is executed in the information processing apparatus, wherein the color conversion definition creating apparatus creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a profile creating section for creating a virtual device profile between a predetermined common color space and a second RGB color space depending on a virtual second device that mediates an image and image data, the virtual device profile having a color reproduction area tracing the color reproduction area for printing;

a first color conversion definition creating section for creating a first color conversion definition for converting coordinate points in the color reproduction area of the first device in the first RGB color space into coordinate points in the color reproduction area of the second device in the second RGB color space, using the device profile of the first device and the virtual device profile created in the profile creating section; and a second color conversion definition creating section for creating a second color conversion definition for converting coordinate points in the color reproduction area of the second device in the second RGB color space into coordinate points in the color reproduction area for printing in the CMYK color space, wherein the profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

9. A profile creating program storage medium storing a profile creating program which causes an information processing apparatus to operate as a profile creating apparatus, when the profile creating program is executed in the information processing apparatus, wherein the profile creating apparatus creates a virtual device profile between a predetermined common color space and a RGB color space depending on a virtual device that mediates an image and image data, the virtual device profile having a color reproduction area tracing the color reproduction area for printing, the profile creating apparatus comprising:

a color reproduction area definition section in which the color reproduction area of the device is defined in such a manner that vertexes of W, C, M, Y, R, G, B of the color reproduction area of the device are coincident with vertexes of associated W, C, M, Y, R, G, B of the color reproduction area for printing, respectively, and edge lines for connecting the vertexes of W, C, M, Y, R, G, B of the color reproduction area of the device with one another are coincident with the associated edge lines of the color reproduction area for printing, respectively, and with respect to the vertex of K of the color reproduction area of the device, the vertex of K is coincident with points (C, M, Y, K)=(100, 100, 100, $K_{max}$) adopting the maximum value $K_{max}$ of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}<K_{max}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines up to (C, M, Y, K)=(100, 100, 100, $K_{max}$), which is the vertex of K.

* * * * *